(12) United States Patent
Kotzur et al.

(10) Patent No.: US 11,500,718 B2
(45) Date of Patent: *Nov. 15, 2022

(54) LOOK-ASIDE RAID CONTROLLER STORAGE-DEVICE-ASSISTED DATA UPDATE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/238,708

(22) Filed: Apr. 23, 2021

(65) Prior Publication Data
US 2021/0240564 A1 Aug. 5, 2021

Related U.S. Application Data

(63) Continuation of application No. 16/813,145, filed on Mar. 9, 2020, now Pat. No. 11,023,313, which is a
(Continued)

(51) Int. Cl.
*G06F 11/00* (2006.01)
*G06F 11/10* (2006.01)
(Continued)

(52) U.S. Cl.
CPC ........ *G06F 11/1004* (2013.01); *G06F 3/0619* (2013.01); *G06F 3/0659* (2013.01); *G06F 3/0689* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 7,783,779 B1 * | 8/2010 | Scales | G06F 9/5077 718/1 |
| 8,700,842 B2 | 4/2014 | Dinker | |

(Continued)

*Primary Examiner* — Mujtaba M Chaudry
(74) *Attorney, Agent, or Firm* — Joseph Mencher

(57) ABSTRACT

A RAID storage controller storage-device-assisted data update system includes a RAID storage controller device coupled to a host system and RAID storage devices in a "look aside" RAID storage controller device configuration. Based on command(s) from the RAID storage controller device, a first RAID primary data storage device may perform a first DMA operation to access first primary data stored on the host system, and write the first primary data to its first buffer subsystem. The first RAID primary data storage device may then perform a first XOR operation using the first primary data stored in its first buffer subsystem and second primary data stored in its first storage subsystem in order to produce first interim parity data, and write the first interim parity data to its second buffer subsystem. The first RAID primary data storage device may then update the second primary data with the first primary data.

20 Claims, 71 Drawing Sheets

Related U.S. Application Data continuation-in-part of application No. 16/586,311, filed on Sep. 27, 2019, now Pat. No. 11,003,391.

(51) Int. Cl.
   *G06F 3/06* (2006.01)
   *G06F 13/28* (2006.01)

(56) References Cited

U.S. PATENT DOCUMENTS

| | | | |
|---|---|---|---|
| 9,037,793 B1* | 5/2015 | O'Brien, III | G06F 3/0659 |
| | | | 711/114 |
| 9,298,648 B2 | 3/2016 | Johnson et al. | |
| 9,384,093 B1 | 7/2016 | Aiello | |
| 2004/0133742 A1 | 7/2004 | Vasudevan et al. | |
| 2006/0041793 A1 | 2/2006 | Cherian et al. | |
| 2008/0201392 A1* | 8/2008 | Nakajima | G06F 12/0246 |
| 2008/0222214 A1* | 9/2008 | Tokuda | G06F 11/1076 |
| 2012/0297133 A1* | 11/2012 | Sundrani | G06F 11/1076 |
| | | | 711/E12.019 |
| 2013/0219119 A1* | 8/2013 | Galbraith | G06F 3/061 |
| | | | 711/E12.001 |
| 2015/0089130 A1 | 3/2015 | Rose et al. | |
| 2015/0121169 A1 | 4/2015 | Iliadis et al. | |
| 2019/0065306 A1* | 2/2019 | Margetts | G06F 11/1068 |
| 2019/0310913 A1* | 10/2019 | Helmick | G06F 3/0619 |

\* cited by examiner

LOOK-ASIDE RAID CONTROLLER STORAGE-DEVICE-ASSISTED DATA UPDATE SYSTEM

RELATED APPLICATIONS

This application is a continuation of U.S. patent application Ser. No. 16/813,145, filed on Mar. 9, 2020, which is a continuation-in-part of U.S. patent application Ser. No. 16/586,311, filed on Sep. 27, 2019, the disclosure of which are hereby incorporated by reference in their entirety.

BACKGROUND

The present disclosure relates generally to information handling systems, and more particularly to updating data in an information handling system using a "look-aside" controller and with the assistance of storage device(s).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a chassis; a processing system that is housed in the chassis; and a memory system that is housed in the chassis, coupled to the processing system, and that includes instructions that, when executed by the processing system, cause the processing system to provide a Redundant Array Of Inexpensive Disks (RAID) storage engine that is configured, based on at least one command received from a RAID storage controller device, to: perform a first Direct Memory Access (DMA) operation that accesses first primary data that is stored on a host system; write the first primary data to a first buffer subsystem that is housed in the chassis; perform a first XOR operation using the first primary data that is stored in the first buffer subsystem and second primary data that is stored in a first storage subsystem that is housed in the chassis in order to produce first interim parity data; and write the first interim parity data to a second buffer subsystem that is housed in the chassis.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
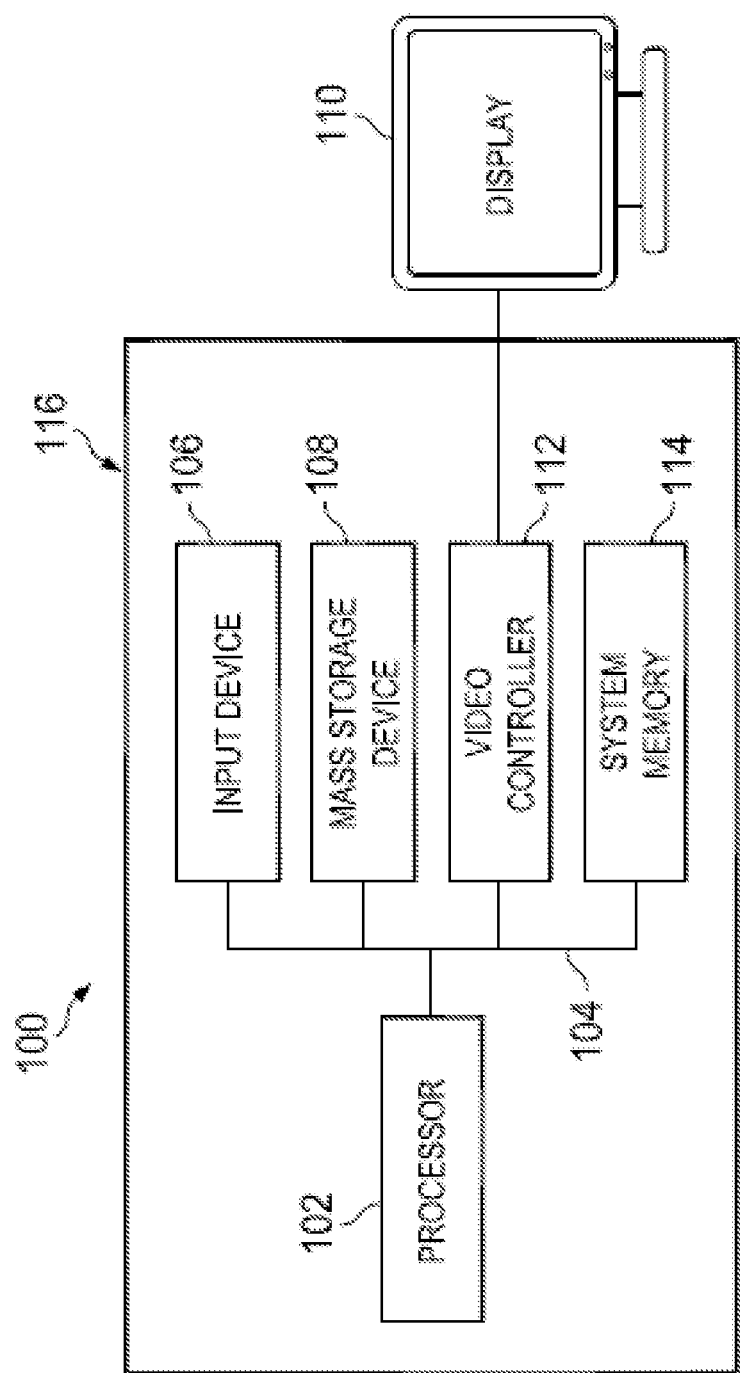
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
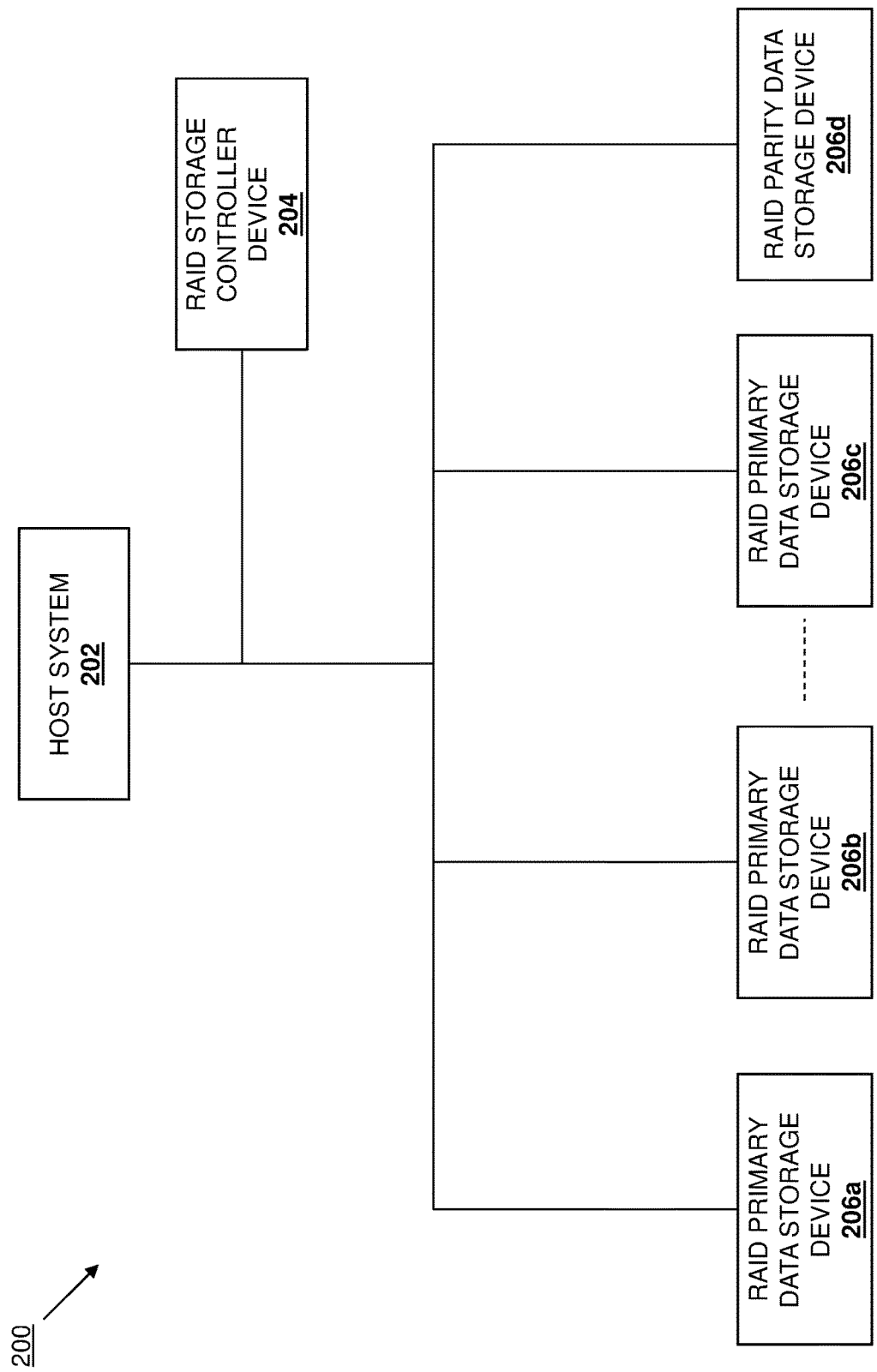
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller device 204 that is coupled to the host system 202 in a "look-aside" RAID storage controller device configuration that, as discussed below, couples the RAID storage controller device 204 to the host system 202 and each of the RAID data storage devices 206a-206d (discussed below) without positioning the RAID storage controller device 204 between the host system 202 and the RAID data storage devices 206a-206d. In an embodiment, the RAID storage controller device 204 may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units. In the discussion below, the RAID storage controller device 204 includes a processing system, and a memory system that is coupled to the processing system and that includes instructions that, when executed by the processing system, cause the processing system to provide a RAID storage controller engine that is configured to perform the functions of the RAID storage controller engines and RIAD storage controller devices discussed below.

Furthermore, the RAID storage system 200 also includes a plurality of RAID storage devices that are illustrated in FIG. 2 as a plurality of RAID primary data storage devices 206a, 206b, and up to 206c, along with a RAID parity data storage device 206d, each of which is coupled to the host system 202 and the RAID storage controller device 204. As discussed above, FIG. 2 illustrates how the RAID storage controller device 204 may be provided in a "look-aside" RAID storage controller device configuration that couples the RAID storage controller device 204 to the host system 202 and each of the RAID data storage devices 206a-206d, and without positioning the RAID storage controller device 204 between the host system 202 and the RAID data storage devices 206a-206d. As discussed in further detail below, the "look-aside" RAID storage controller device configuration provides the RAID data storage devices 206a-206d direct access to the host system 202 independent of the RAID storage controller device 204, which allows many conventional RAID storage controller operations to be offloaded from the RAID storage controller device 204 by the RAID data storage devices 206a-206c.

However, while illustrated and described as having specific RAID operational roles (e.g., "data storage operational roles" and "parity data storage operational roles"), as will be appreciated by one of skill in the art in possession of the present disclosure, any or all of the plurality of RAID storage devices in the RAID storage system 200 illustrated in FIG. 2 may perform dual roles for different data stripes, with any particular RAID storage device operating as a RAID primary data storage device for one data stripe and a RAID parity data storage device for another data stripe. As will be appreciated by one of skill in the art in possession of the present disclosure, the RAID storage devices in the RAID storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID storage devices in a particular configuration are illustrated, one of skill in the art in possession of the present disclosure will recognize that many more storage devices may (and typically will) be coupled to the RAID storage controller device 204 (e.g., in a datacenter) and may be provided in other RAID configurations while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
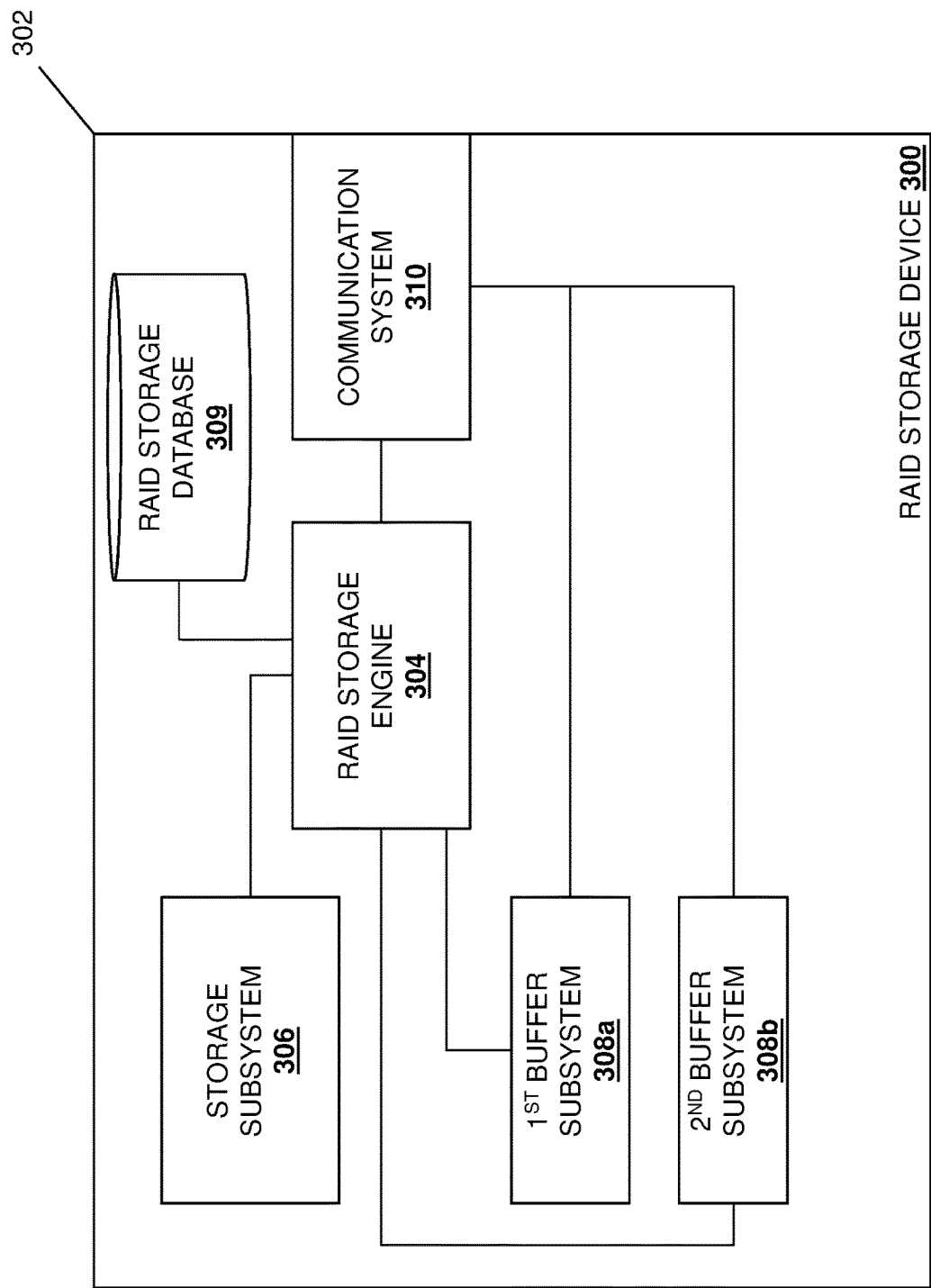
FIG. 3 is a schematic view illustrating an embodiment of a RAID storage device that may be provided in the RAID storage system of FIG. 2.

Referring now to FIG. 3, an embodiment of a RAID storage device 300 is illustrated that may provide any or all of the RAID primary data storage devices and the RAID parity data storage device discussed above with reference to FIG. 2. As such, the RAID storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as a queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID storage engine 304 (e.g., via a coupling between the first buffer subsystem 308a and the processing system). Continuing with the example provided above in which the RAID storage device 300 is an NVMe SSD storage device, the first buffer subsystem 308a may be provided by device buffer that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID storage engine 304 (e.g., via a coupling between the second buffer subsystem 308b and the processing system). Continuing with the example provided above in which the RAID storage device 300 is an NVMe SSD storage device, the second buffer subsystem 308b may be provided by a Controller Memory Buffer (CMB). However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to store any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, the submission and completion queues discussed below, as well as any other components that provide NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Figure 4:
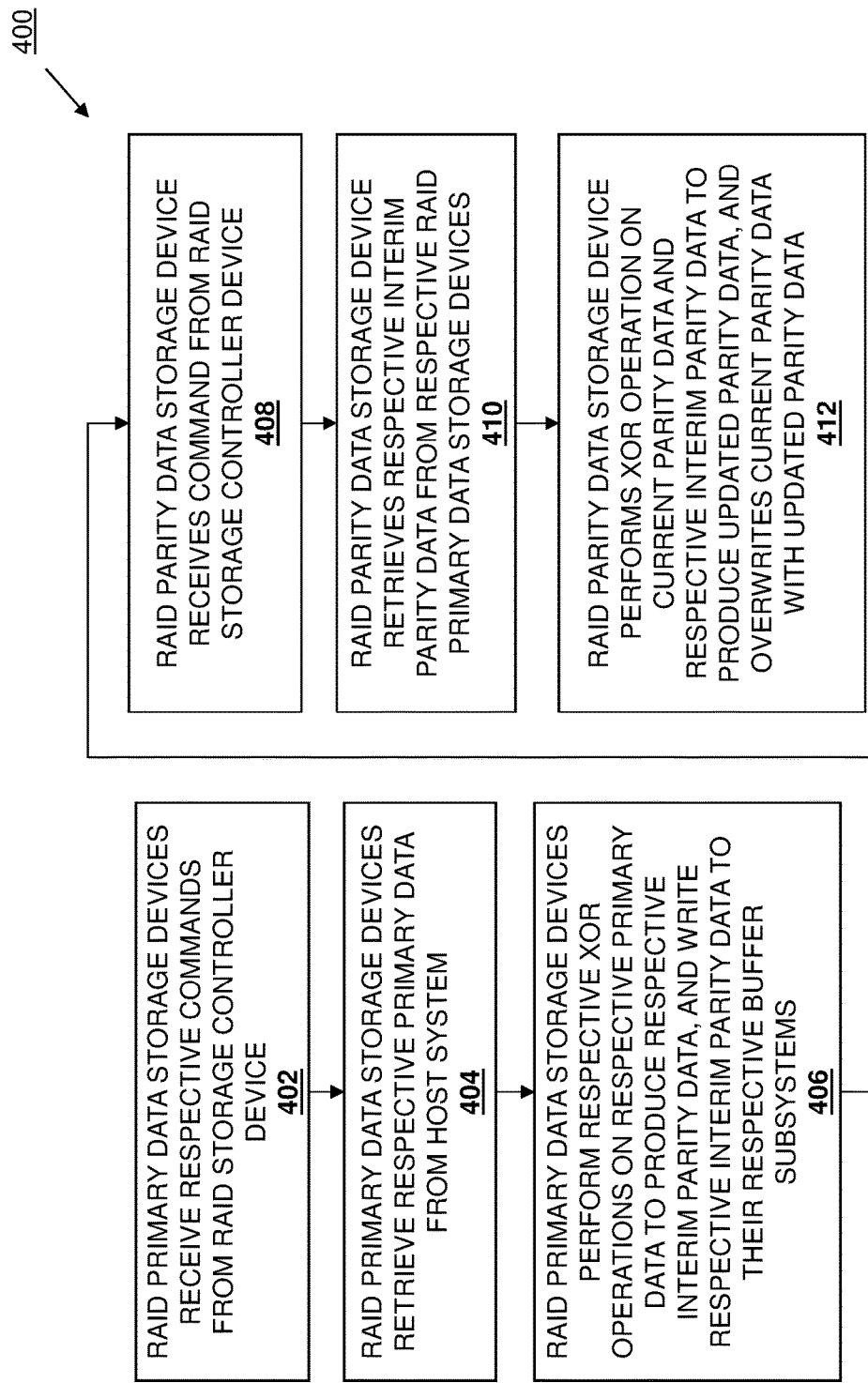
FIG. 4 is a flow chart illustrating an embodiment of a method for performing data update operations using RAID storage devices.

Referring now to FIG. 4, an embodiment of a method 400 for performing data update operations using RAID storage devices is illustrated. As discussed below, embodiments of the systems and methods of the present disclosure may provide for the performance of data update operations by the RAID storage devices that store that data. For example, the RAID storage controller device may send commands to each of the RAID primary data storage device(s) that is experiencing a data update and, in response to that command, each of those RAID primary data storage device(s) may operate to perform respective DMA operation(s) to retrieve their updated primary data, perform XOR operations on their current primary data and their updated primary data to produce interim parity data, and overwrite their current primary data with the updated primary data. The RAID storage controller device may then send a command to the RAID parity data storage device and, in response to that command, the RAID parity data storage device may perform DMA operation(s) to retrieve the interim parity data produced by each of the RAID primary data storage device(s), perform an XOR operation of that interim parity data and its current parity data to produce updated parity data, and overwrite its current parity data with the updated parity data. As such, in some embodiments of the present disclosure, data update operations may be offloaded from the RAID storage controller device, thus increasing the ability of the RAID storage controller device to scale with high performance RAID storage devices.

Figure 5:
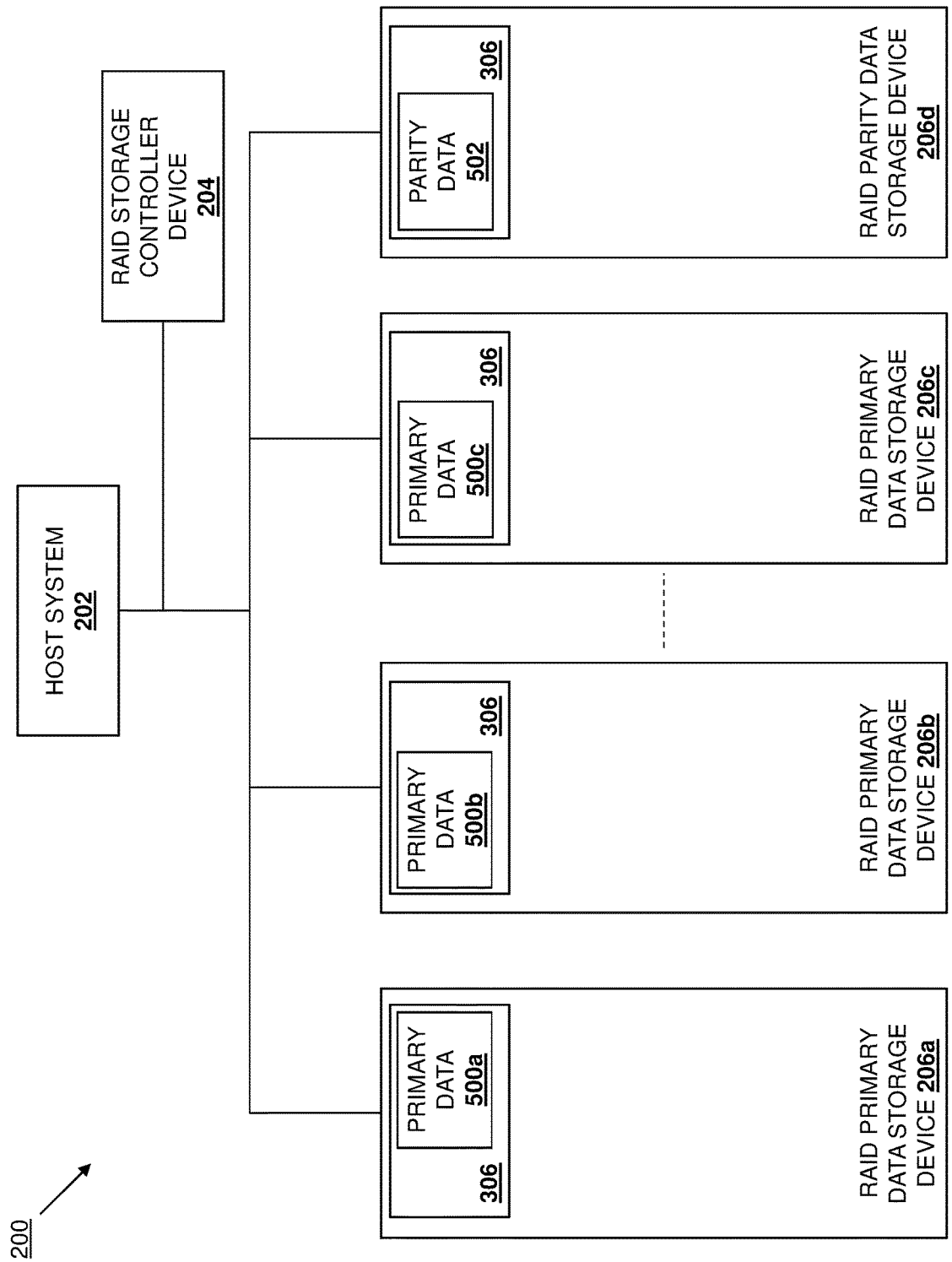
FIG. 5 is a schematic view illustrating an embodiment of the RAID storage system of FIG. 2 operating during the method of FIG. 4.

With reference to FIG. 5, the RAID storage system 200 is illustrated with the RAID primary data storage device 206a storing primary data 500a in its storage subsystem 306, the RAID primary data storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 502 in its storage subsystem 306, and one of skill in the art in possession of the present disclosure will recognize that the parity data 502 may have been generated via an XOR operation performed on the primary data 500a-500c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, and as discussed in some of the examples provided below, the primary/parity data storage configuration illustrated in FIG. 5 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

Figure 6A:
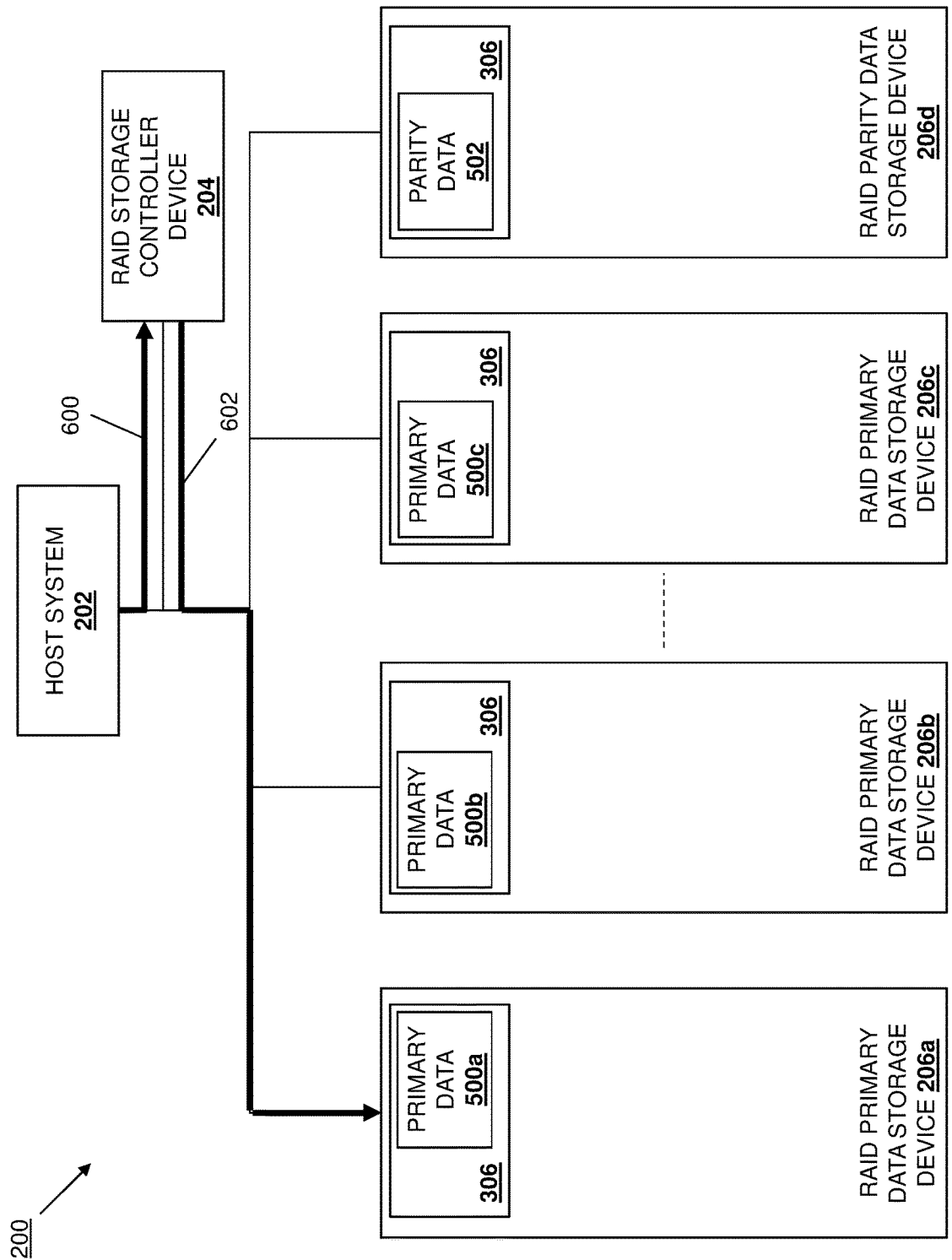
FIG. 6A is a schematic view illustrating an embodiment of the RAID storage system of FIG. 2 operating during the method of FIG. 4.

The method 400 begins at block 402 where RAID primary data storage devices receive respective commands from a RAID storage controller device. In an embodiment, at block 402, the RAID storage controller device 204 may generate and transmit commands to RAID primary data storage devices. With reference to FIG. 6A, the host system 202 may generate a write command 600 that instructs the writing of primary data that is located on the host system 200 to the RAID primary data storage devices 206a-206c, and may transmit that write command 600 to the RAID storage controller device 204. As will be appreciated by one of skill in the art in possession of the present disclosure, the generation and/or transmission of the write command 600 by the host system 202 to the RAID storage controller device 204 at block 402 may include a variety of control plane communications between the host system 202 and the RAID storage controller device 204 that have been omitted for clarity of discussion. As such, at block 402, the RAID storage controller device 204 may receive the write command 600 and, in response to that write command 600, may generate commands and transmit the commands to one or more of the RAID primary data storage devices 206a-c. The discussion below describes the RAID storage controller device 204 transmitting commands that cause data updates on all of the RAID storage devices (e.g., the RAID primary data storage devices 206a-206c and the RAID parity data storage device 206d), otherwise known as a "full stripe write". However, as discussed below, many embodiments of the present disclosure will only perform partial stripe writes (e.g., when the RAID storage controller device 204 transmits commands that cause data updates on only a subset of the RAID storage devices 206a-206d) according to the method 400, and thus at least one (and often more than one) of those commands will not be transmitted in most situations.

Figure 7A:
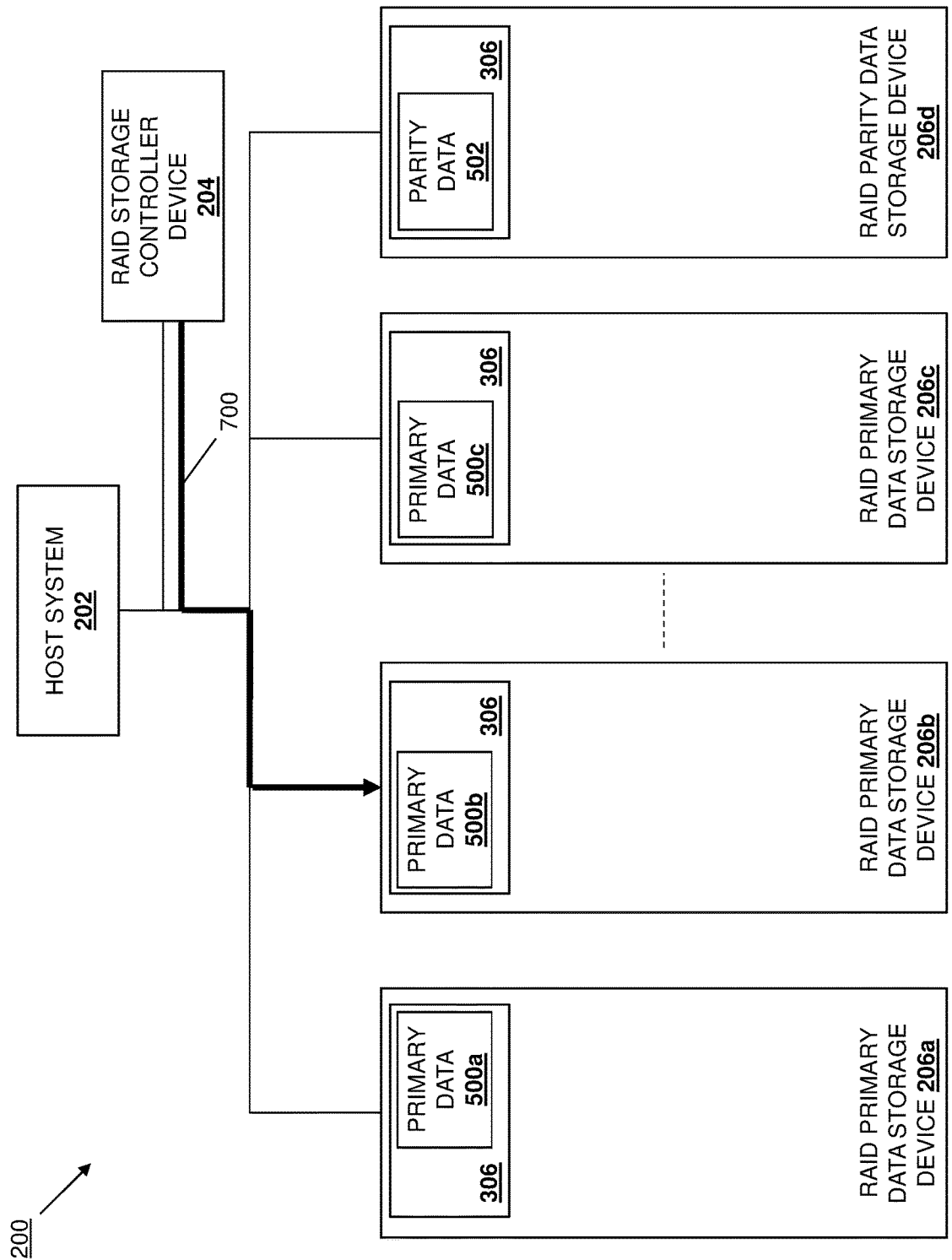
FIG. 7A is a schematic view illustrating an embodiment of the RAID storage system of FIG. 2 operating during the method of FIG. 4.
Figure 8A:
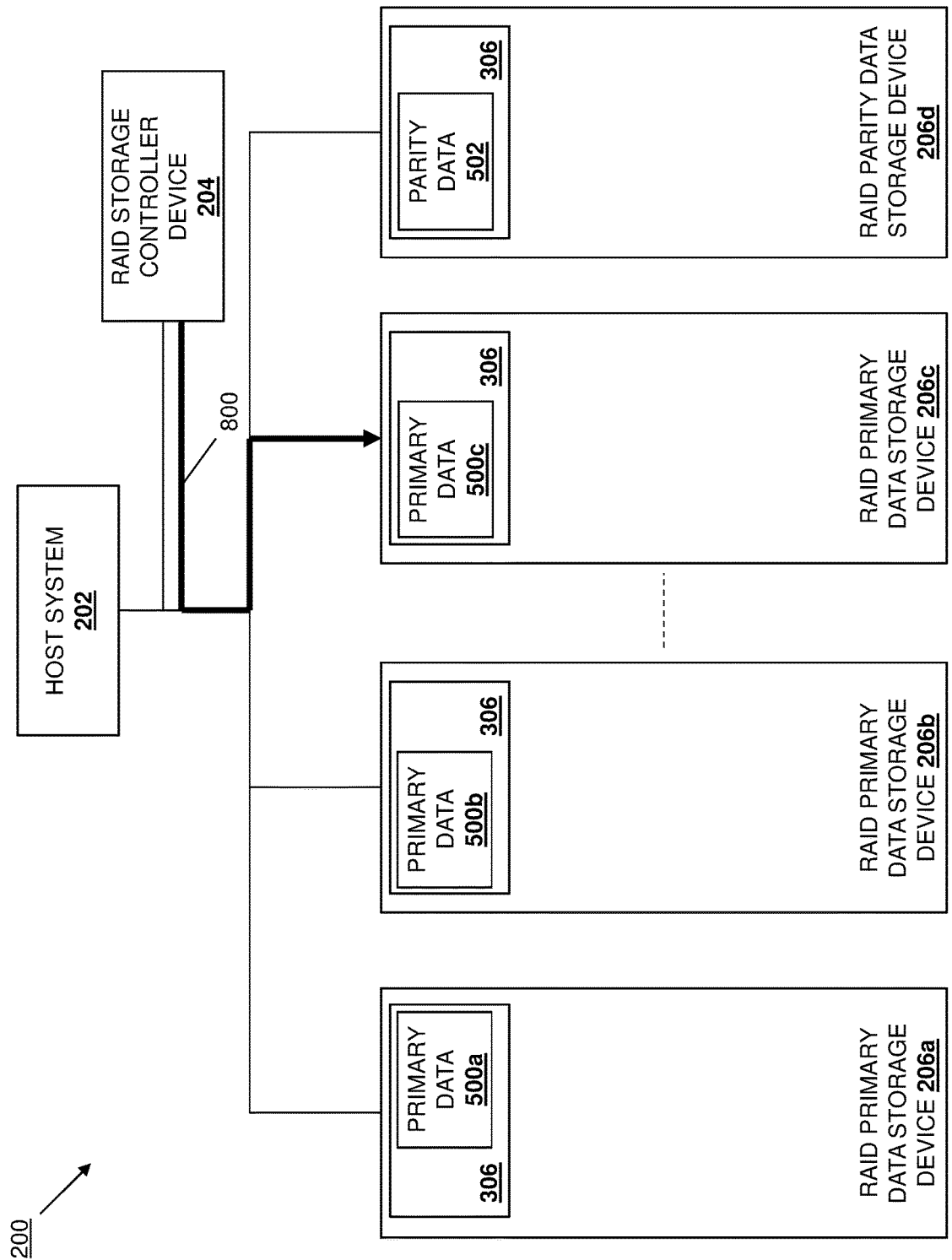
FIG. 8A is a schematic view illustrating an embodiment of the RAID storage system of FIG. 2 operating during the method of FIG. 4.

FIG. 6A illustrates the RAID storage controller device 204 transmitting a command 602 to the RAID primary data storage device 206a, while FIG. 7A illustrates the RAID storage controller device 204 transmitting a command 700 to the RAID primary data storage device 206b, and FIG. 8A illustrates the RAID storage controller device 204 transmitting a command 800 to the RAID primary data storage device 206c. As will be appreciated by one of skill in the art in possession of the present disclosure, the commands 602, 700, and 800 may be transmitted to the RAID primary data storage devices 206a, 206b, and 206c at substantially the same time, although sequentially transmission of the commands 602, 700, and 800 will fall within the scope of the present disclosure as well.

In some embodiments, the commands 602, 700, and 800 may be multi-operation commands like those described in U.S. patent application Ser. No. 16/585,296, filed on Sep. 27, 2019. For example, the commands 602, 700, and 800 may be NVMe WRITE WITH XOR multi-operation commands that are configured to cause the RAID primary data storage devices 206a, 206b, and 206c to perform the multiple operations described below. However, while described as providing multi-operation commands at block 402, one of skill in the art in possession of the present disclosure will recognize that the multiple operations performed by the RAID primary data storage device 206a, 206b, and 206c discussed below may be performed in response to respective commands transmitted by the RAID storage controller device 204 while remaining within the scope of the present disclosure as well. In a specific example, the transmission of the commands 602, 700, and 800 may include the RAID storage controller device 204 providing the commands 602, 700, and 800 in respective submission queues that are included in the communication systems 310 in the RAID primary data storage devices 206a/300, 206b/300, and 206c/300, and then ringing doorbells for the RAID primary data storage devices 206a/300, 206b/300, and 206c/300. However, one of skill in the art in possession of the present disclosure will recognize that the commands 602, 700, and 800 may be provided to the RAID primary data storage devices 206a, 206b, and 206c in a variety of manners that will fall within the scope of the present disclosure as well.

As such, in some examples the respective RAID storage engine 304 in the RAID primary data storage devices 206a/300, 206b/300, and 206c/300 may respond to the ringing of their doorbells by accessing the commands 602, 700, and 800, respectively, in the submission queue in their communication systems 310. In embodiments in which the commands 602, 700, and 800 are multi-operation commands, the respective RAID storage engine 304 in the RAID primary data storage devices 206a/300, 206b/300, and 206c/300 may identify the multiple operations instructed by those commands 602, 700, and 800 (as described in U.S. patent application Ser. No. 16/585,296, filed on Sep. 27, 2019.) However, while all of the RAID primary data storage devices 206a, 206b, and 206c are illustrated and described below as receiving the commands 602, 700, and 800 that cause them to update their primary data 500a, 500b, and 500c, one of skill in the art in possession of the present disclosure will recognize how only a subset of the RAID primary storage devices 206a, 206b, and 206c may receive the commands at block 402 (e.g., when a partial stripe write is being performed as discussed above) while remaining within the scope of the present disclosure as well.

Figure 6B:
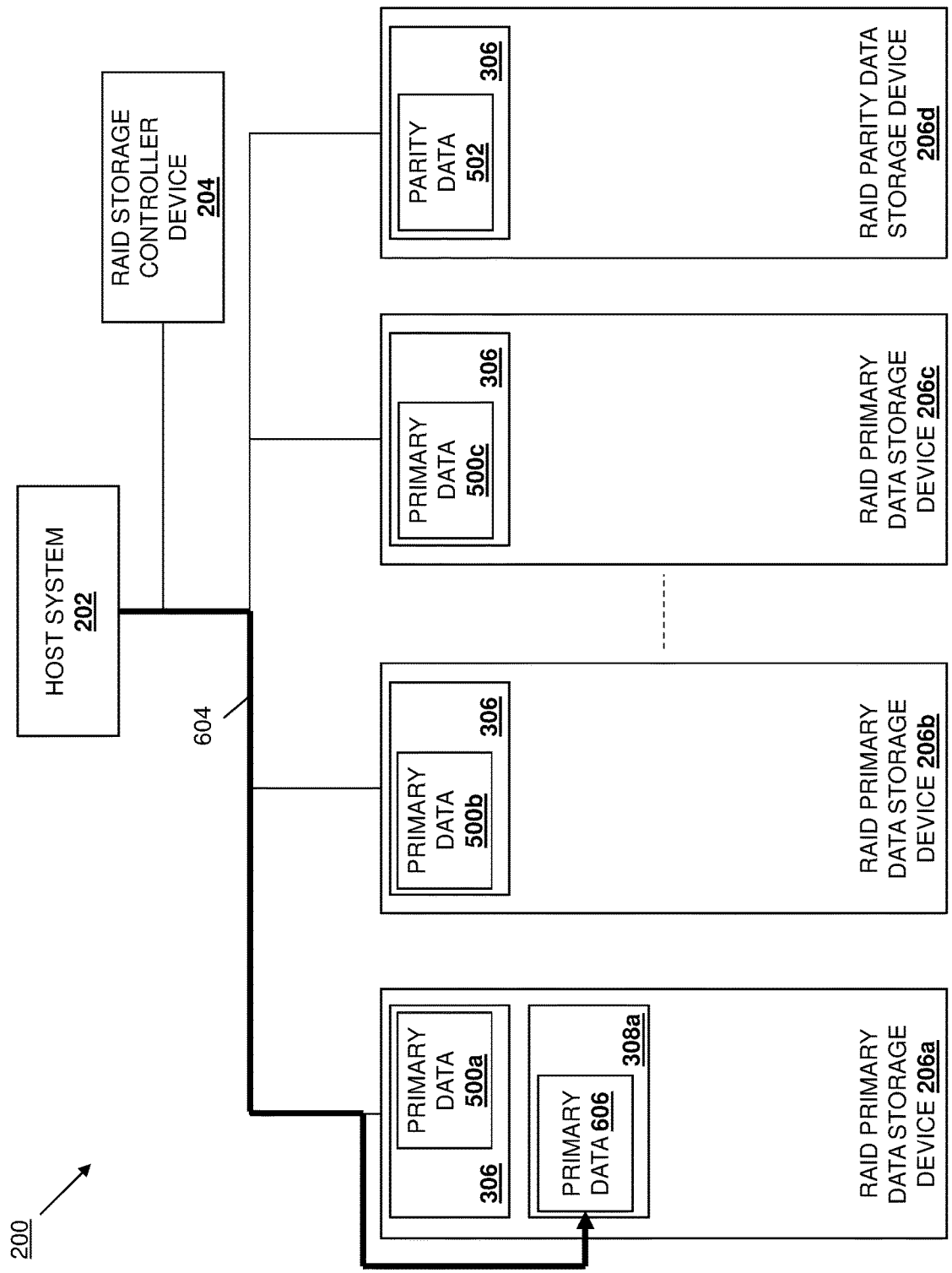
FIG. 6B is a schematic view illustrating an embodiment of the RAID storage system of FIG. 2 operating during the method of FIG. 4.

The method 400 then proceeds to block 404 where the RAID primary data storage devices retrieve respective primary data from a host system. With reference to FIG. 6B, in an embodiment of block 404 and based on the command 602 (which is a multi-operation command as described above in this embodiment), the RAID storage engine 304 in the RAID primary data storage device 206a/300 may operate to perform a Direct Memory Access (DMA) operation 604 that accesses primary data 606 that is stored on the host system 202 (e.g., in a memory system or storage system included on the host system 202) and writes that primary data 606 to its first buffer subsystem 308a (e.g., in a device buffer in the RAID primary data storage device 206a as described in the example above). As will be appreciated by one of skill in the art in possession of the present disclosure, the primary data 606 may be an update to the primary data 500a stored in the storage subsystem 306 in the RAID primary data storage device 206a, although other primary data writing scenarios will fall within the scope of the present disclosure as well. Furthermore, one of skill in the art in possession of the present disclosure will appreciate how the "look-aside" RAID storage controller device configuration of the RAID storage controller device 204 allows the RAID primary storage device 206a direct access to the memory of the host system 202 while relieving the RAID storage controller device 204 of processing required by RAID storage controller devices in conventional RAID storage controller device configurations that place the RAID storage controller device between the RAID primary data storage devices and host systems, as well as processing required by "look-aside" RAID storage controller devices in "look-aside" RAID storage controller device configurations that utilize the "look-aside" RAID storage controller device to perform data transfers, a few examples of which are discussed in further detail below.

Figure 7B:
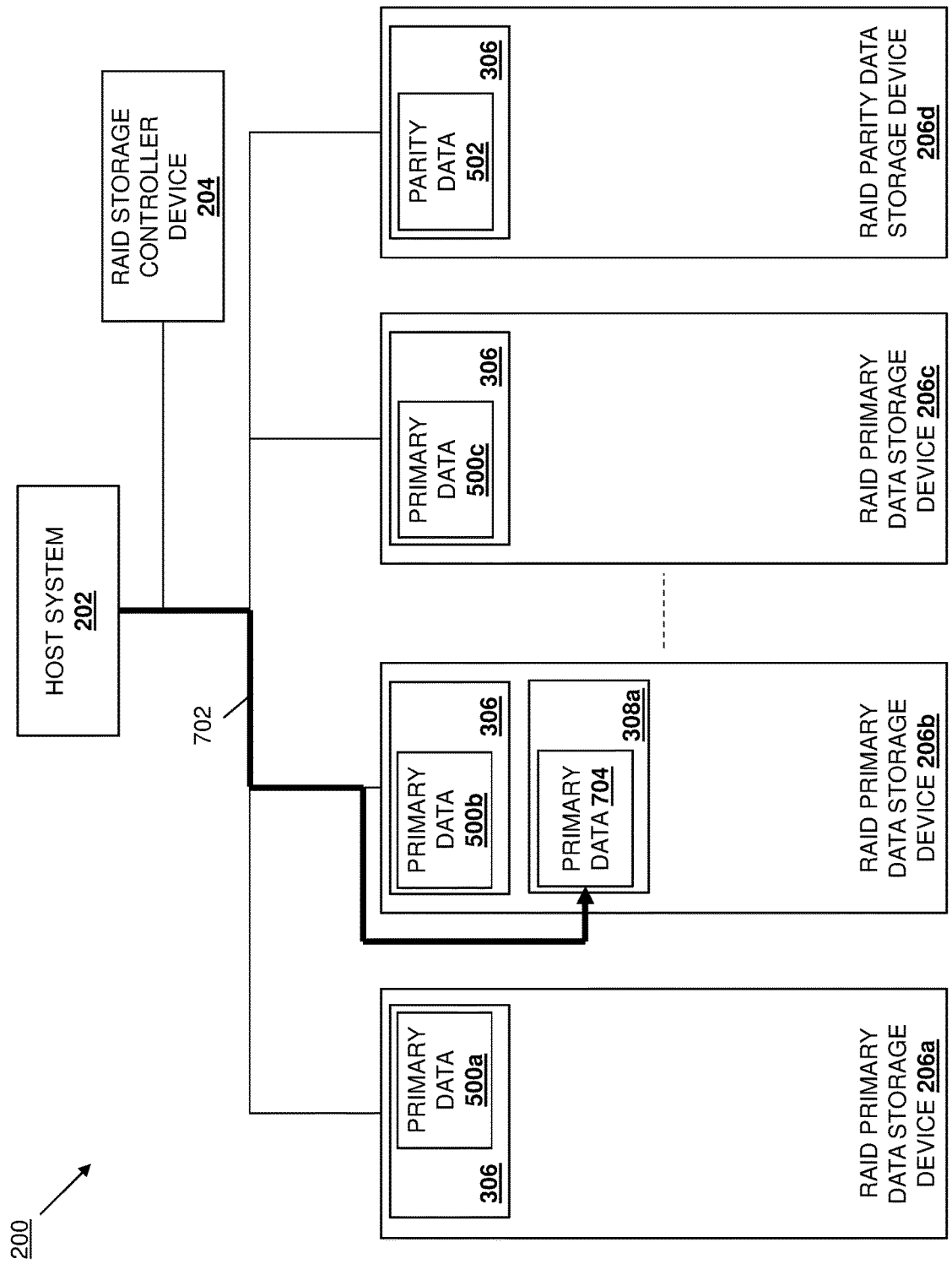
FIG. 7B is a schematic view illustrating an embodiment of the RAID storage system of FIG. 2 operating during the method of FIG. 4.

With reference to FIG. 7B, in an embodiment of block 404 and based on the command 700 (which is a multi-operation command as described above in this embodiment), the RAID storage engine 304 in the RAID primary data storage device 206b/300 may operate to perform a Direct Memory Access (DMA) operation 702 that accesses primary data 704 that is stored on the host system 202 (e.g., in a memory system or storage system included on the host system 202) and writes that primary data 704 to its first buffer subsystem 308a (e.g., in a device buffer in the RAID primary data storage device 206b as described in the example above). As will be appreciated by one of skill in the art in possession of the present disclosure, the primary data 704 may be an update to the primary data 500b stored in the storage subsystem 306 in the RAID primary data storage device 206b, although other primary data writing scenarios will fall within the scope of the present disclosure as well. Furthermore, one of skill in the art in possession of the present disclosure will appreciate how the "look-aside" RAID storage controller device configuration of the RAID storage controller device 204 allows the RAID primary storage device 206b direct access to the memory of the host system 202 while relieving the RAID storage controller device 204 of processing required by RAID storage controller devices in conventional RAID storage controller device configurations that place the RAID storage controller device between the RAID primary data storage devices and host systems, as well as processing required by "look-aside" RAID storage controller devices in "look-aside" RAID storage controller device configurations that utilize the "look-aside" RAID storage controller device to perform data transfers, a few examples of which are discussed in further detail below.

Figure 8B:
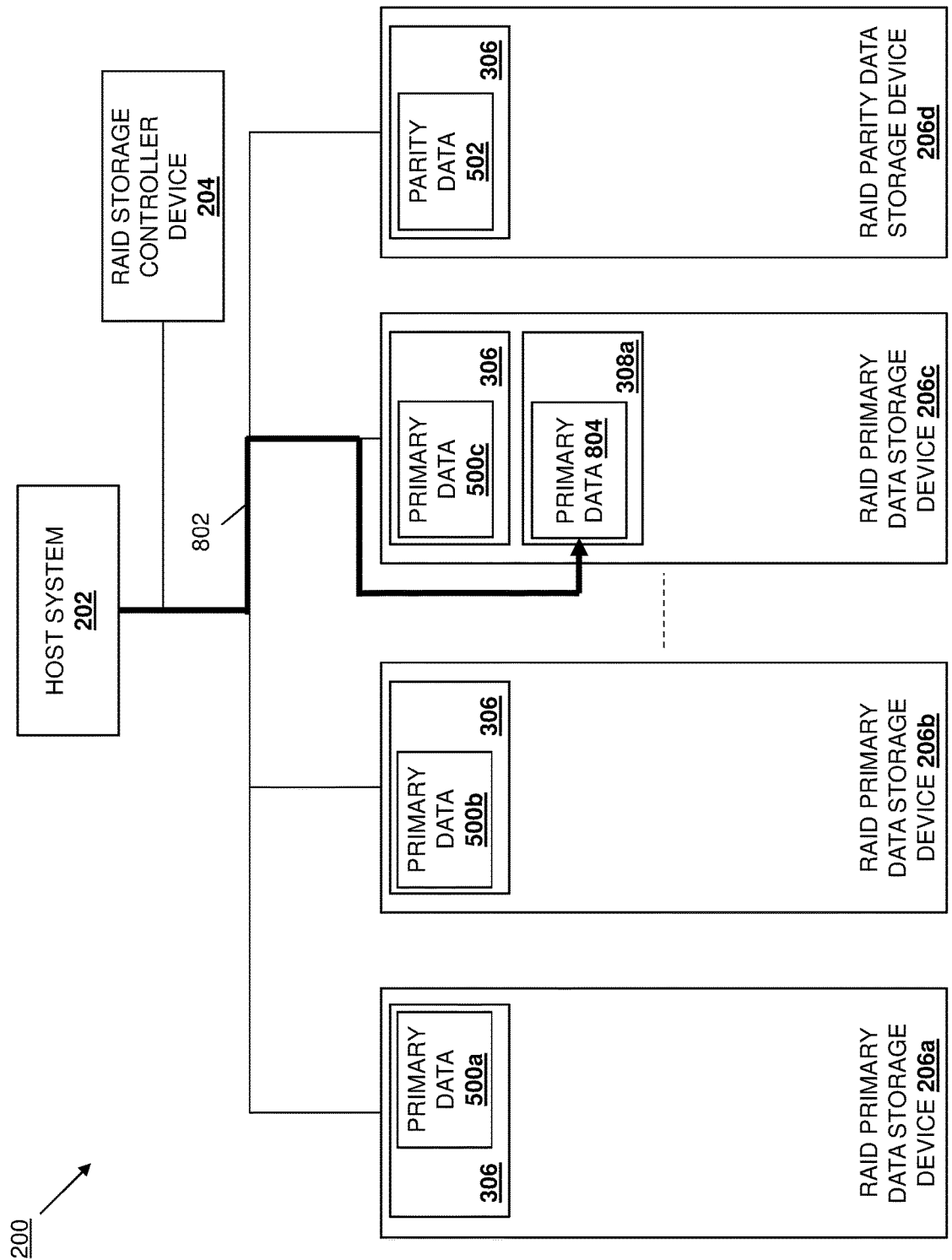
FIG. 8B is a schematic view illustrating an embodiment of the RAID storage system of FIG. 2 operating during the method of FIG. 4.

With reference to FIG. 8B, in an embodiment of block 404 and based on the command 800 (which is a multi-operation command as described above in this embodiment), the RAID storage engine 304 in the RAID primary data storage device 206c/300 may operate to perform a Direct Memory Access (DMA) operation 802 that accesses primary data 804 that is stored on the host system 202 (e.g., in a memory system or storage system included on the host system 202) and writes that primary data 804 to its first buffer subsystem 308a (e.g., in a device buffer in the RAID primary data storage device 206c as described in the example above). As will be appreciated by one of skill in the art in possession of the present disclosure, the primary data 804 may be an update to the primary data 500c stored in the storage subsystem 306 in the RAID primary data storage device 206c, although other primary data writing scenarios will fall within the scope of the present disclosure as well. Furthermore, one of skill in the art in possession of the present disclosure will appreciate how the "look-aside" RAID storage controller device configuration of the RAID storage controller device 204 allows the RAID primary storage device 206c direct access to the memory of the host system 202 while relieving the RAID storage controller device 204 of processing required by RAID storage controller devices in conventional RAID storage controller device configurations that place the RAID storage controller device between the RAID primary data storage devices and host systems, as well as processing required by "look-aside" RAID storage controller devices in "look-aside" RAID storage controller device configurations that utilize the "look-aside" RAID storage controller device to perform data transfers, a few examples of which are discussed in further detail below. As discussed above, the retrieval of the primary data 606, 704, and 804 in the example above describes a full stripe write, and one of skill in the art in possession of the present disclosure will recognize that some of that primary data may not be retrieved in the event a partial stripe write is being performed.

Figure 6C:
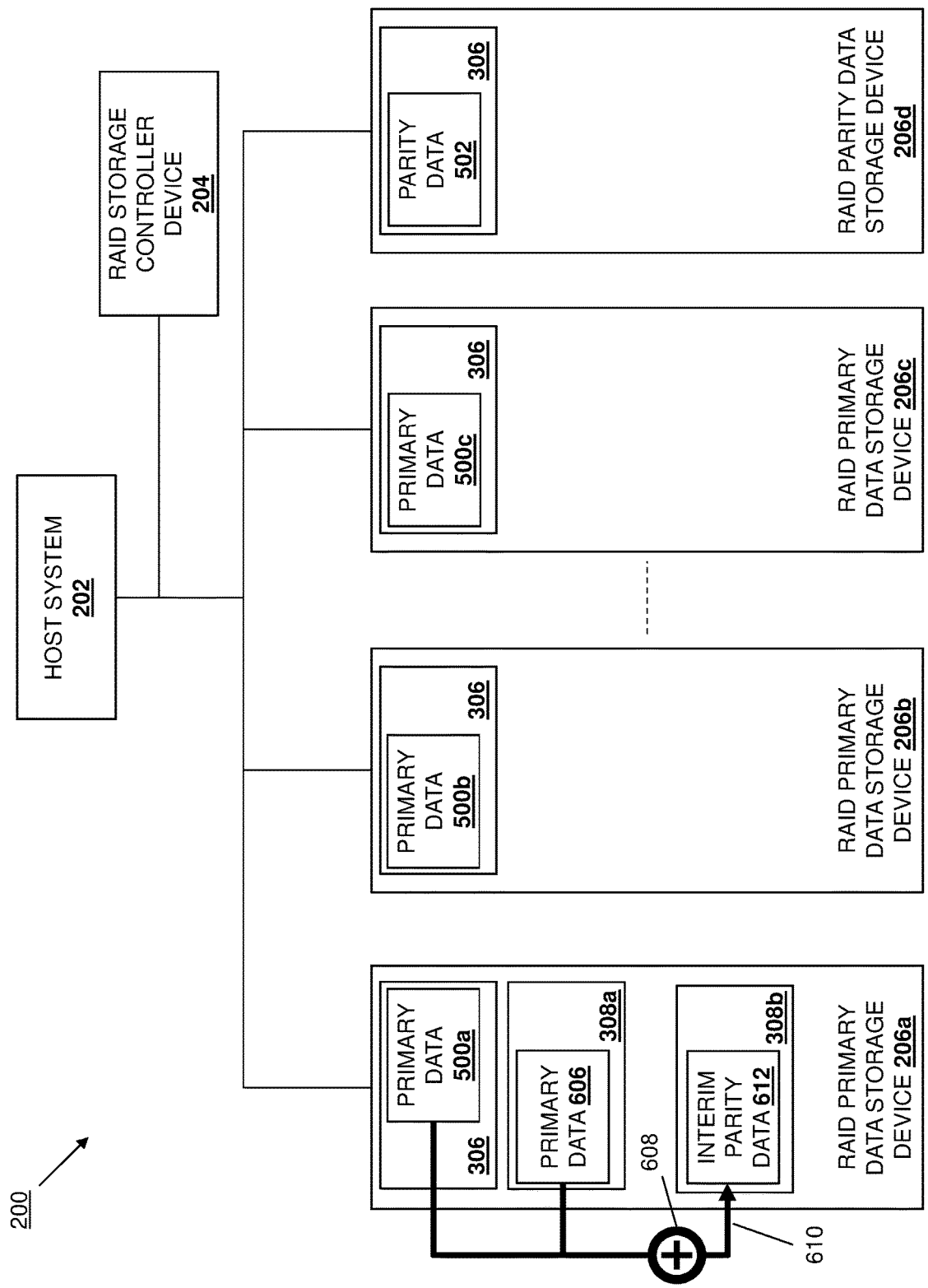
FIG. 6C is a schematic view illustrating an embodiment of the RAID storage system of FIG. 2 operating during the method of FIG. 4.
Figure 6D:
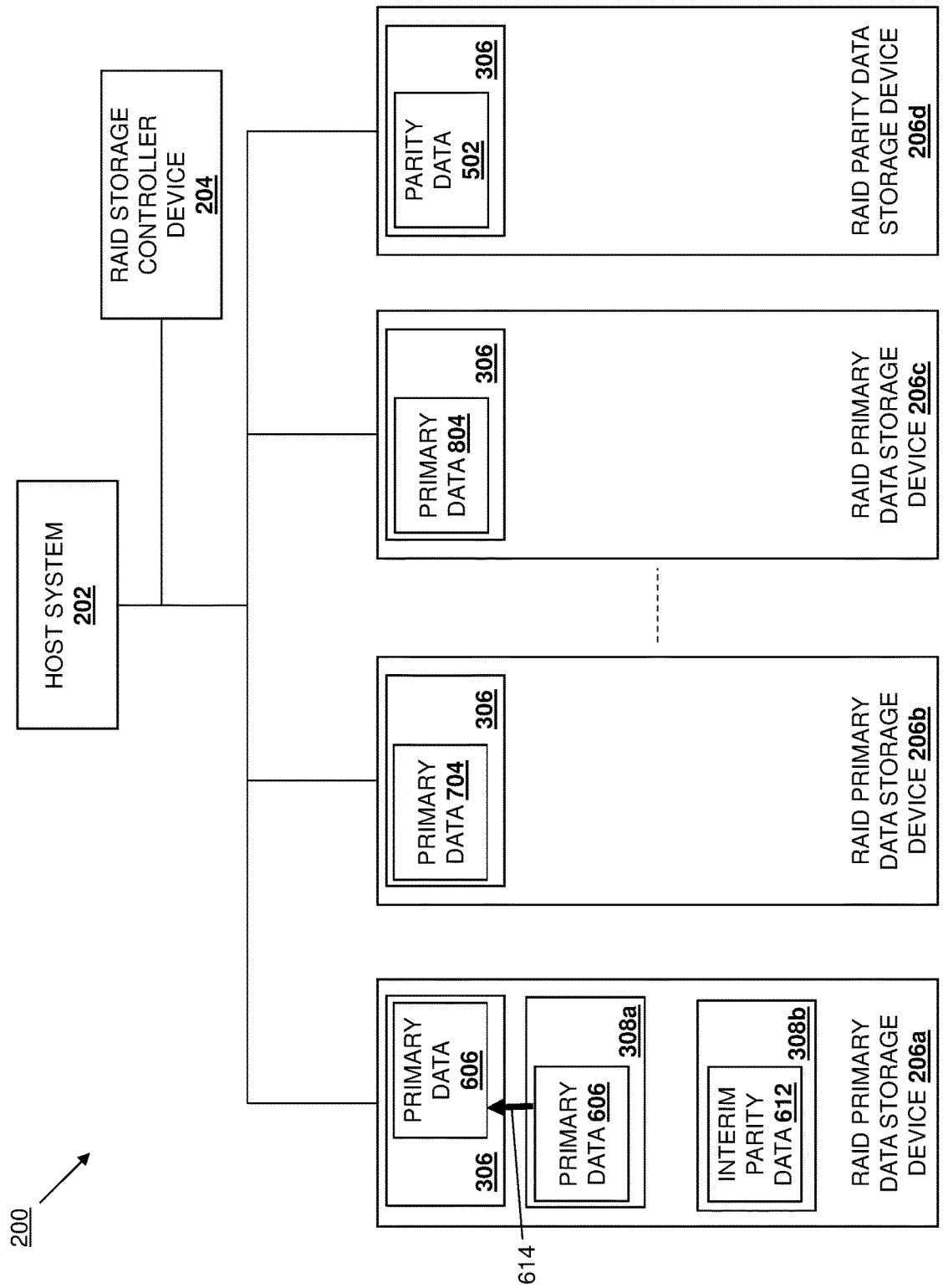
FIG. 6D is a schematic view illustrating an embodiment of the RAID storage system of FIG. 2 operating during the method of FIG. 4.

The method 400 then proceeds to block 406 where the RAID primary data storage devices perform respective XOR operations on respective primary data to produce respective interim parity data, and write the respective interim parity data to their respective buffer subsystems. With reference to FIG. 6C, in an embodiment of block 406 and based on the command 602 (which is a multi-operation command as described above in this embodiment), the RAID storage engine 304 in the RAID primary data storage device 206a/300 may operate to perform an XOR operation 608 using the primary data 500a in its storage subsystem 306 and the primary data 606 in its first buffer subsystem 308a in order to produce interim parity data 612, and then perform a write operation 610 to write that interim parity data 612 to its second buffer subsystem 308b (e.g., a CMB). Further still, FIG. 6D illustrates how the RAID storage engine 304 in the RAID parity data storage device 206a may perform an overwrite operation 614 to overwrite the primary data 500a in its storage subsystem 306 with the primary data 606 in its first buffer subsystem 308a based on the command 602 (which is a multi-operation command as described above in this embodiment), thus updating that primary data stored by the RAID primary data storage device 206a. One of skill in the art in possession of the present disclosure will recognize that the operations of the RAID primary data storage device 206a to produce and store interim parity data, and update primary data, eliminates RAID storage controller device processing associated with conventional RAID storage controller device configurations that place the RAID storage controller device between the RAID primary data storage devices and host systems, and eliminates interim parity data production and storage primary data updating required by "look-aside" RAID storage controller devices in "look-aside" RAID storage controller device configurations that utilize the "look-aside" RAID storage controller device to perform those operations, a few examples of which are discussed in further detail below.

Figure 7C:
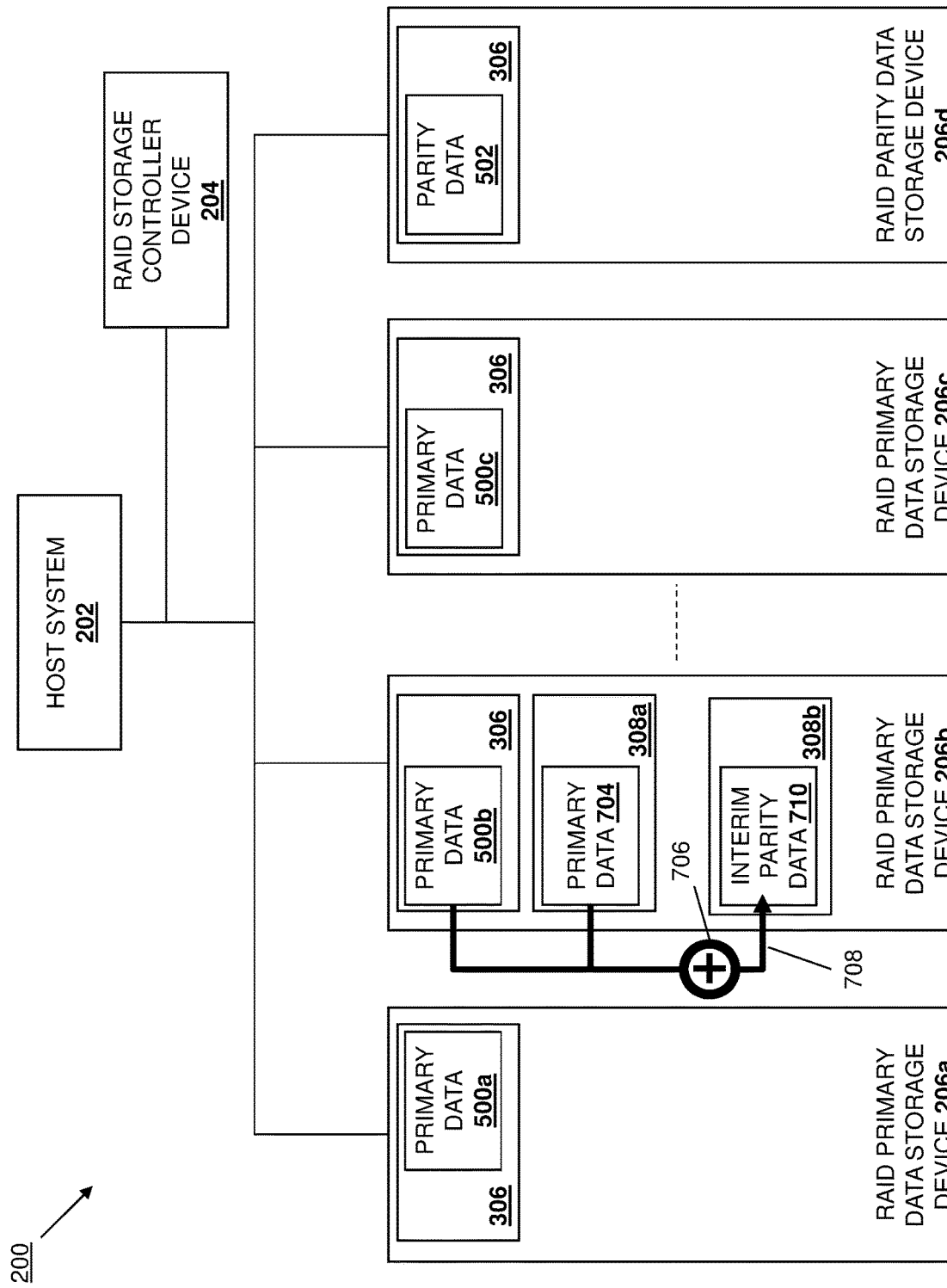
FIG. 7C is a schematic view illustrating an embodiment of the RAID storage system of FIG. 2 operating during the method of FIG. 4.
Figure 7D:
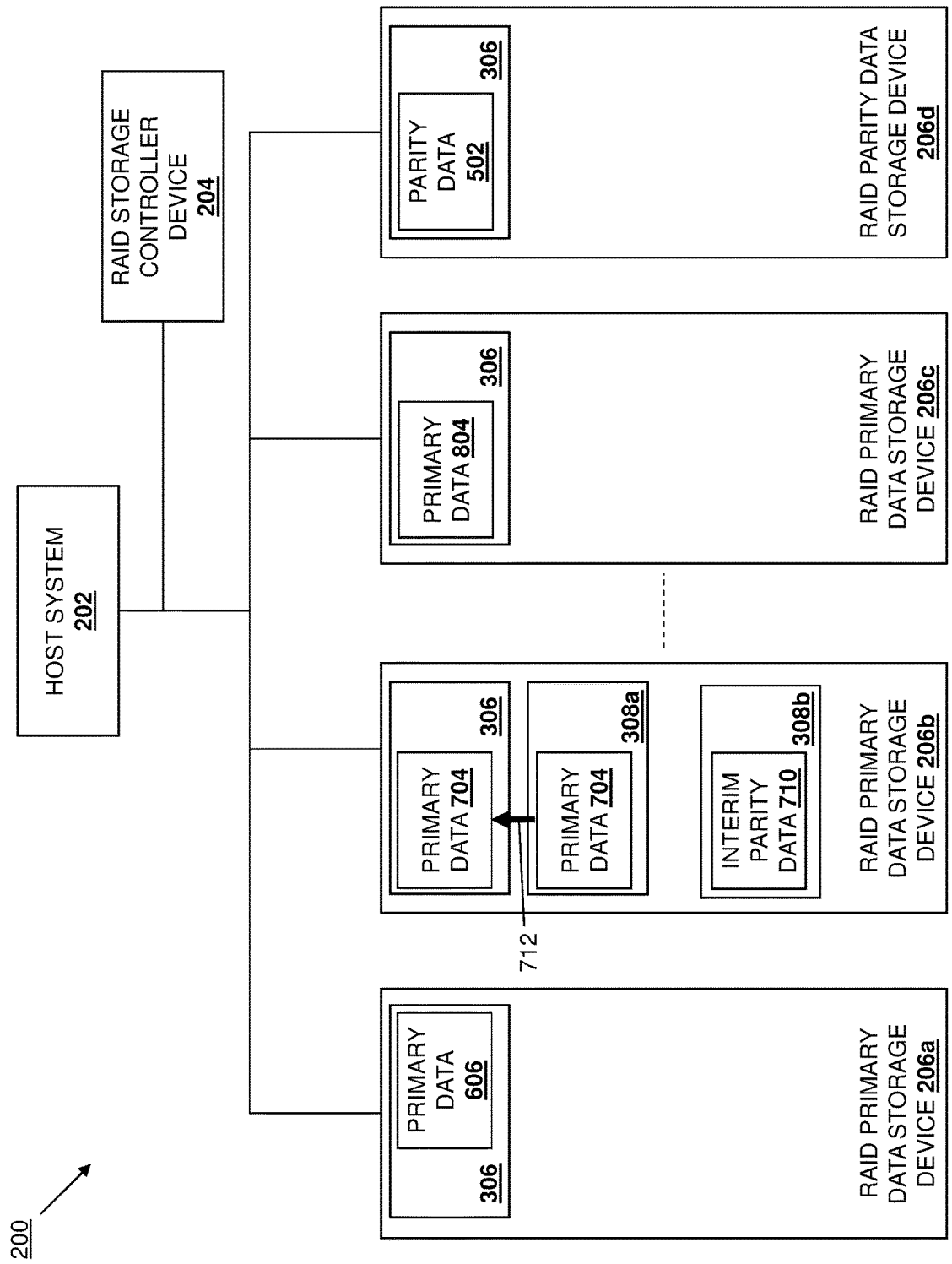
FIG. 7D is a schematic view illustrating an embodiment of the RAID storage system of FIG. 2 operating during the method of FIG. 4.

With reference to FIG. 7C, in an embodiment of block 406 and based on the command 700 (which is a multi-operation command as described above in this embodiment), the RAID storage engine 304 in the RAID primary data storage device 206b/300 may operate to perform an XOR operation 706 using the primary data 500b in its storage subsystem 306 and the primary data 704 in its first buffer subsystem 308a in order to produce interim parity data 710, and then perform a write operation 708 to write that interim parity data 710 to its second buffer subsystem 308b (e.g., a CMB). Further still, FIG. 7D illustrates how the RAID storage engine 304 in the RAID parity data storage device 206b may perform an overwrite operation 712 to overwrite the primary data 500b in its storage subsystem 306 with the primary data 704 in its first buffer subsystem 308a based on the command 700 (which is a multi-operation command as described above in this embodiment), thus updating that primary data stored by the RAID primary data storage device 206b. One of skill in the art in possession of the present disclosure will recognize that the operations of the RAID primary data storage device 206ab to produce and store interim parity data, and update primary data, eliminates RAID storage controller device processing associated with conventional RAID storage controller device configurations that place the RAID storage controller device between the RAID primary data storage devices and host systems, and eliminates interim parity data production and storage primary data updating required by "look-aside" RAID storage controller devices in "look-aside" RAID storage controller device configurations that utilize the "look-aside" RAID storage controller device to perform those operations, a few examples of which are discussed in further detail below.

Figure 7E:
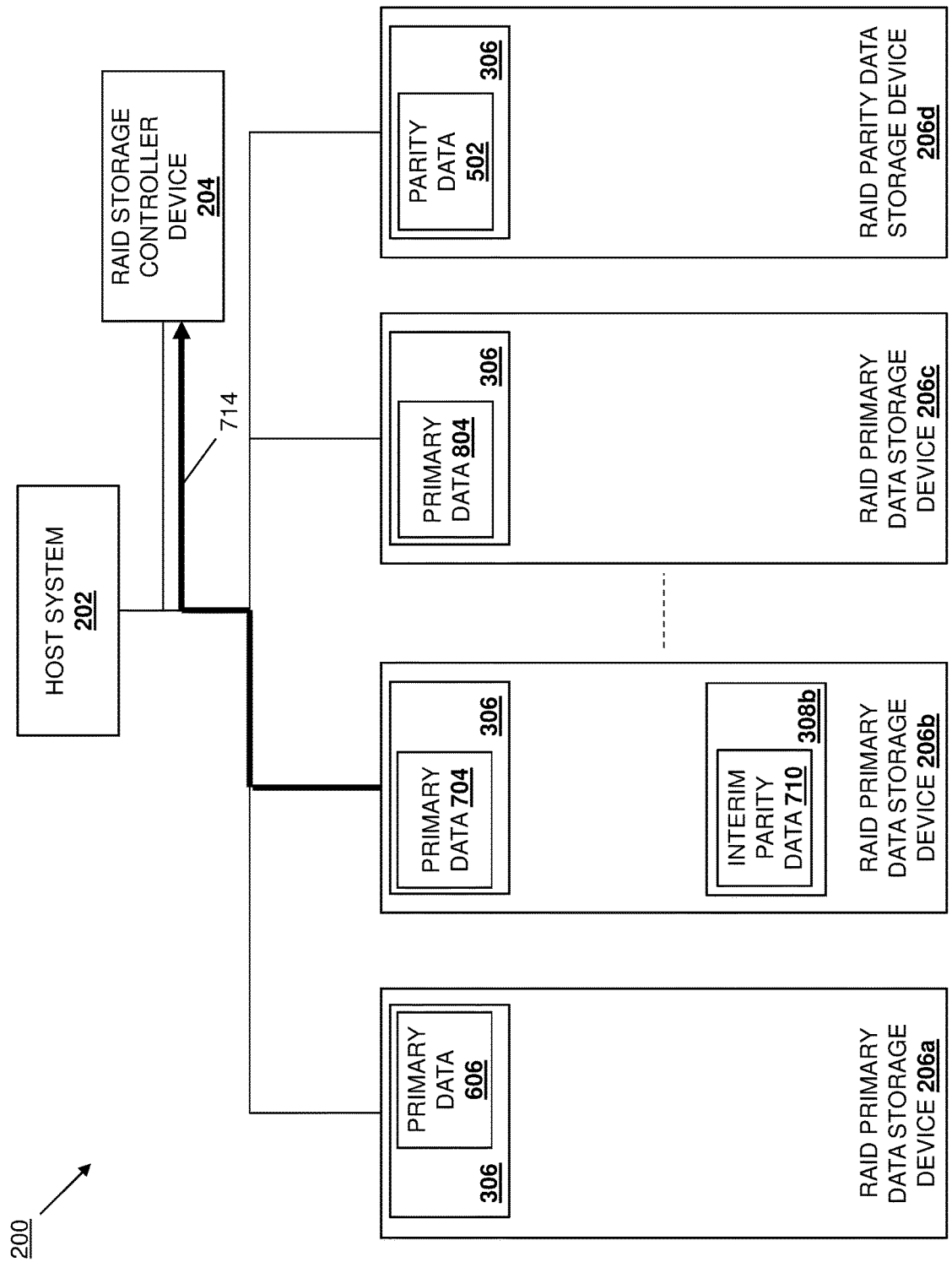
FIG. 7E is a schematic view illustrating an embodiment of the RAID storage system of FIG. 2 operating during the method of FIG. 4.
Figure 8C:
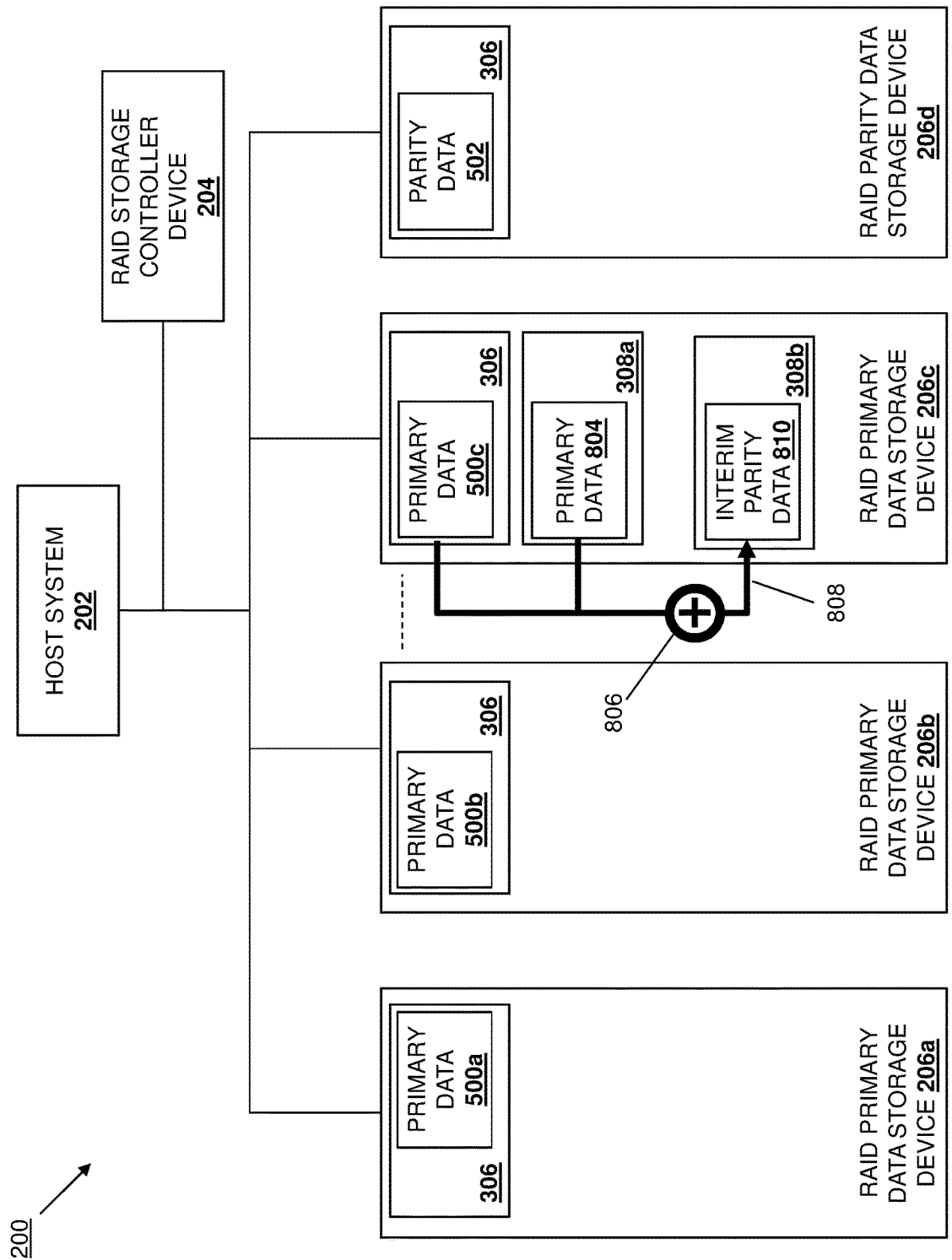
FIG. 8C is a schematic view illustrating an embodiment of the RAID storage system of FIG. 2 operating during the method of FIG. 4.
Figure 8D:
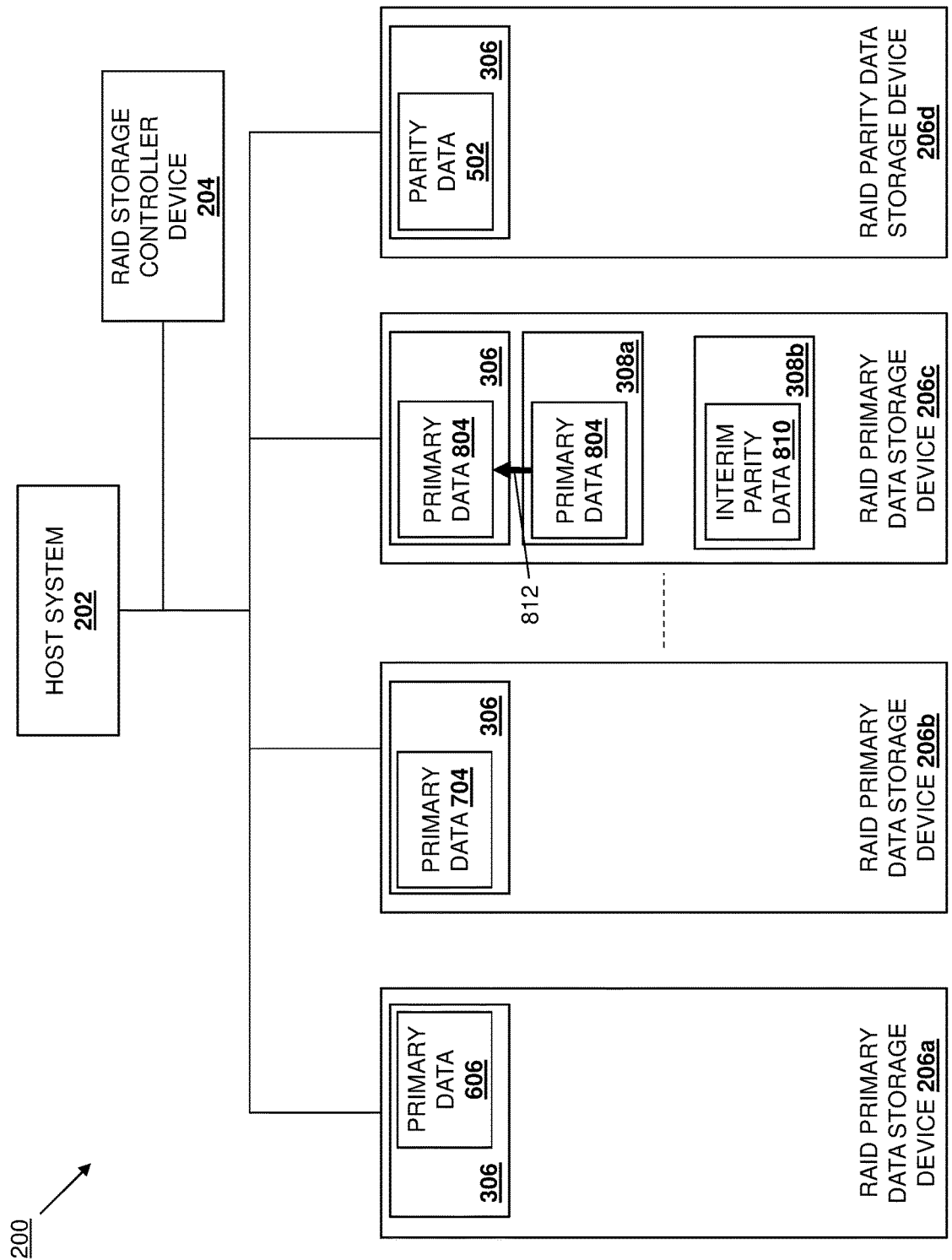
FIG. 8D is a schematic view illustrating an embodiment of the RAID storage system of FIG. 2 operating during the method of FIG. 4.

With reference to FIG. 8C, in an embodiment of block 406 and based on the command 800 (which is a multi-operation command as described above in this embodiment), the RAID storage engine 304 in the RAID primary data storage device 206c/300 may operate to perform an XOR operation 806 using the primary data 500c in its storage subsystem 306 and the primary data 804 in its first buffer subsystem 308a in order to produce interim parity data 810, and then perform an overwrite operation 808 to write that interim parity data 810 to its second buffer subsystem 308b (e.g., a CMB). Further still, FIG. 8D illustrates how the RAID storage engine 304 in the RAID parity data storage device 206c may perform an overwrite operation 812 to overwrite the primary data 500c in its storage subsystem 306 with the primary data 804 in its first buffer subsystem 308a based on the command 800 (which is a multi-operation command as described above in this embodiment), thus updating that primary data stored by the RAID primary data storage device 206c. One of skill in the art in possession of the present disclosure will recognize that the operations of the RAID primary data storage device 206c to produce and store interim parity data, and update primary data, eliminates RAID storage controller device processing associated with conventional RAID storage controller device configurations that place the RAID storage controller device between the RAID primary data storage devices and host systems, and eliminates interim parity data production and storage primary data updating required by "look-aside" RAID storage controller devices in "look-aside" RAID storage controller device configurations that utilize the "look-aside" RAID storage controller device to perform those operations, a few examples of which are discussed in further detail below. As will be appreciated by one of skill in the art in possession of the present disclosure, any of the commands 602, 700, and 800 may be executed by the respective RAID primary data storage devices 206a, 206b and 206c in parallel, simultaneously, and/or at substantially the same time (as illustrated by the updated primary data 606, 704, and 804 in each of the RAID primary data storage devices 206a, 206b and 206c in FIGS. 6D, 6E, 7D, 7E, 8D, and 8E), although sequential execution of any of the commands 602, 700, and 800 by the respective RAID primary data storage devices 206a, 206b, and 206c will fall within the scope of the present disclosure as well.

Figure 6E:
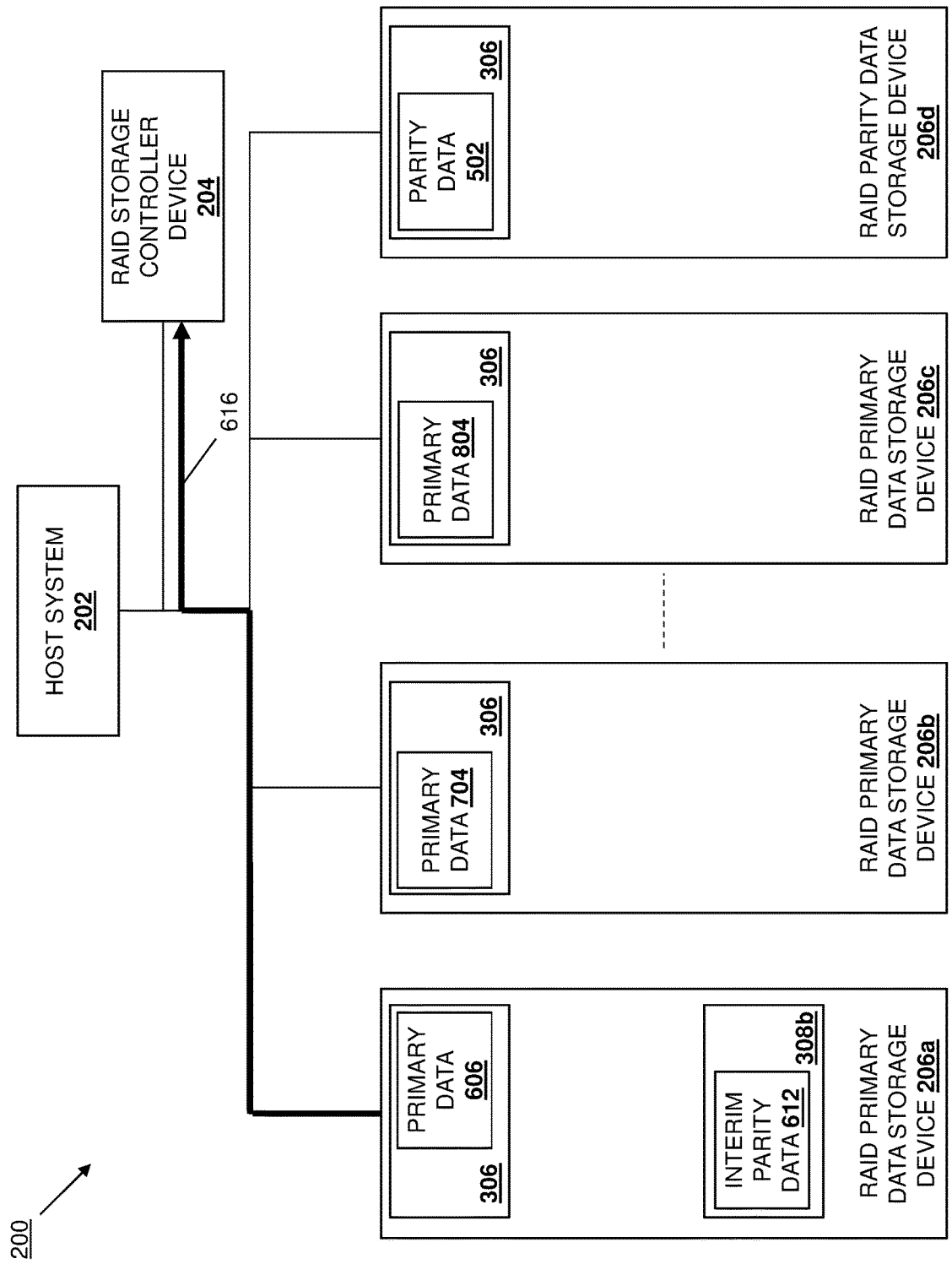
FIG. 6E is a schematic view illustrating an embodiment of the RAID storage system of FIG. 2 operating during the method of FIG. 4.

With reference to FIG. 6E, following completion of the operations associated with the command 602 (e.g., multiple operations associated with a multi-operation command as discussed above, following each operation associated with respective commands, etc.) the RAID storage engine 304 in the RAID primary data storage device 206a/300 may generate and transmit a completion message 616 to the RAID storage controller device 204. For example, the RAID storage engine 304 in the RAID primary data storage device 206a/300 may generate the completion message 616 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Similarly, with reference to FIG. 7E, following completion of the operations associated with the command 700 (e.g., multiple operations associated with a multi-operation command as discussed above, following each operation associated with respective commands, etc.) the RAID storage engine 304 in the RAID primary data storage device 206b/300 may generate and transmit a completion message 714 to the RAID storage controller device 204. For example, the RAID storage engine 304 in the RAID primary data storage device 206b/300 may generate the completion message 714 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Figure 8E:
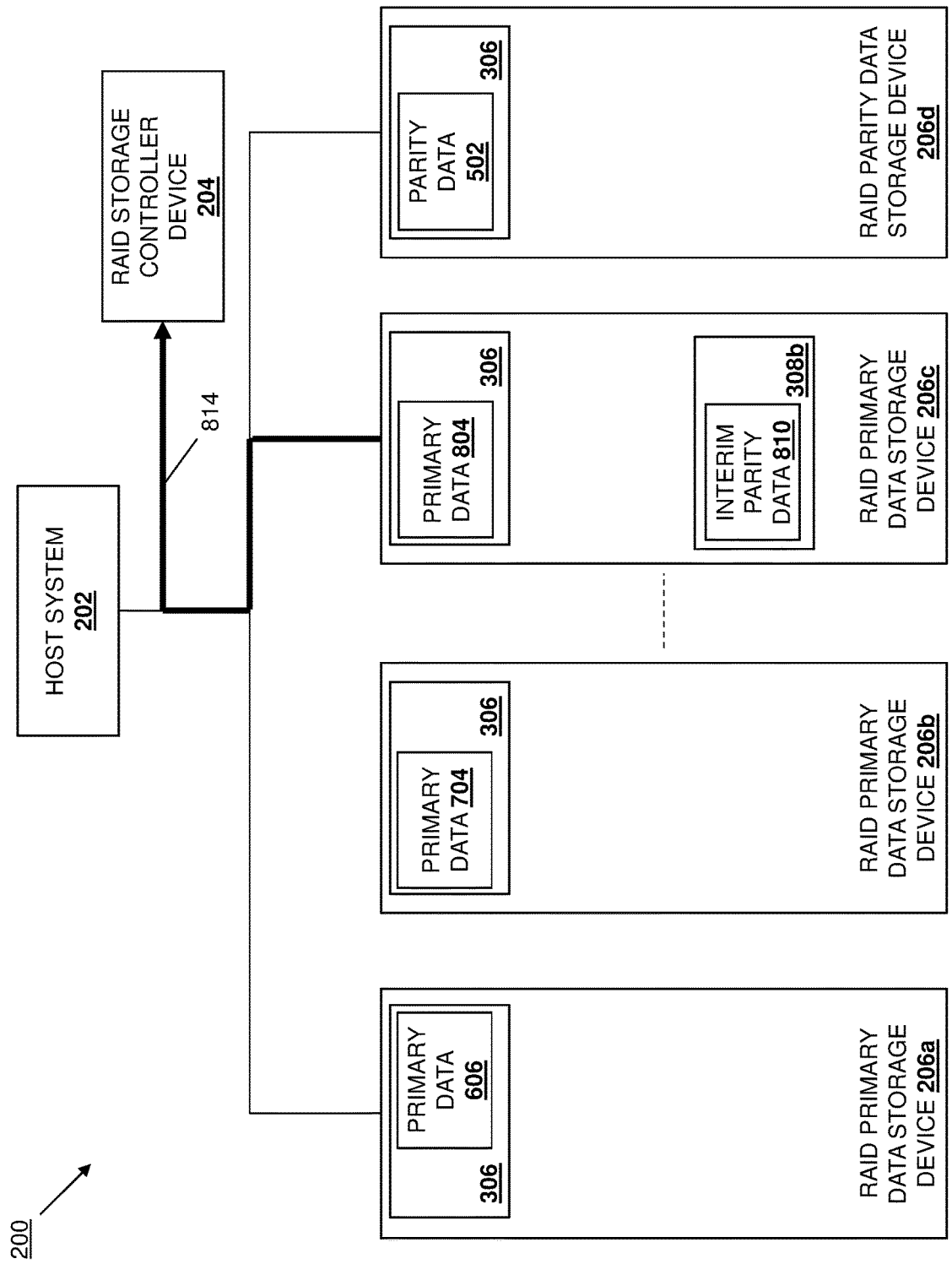
FIG. 8E is a schematic view illustrating an embodiment of the RAID storage system of FIG. 2 operating during the method of FIG. 4.

Similarly, with reference to FIG. 8E, following completion of the operations associated with the command 800 (e.g., multiple operations associated with a multi-operation command as discussed above, following each operation associated with respective commands, etc.) the RAID storage engine 304 in the RAID primary data storage device 206c/300 may generate and transmit a completion message 814 to the RAID storage controller device 204. For example, the RAID storage engine 304 in the RAID primary data storage device 206c/300 may generate the completion message 814 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, the RAID storage controller device 204 may wait to receive completion messages from each RAID primary data storage device experiencing an update prior to proceeding with the method 400. As discussed above, the XOR operations, overwrite operations, and completion messages provided in the example above describes a full stripe write, and one of skill in the art in possession of the present disclosure will recognize that some of those XOR operations, overwrite operations, and completion messages may not be performed (by any particular RAID primary data storage device not experiencing a data update) in the event a partial stripe write is being performed.

Figure 9A:
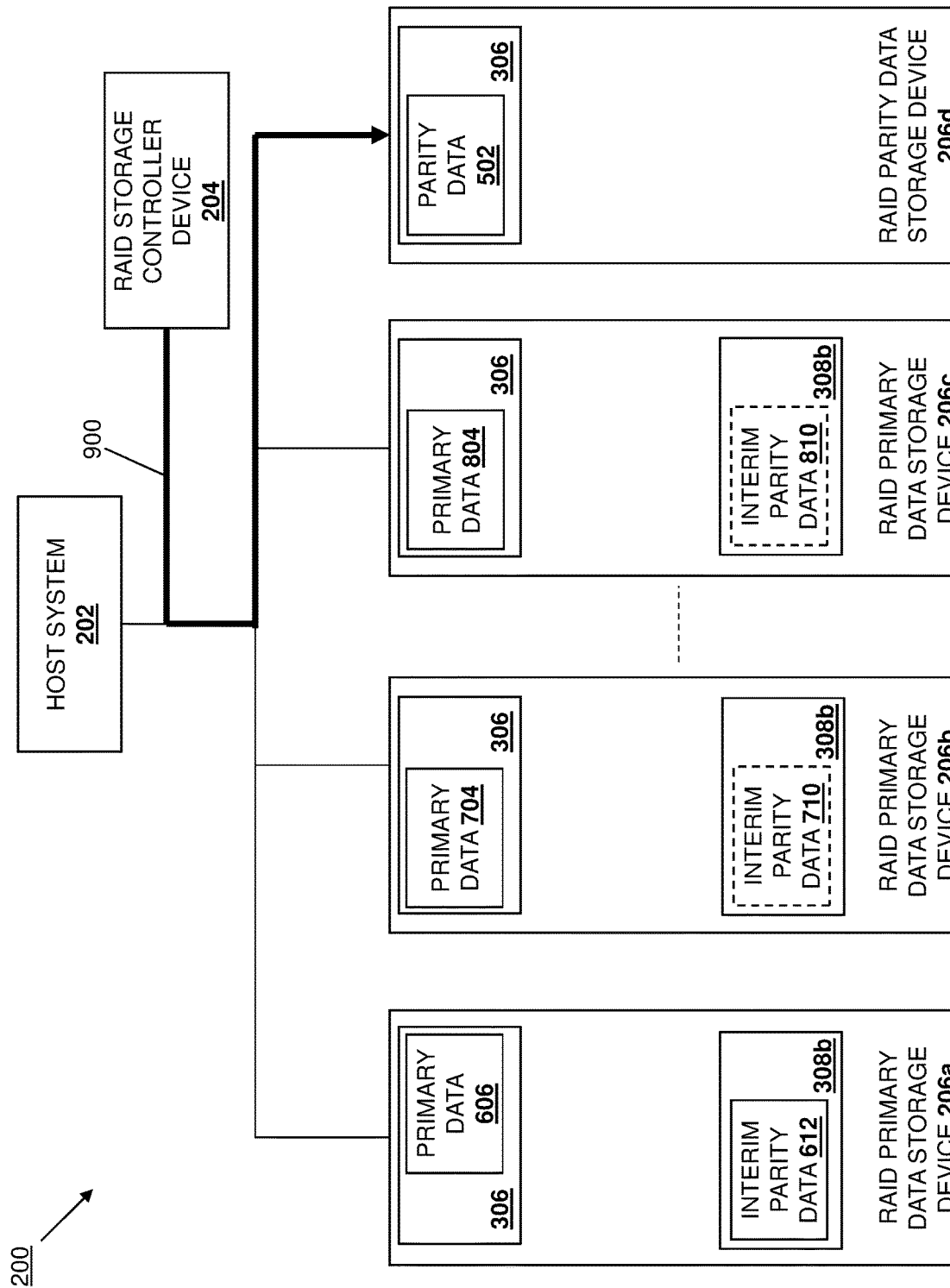
FIG. 9A is a schematic view illustrating an embodiment of the storage of data in a RAID storage system.

The method 400 then proceeds to block 408 where the RAID parity data storage device receives a command from the RAID storage controller device. In an embodiment, at block 408, the RAID storage controller device 204 may generate and transmit a command to a RAID parity data storage device. For example, and as discussed above, the RAID storage controller device 204 may determine that completion messages from each RAID primary data storage device experiencing an update have been received as discussed above and, in response, at block 408 the RAID storage controller device 204 may generate a command 900 and transmit the command 900 to the RAID parity data storage device 206d, as illustrated in FIG. 9A.

Similarly as discussed above, the command 900 may be a multi-operation command like those described in U.S. patent application Ser. No. 16/585,296, filed on Sep. 27, 2019. For example, the command 900 may be an NVMe WRITE PARITY multi-operation command that is configured to cause the RAID parity data storage device 206d to perform the multiple operations described below. However, while described as providing a multi-operation command at block 408, one of skill in the art in possession of the present disclosure will recognize that the multiple operations performed by the RAID parity data storage device 206d discussed below may be performed in response to respective commands transmitted by the RAID storage controller device 204 while remaining within the scope of the present disclosure as well. In a specific example, the transmission of the command 900 may include the RAID storage controller device 204 providing the command 900 in a submission queue that is included in the communication system 310 in the RAID parity data storage device 206d/300, and then ringing a doorbell for the RAID parity data storage device 206d/300. However, one of skill in the art in possession of the present disclosure will recognize that the command 900 may be provided to the RAID parity data storage device 206d in a variety of manners that will fall within the scope of the present disclosure as well.

As such, in some examples the RAID storage engine 304 in the RAID parity data storage device 206d/300 may respond to the ringing of its doorbell by accessing the command 900 in the submission queue in its communication system 310. In embodiments in which the command 900 is a multi-operation command, the RAID storage engine 304 in the RAID parity data storage device 206d/300 may identify the multiple operations instructed by that command 900 (as described in U.S. patent application Ser. No. 16/585,296, filed on Sep. 27, 2019.)

The method 400 then proceeds to block 410 where the RAID parity data storage device retrieves respective interim parity data from respective RAID primary data storage devices. With reference to FIGS. 9A-9E, the interim parity data 612 discussed above is illustrated in solid lines, while the interim parity data 710 and 810 are illustrated in dashed lines, which is intended to indicate how at least some of the interim parity data discussed above may not be produced by a RAID primary data storage device that does not experience a primary data update during the method 400 (i.e., in the partial stripe write situations discussed above). As such, FIGS. 9A-9E indicate that the RAID primary data storage device 206a has experienced a primary data update and produced the interim parity data 612, while the RAID primary data storage devices 206b and 206c may or may not have experienced a primary data update and thus may or may not have produced their associated interim parity data 710 and 810. However, one of skill in the art in possession of the present disclosure will appreciate that any subset of the RAID primary data storage devices 206a-206c may experience a primary data update and may produce corresponding interim parity data while remaining within the scope of the present disclosure as well.

Figure 9B:
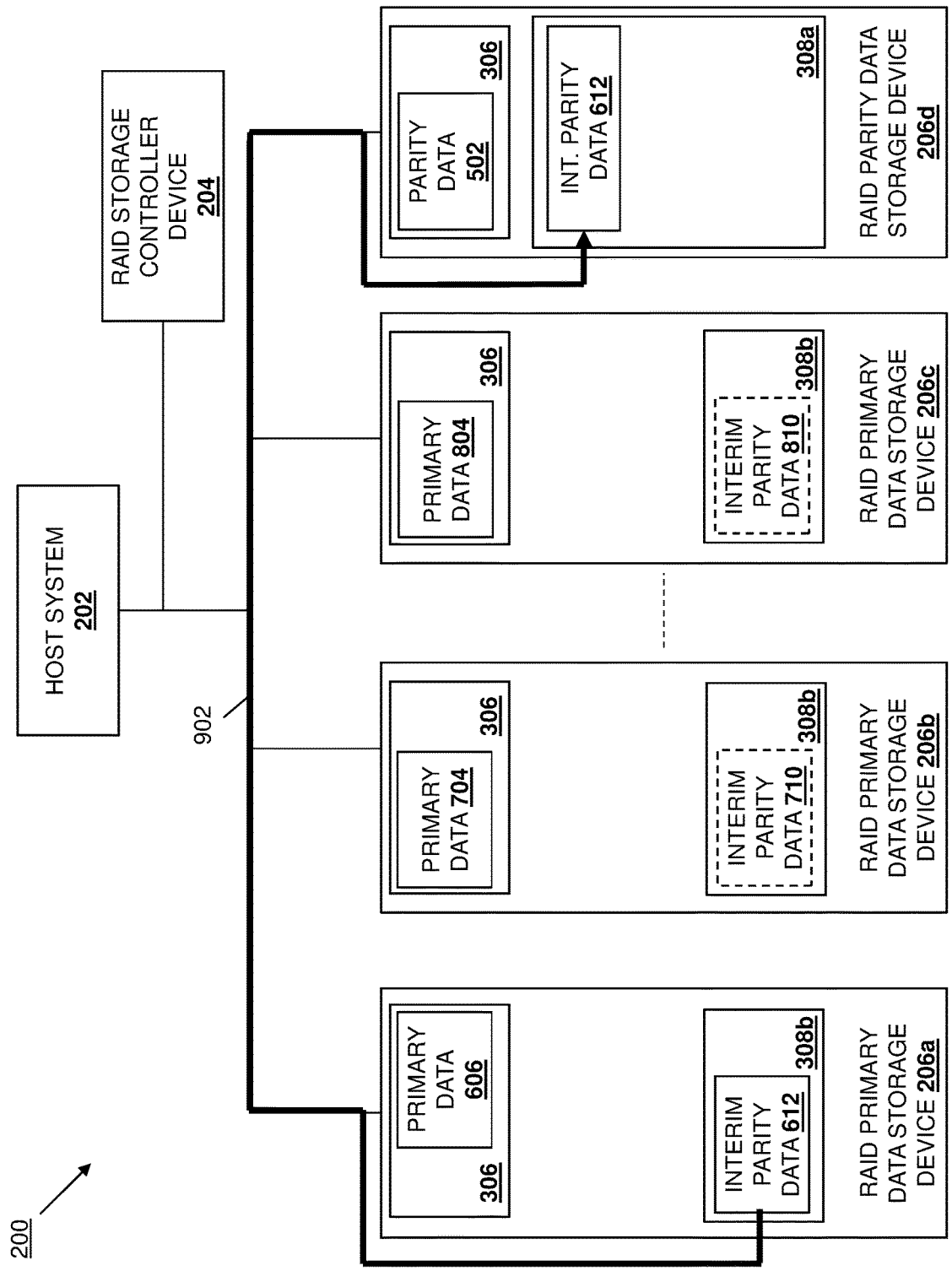
FIG. 9B is a schematic view illustrating an embodiment of the RAID storage system of FIG. 9A during the method of FIG. 4.
Figure 9C:
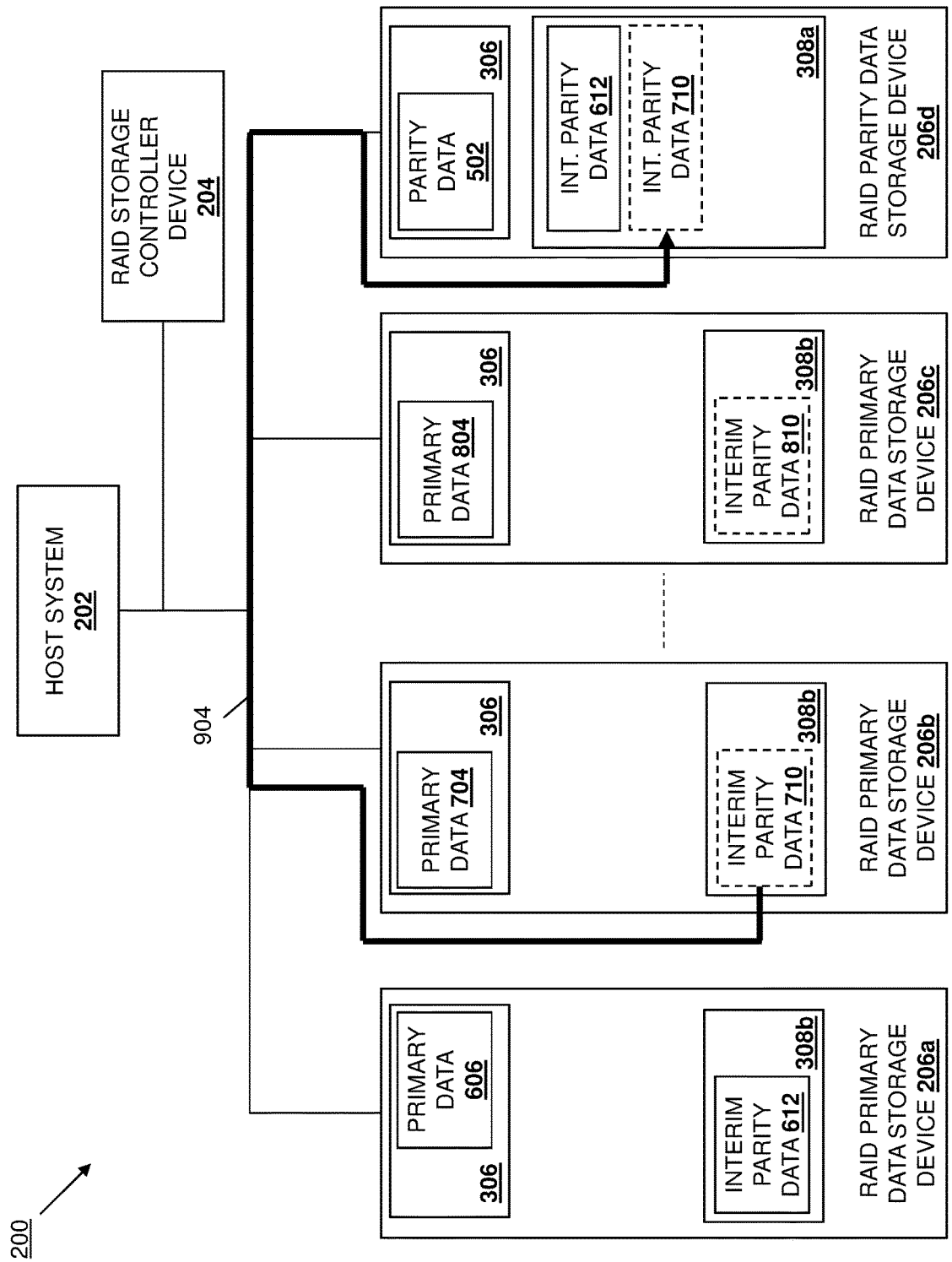
FIG. 9C is a schematic view illustrating an embodiment of the RAID storage system of FIG. 2 operating during the method of FIG. 4.

With reference to FIG. 9B, in an embodiment of block 410 and based on the command 900 (which is a multi-operation command as described above in this embodiment), the RAID storage engine 304 in the RAID parity data storage device 206d/300 may operate to perform a DMA operation 902 to retrieve the interim parity data 612 from the second buffer subsystem 308b in the RAID primary data storage device 206a, and write that interim parity data 612 to its first buffer subsystem 308a (e.g., in a device buffer in the RAID parity data storage device 206d as described in the example above). With reference to FIG. 9C, in an embodiment of block 410 and based on the command 900 (which is a multi-operation command as described above in this embodiment), the RAID storage engine 304 in the RAID parity data storage device 206d/300 may operate to perform a DMA operation 904 to retrieve the interim parity data 710 from the second buffer subsystem 308b in the RAID primary data storage device 206b, and write that interim parity data 710 to its first buffer subsystem 308a (e.g., in a device buffer in the RAID parity data storage device 206d as described in the example above) in situations in which the RAID primary data storage device 206b has experienced a primary data update and produced interim parity data.

Figure 9D:
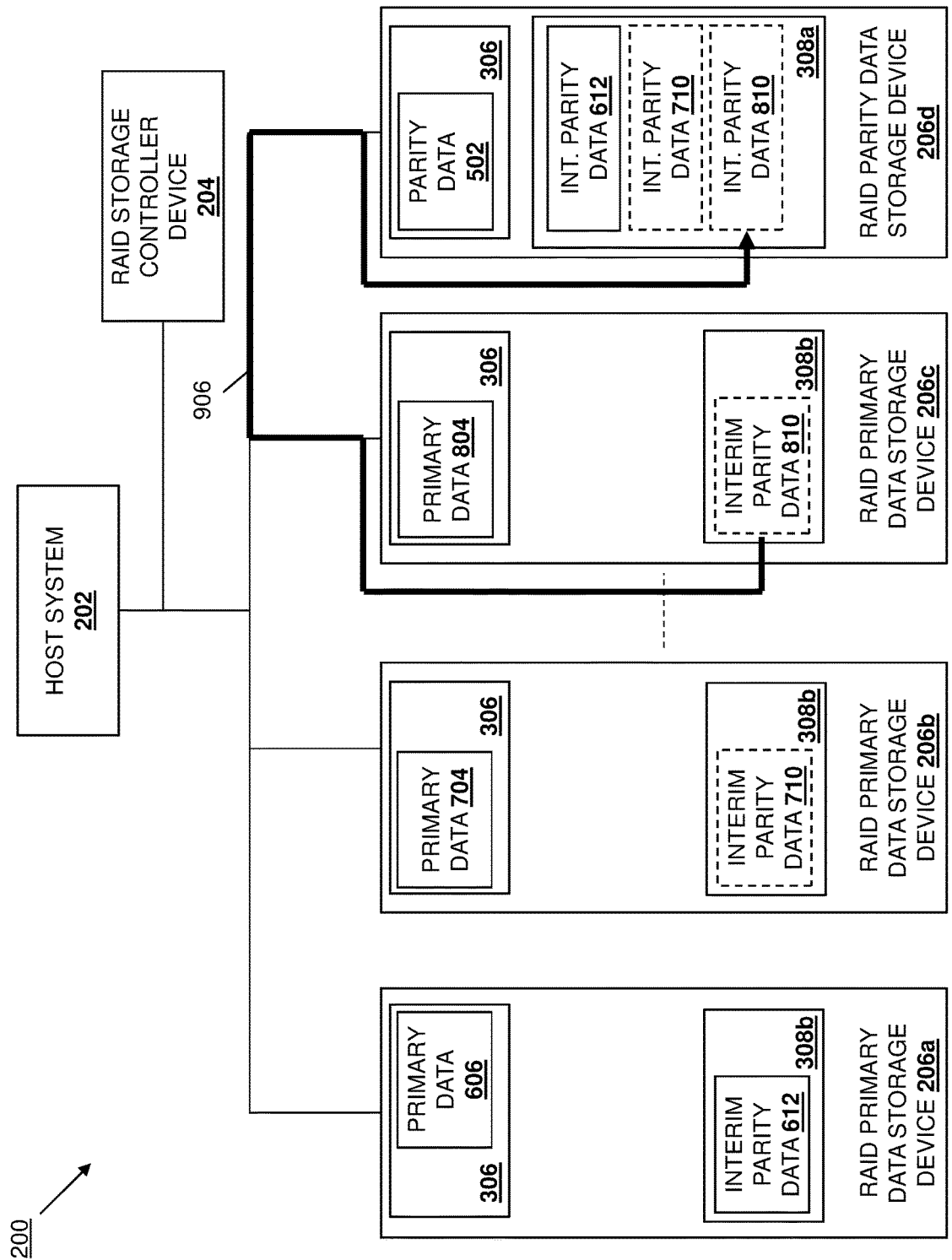
FIG. 9D is a schematic view illustrating an embodiment of the RAID storage system of FIG. 2 operating during the method of FIG. 4.

With reference to FIG. 9D, in an embodiment of block 410 and based on the command 900 (which is a multi-operation command as described above in this embodiment), the RAID storage engine 304 in the RAID parity data storage device 206d/300 may operate to perform a DMA operation 906 to retrieve the interim parity data 810 from the second buffer subsystem 308b in the RAID primary data storage device 206c, and write that interim parity data 810 to its first buffer subsystem 308a (e.g., in a device buffer in the RAID primary data storage device 206c as described in the example above) in situations in which the RAID primary data storage device 206c has experienced a primary data update and produced interim parity data. As will be appreciated by one of skill in the art in possession of the present disclosure, FIGS. 9B-9D illustrate interim parity data "pull" operations performed by the RAID parity data storage device 206d. However, those "pull" operations may be replaced by "push" operations (e.g., where the RAID primary data storage devices 206a, 206b, and/or 206c perform DMA operations to write their respective interim parity data to the first buffer subsystem 308a (e.g., a device buffer in the RAID parity data storage device 206d as described in the example above)) while remaining within the scope of the present disclosure as well. One of skill in the art in possession of the present disclosure will recognize that the operations of the RAID parity data storage device 206d to retrieve interim parity data eliminates RAID storage controller device processing associated with conventional RAID storage controller device configurations that place the RAID storage controller device between the RAID primary data storage devices and host systems, and eliminates interim parity data retrieval required by "look-aside" RAID storage controller devices in "look-aside" RAID storage controller device configurations that utilize the "look-aside" RAID storage controller device to perform those operations, a few examples of which are discussed in further detail below.

Figure 9E:
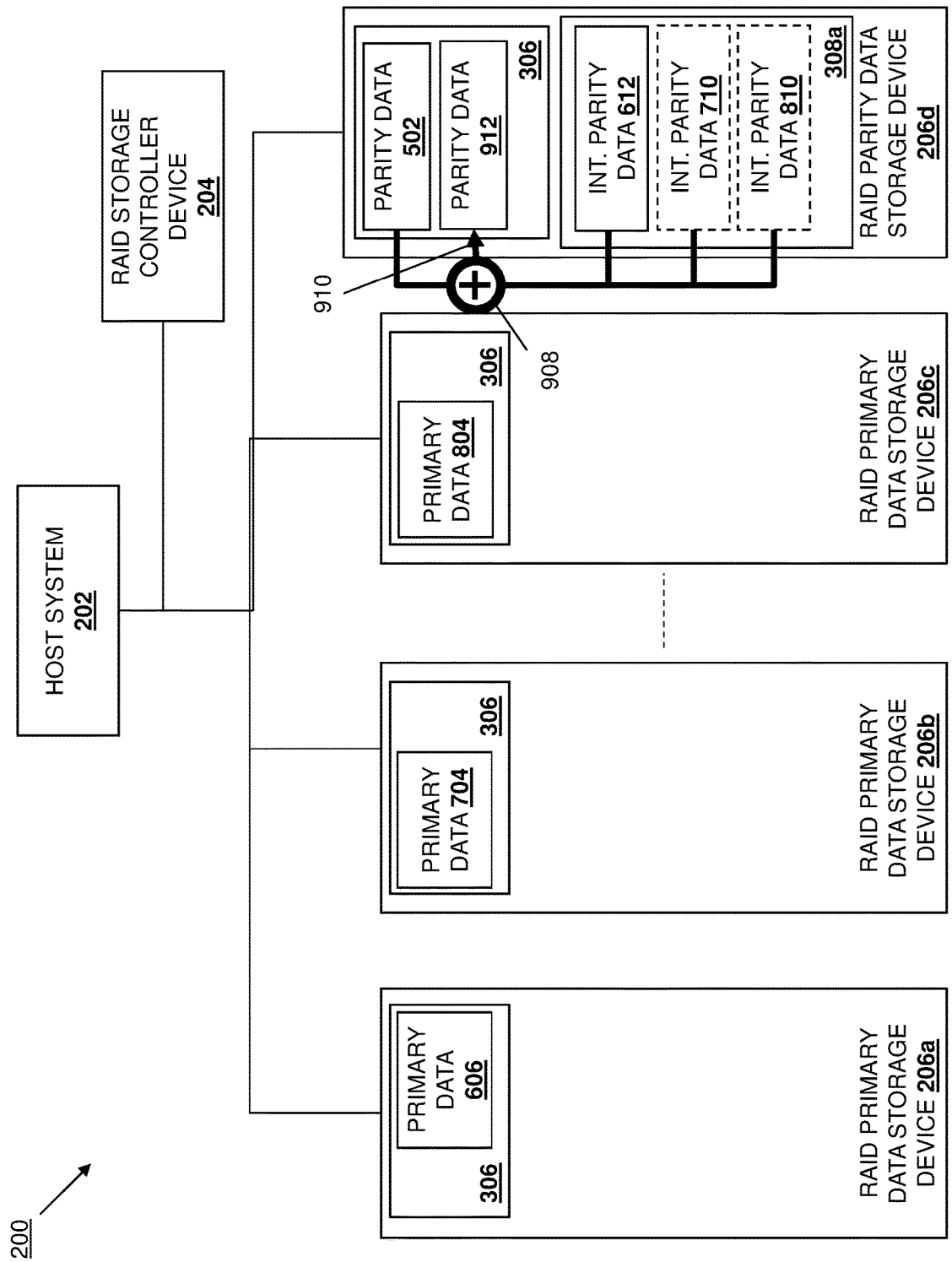
FIG. 9E is a schematic view illustrating an embodiment of the RAID storage system of FIG. 2 operating during the method of FIG. 4.

The method 400 then proceeds to block 412 where the RAID parity data storage device performs an XOR operation on current parity data and the interim parity data to produce updated parity data, and overwrites the current parity data with the updated parity data. With reference to FIG. 9E, in an embodiment of block 412 and based on the command 900 (which is a multi-operation command as described above in this embodiment), the RAID storage engine 304 in the RAID parity data storage device 206d/300 may operate to perform an XOR operation 908 using the parity data 502 in its storage subsystem 306 and any of the interim parity data 612, 710, and/or 810 written to its first buffer subsystem 308a in order to produce parity data 912, and then perform an overwrite operation 910 to overwrite the parity data 502 with the parity data 912 in its storage subsystem 306 (as illustrated by the replacement of parity data 502 from FIG. 9E with parity data 912 in FIG. 9F.) As will be appreciated by one of skill in the art in possession of the present disclosure, the XOR operation 908 performed using the parity data 502 and the interim parity data stored in the first buffer subsystem 308a will only include interim parity data provided by RAID primary data storage devices experiencing a primary data update as discussed above. One of skill in the art in possession of the present disclosure will recognize that the operations of the RAID parity data storage device 206d to produce new parity data and update old parity data with new parity data eliminates RAID storage controller device processing associated with conventional RAID storage controller device configurations that place the RAID storage controller device between the RAID primary data storage devices and host systems, and eliminates new parity data production and updating required by "look-aside" RAID storage controller devices in "look-aside" RAID storage controller device configurations that utilize the "look-aside" RAID storage controller device to perform those operations, a few examples of which are discussed in further detail below.

Figure 9F:
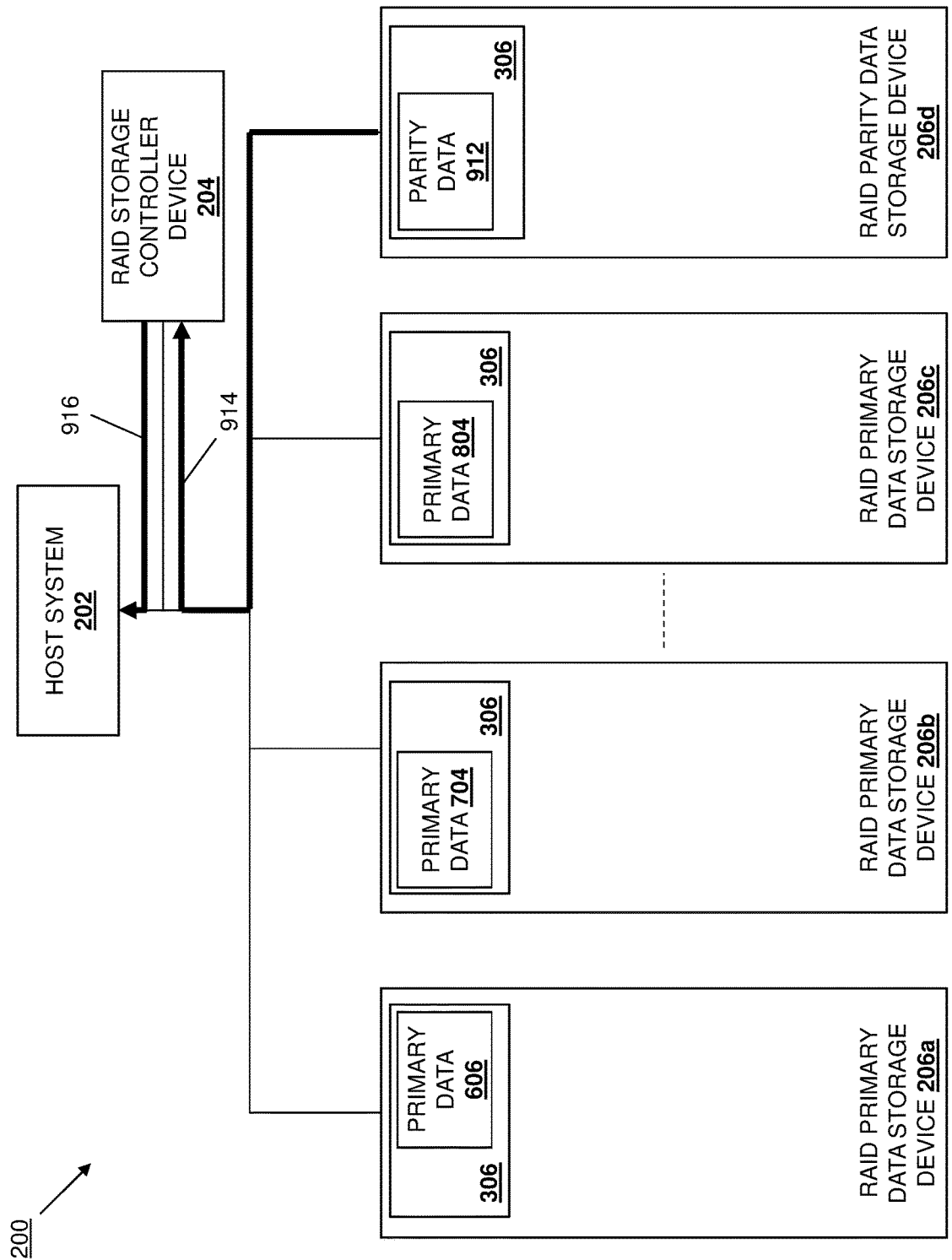
FIG. 9F is a schematic view illustrating an embodiment of the RAID storage system of FIG. 2 operating during the method of FIG. 4.

With reference to FIG. 9F, following completion of the operations associated with the command 900 (e.g., multiple operations associated with a multi-operation command as discussed above, following each operation associated with respective commands, etc.) the RAID storage engine 304 in the RAID parity data storage device 206d/300 may generate and transmit a completion message 914 to the RAID storage controller device 204. For example, the RAID storage engine 304 in the RAID parity data storage device 206d/300 may generate the completion message 914 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 9F, following the receiving of the completion message 914, the RAID storage controller device 204 may generate and transmit a completion message 916 to the host system 202 in order to indicate to the host system that the write command 600 has been completed.

Thus, systems and methods have been described that provide for the performance of data update operations to store and backup data in a RAID storage system using a RAID storage controller device in a "look-aside" RAID storage controller device configuration, and with the assistance of the RAID storage devices that store that data. Furthermore, while the RAID primary data storage devices 206a-206c are illustrated and described as computing respective interim parity data and transmitting that interim parity data to the RAID parity data storage device 206d for the computation of the new/updated parity data, one of skill in the art in possession of the present disclosure will appreciate that in some situations (e.g., for "full stripe writes"), the primary data storage devices 206a-206c may transmit their respective new/updated data to the RAID parity data storage device 206d, and the RAID parity data storage device 206d may perform XOR operations on that new/updated data to compute the new/updated parity data while remaining within the scope of the present disclosure as well. As will be appreciated by one of skill in the art in possession of the present disclosure, the systems and methods of the present disclosure allow for the provisioning of a "control-plane-only" RAID storage controller device that is only required to provide the control communications/instruction/functionality discussed above, thus increasing the ability of the RAID storage controller device to scale with high performance RAID storage devices, and/or reducing the processing capabilities/complexity required for the RAID storage controller device, reducing the memory requirements for the RAID storage controller device, and/or reducing other RAID storage controller device requirements that would be apparent to one of skill in the art in possession of the present disclosure.

Figure 10:
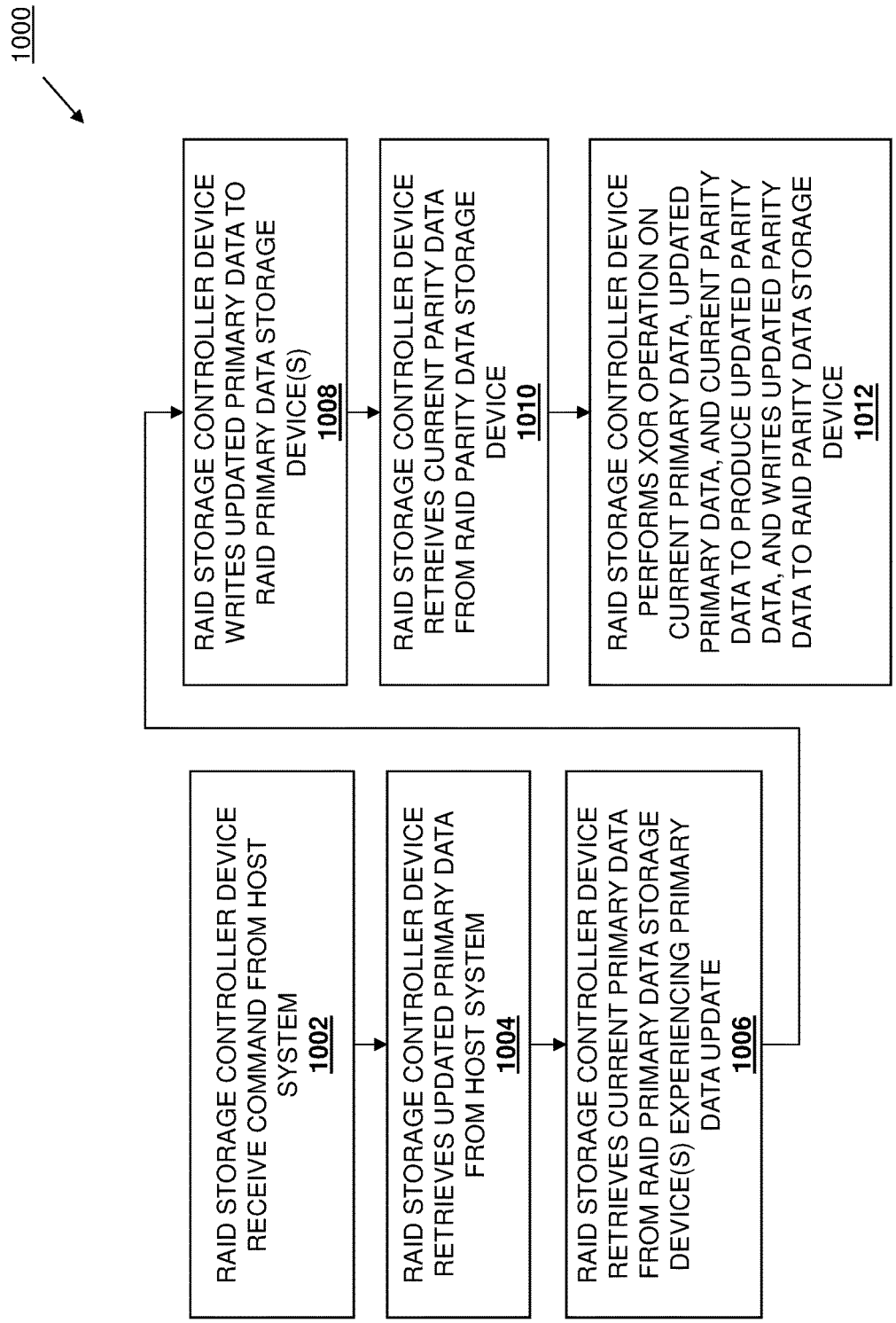
FIG. 10 is a flow chart illustrating an embodiment of a method for performing partial stripe data update operations using RAID storage controller device.

Referring now to FIG. 10, an embodiment of a method 1000 for performing partial stripe data update operations using a RAID storage controller device is illustrated. As discussed below, the systems and methods discussed above reduce the requirements for RAID storage controller devices to enable data updates relative to systems that require the performance of data update operations by a RAID storage controller device. For example, as discussed below, a RAID storage controller device may be required to retrieve updated primary data from a host system, and current primary data from each RAID primary data storage device experiencing a primary data update, and then overwrite the current primary data in each RAID primary data storage device experiencing a primary data update with its respective updated primary data. Furthermore, the RAID storage controller device may then be required to retrieve current parity data from a RAID parity data storage device, and perform an XOR operations on the current primary data, the updated primary data, and the current parity data in order to produce updated parity data, and overwrite the current parity data in the RAID parity data storage device with the updated parity date. As such, while data update operations may be performed by the RAID storage controller device, such RAID storage controller device update operations are associated with relatively high processing, memory, and/or other RAID storage controller requirements. Those RAID storage controller device data update operations are described briefly below for comparison to the systems and methods described above.

Figure 11:
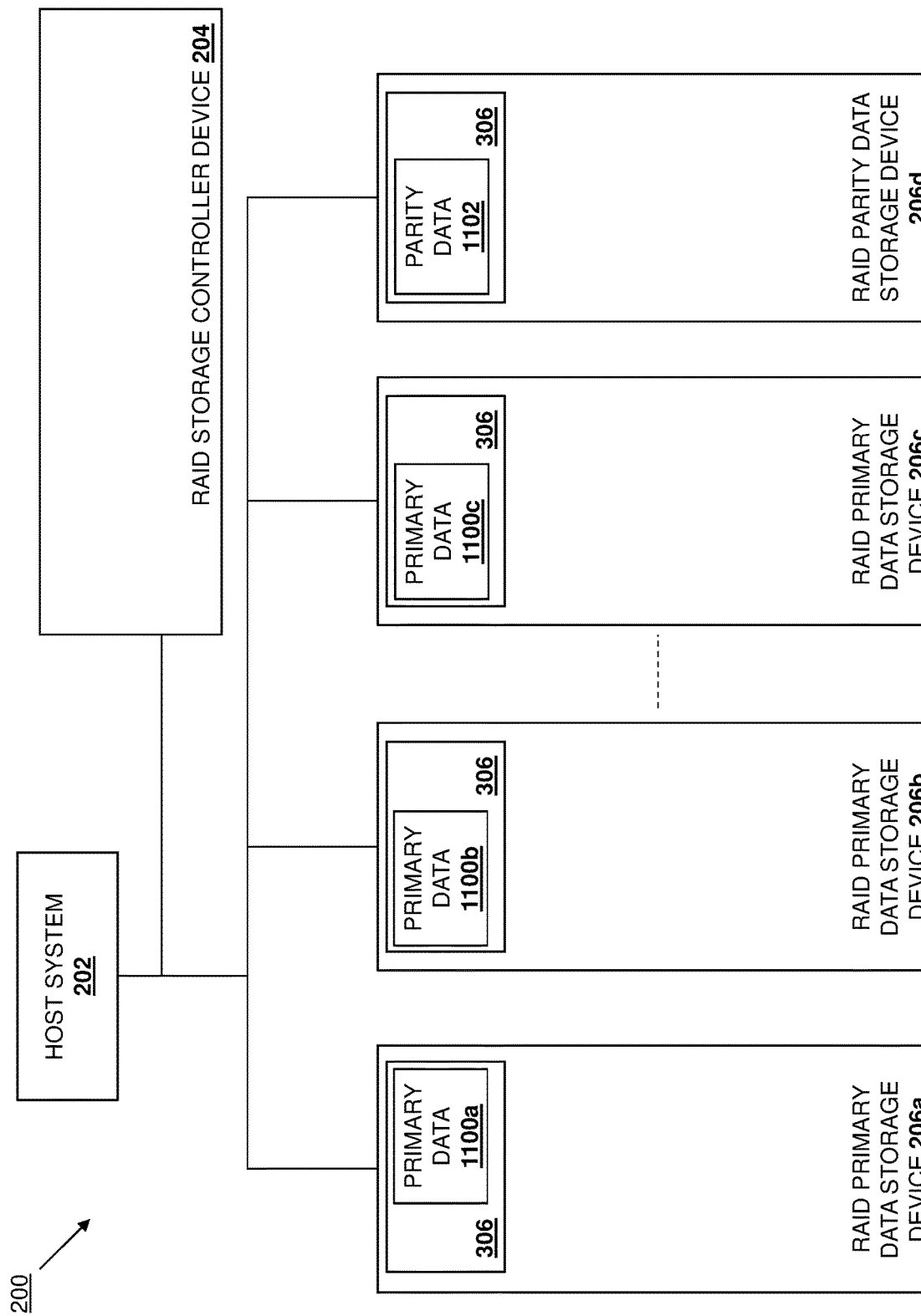
FIG. 11 is a schematic view illustrating an embodiment of the RAID storage system of FIG. 2 operating during the method of FIG. 10.

With reference to FIG. 11, the RAID storage system 200 is illustrated with the RAID primary data storage device 206a storing primary data 1100a in its storage subsystem 306, the RAID primary data storage device 206b storing primary data 1100b in its storage subsystem 306, and the RAID primary data storage device 206c storing primary data 1100c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1102 in its storage subsystem 306, and one of skill in the art in possession of the present disclosure will recognize that the parity data 1102 may have been generated via an XOR operation performed on the primary data 1100a-1100c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 11 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 12A:
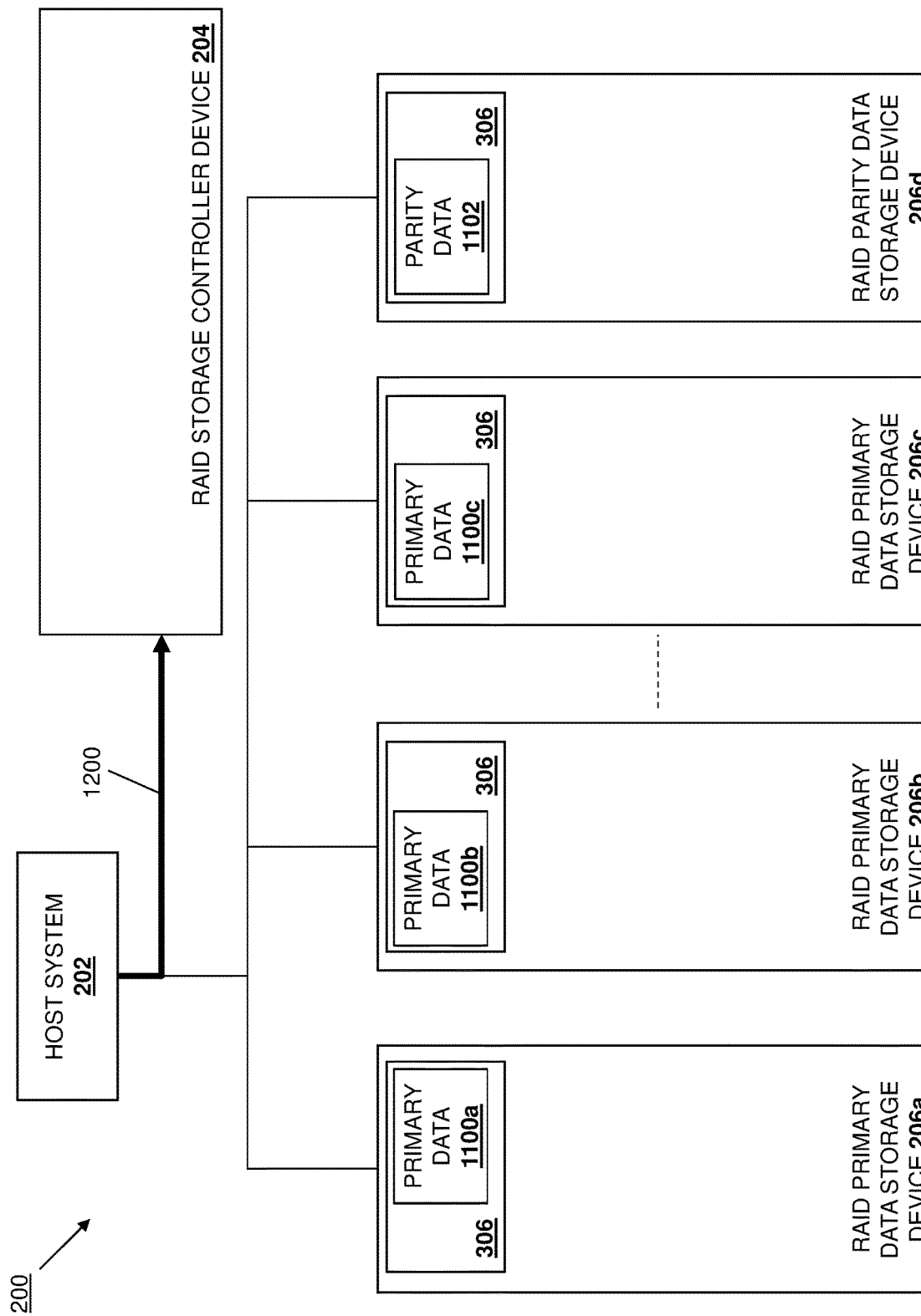
FIG. 12A is a schematic view illustrating an embodiment of the RAID storage system of FIG. 2 operating during the method of FIG. 10.

The method 1000 begins at block 1002 where RAID storage controller device receives a command from a host system. With reference to FIG. 12A, the host system 202 may generate a write command 1200 that instructs the writing of primary data that is located on the host system 200 to the RAID primary data storage devices 206a-206c, and may transmit that write command 1200 to the RAID storage controller device 204. As will be appreciated by one of skill in the art in possession of the present disclosure, the generation and/or transmission of the write command 1200 by the host system 202 to the RAID storage controller device 204 at block 1002 may include a variety of control plane communications between the host system 202 and the RAID storage controller device 204 that have been omitted for clarity of discussion. As such, at block 1002, the RAID storage controller device 204 may receive the write command 1200.

Figure 12B:
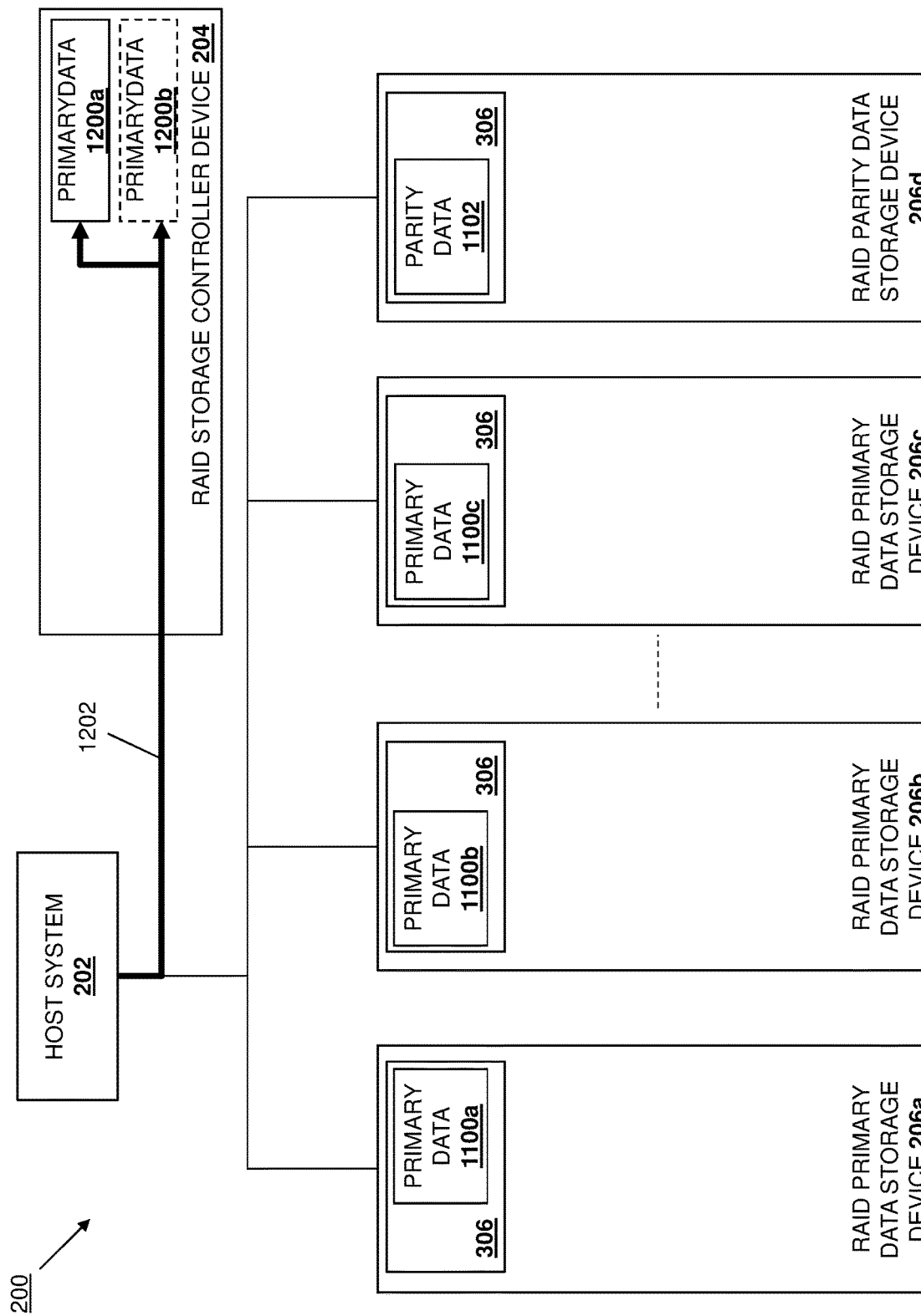
FIG. 12B is a schematic view illustrating an embodiment of the RAID storage system of FIG. 2 operating during the method of FIG. 10.

The method 1000 then proceeds to block 1004 where the RAID storage controller device retrieves updated primary data from the host system. With reference to FIG. 12B, the RAID storage controller device 204 is illustrated performing a DMA operation 1202 that accesses primary data 1200a and up to primary data 1200b that is stored on the host system 202 (e.g., in a memory system or storage system included on the host system 202), and writes that primary data 1200a-1200b to a buffer subsystem in the RAID storage controller device 204 (not illustrated, but similar to the device buffers in the RAID primary data storage devices described in the examples above). As will be appreciated by one of skill in the art in possession of the present disclosure, the primary data 1200a-1200b may be updates to some of the primary data stored in the RAID primary data storage devices 206a-206c (e.g., the primary data 1100a-1100b stored in the storage subsystems 306 in the RAID primary data storage devices 206a and 206b in the examples below), although other primary data writing scenarios will fall within the scope of the present disclosure as well. In the examples below, the partial stripe write is indicated by providing the primary data 1200a in solid lines and providing the primary data 1200b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed below). As such, one of skill in the art in possession of the present disclosure will appreciate that updated primary data may be retrieved at block 1004 for any subset of the RAID primary storage devices 206a-206c.

Figure 12C:
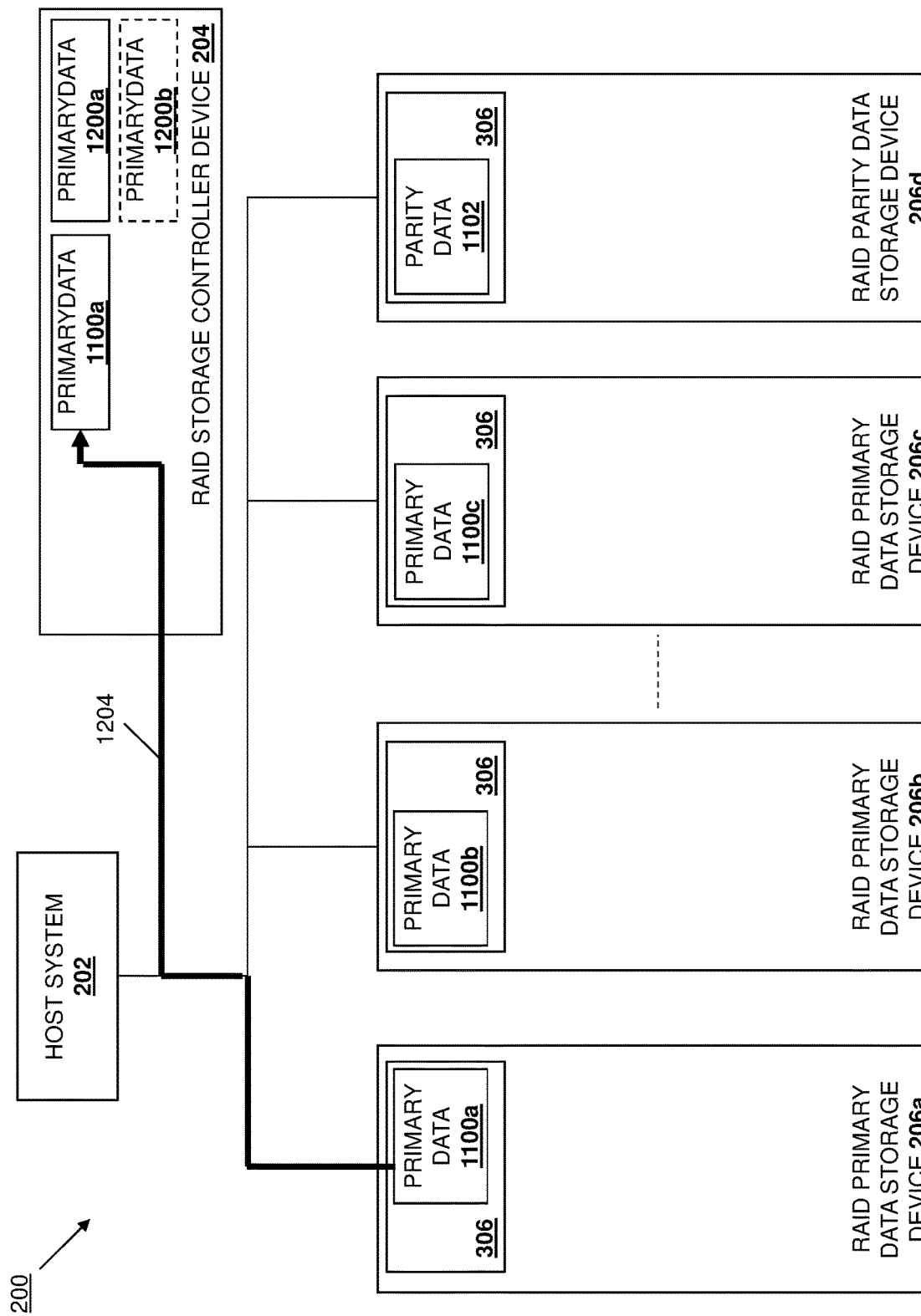
FIG. 12C is a schematic view illustrating an embodiment of the RAID storage system of FIG. 2 operating during the method of FIG. 10.
Figure 12D:
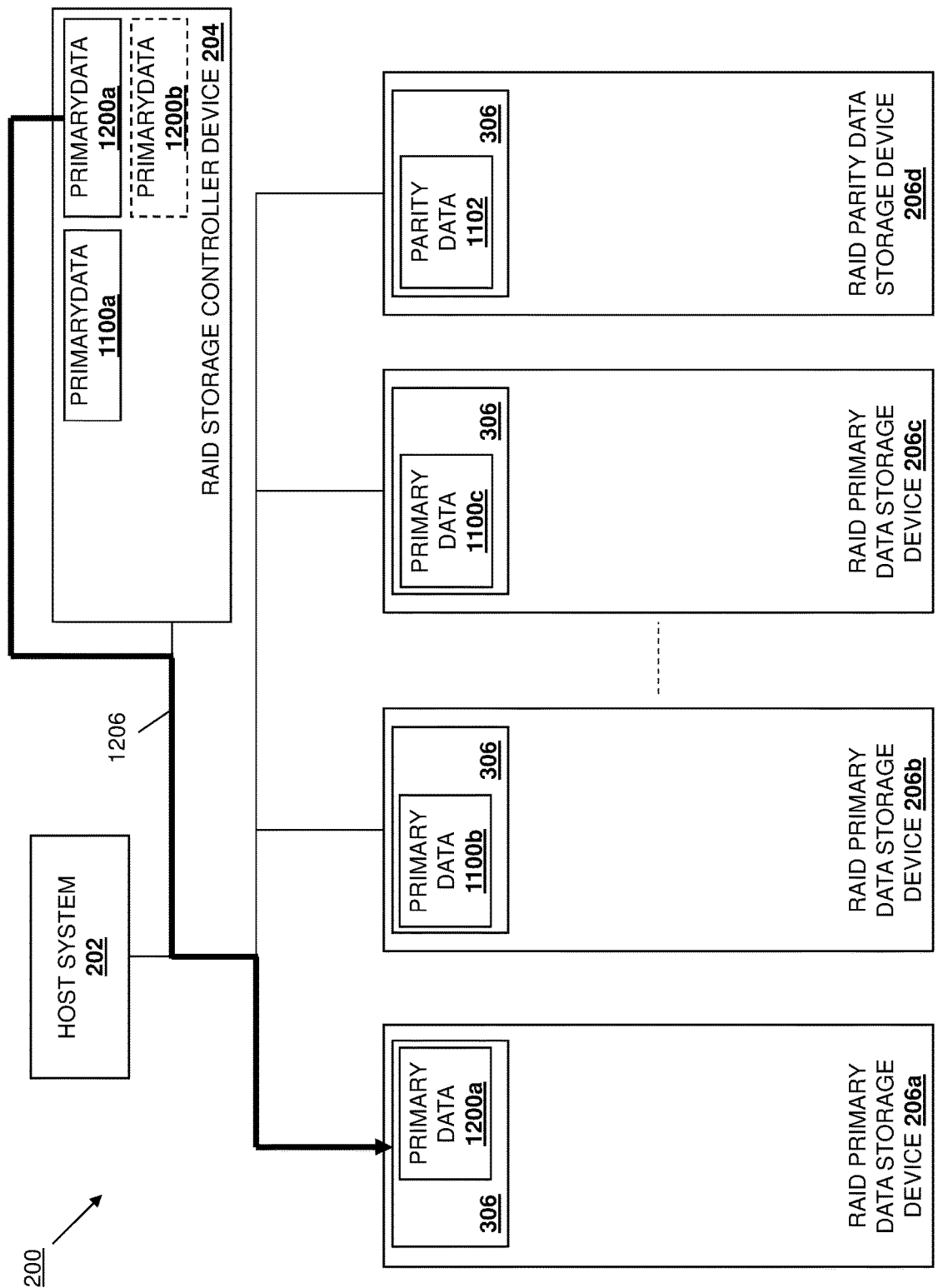
FIG. 12D is a schematic view illustrating an embodiment of the RAID storage system of FIG. 2 operating during the method of FIG. 10.

The method 1000 then proceeds to block 1006 where the RAID storage controller device retrieves current primary data from the RAID primary data storage devices experiencing a primary data update, and then to block 1008 where the RAID storage controller device writes the updated primary data to the RAID primary data storage devices. With reference to FIG. 12C, at block 1006 the RAID storage controller device 204 is illustrated performing a DMA operation 1204 that accesses the storage subsystem 306 in the RAID primary data storage device 206a, and writes the primary data 1100a to the buffer subsystem in the RAID storage controller device 204 (not illustrated, but similar to the device buffers in the RAID primary data storage devices described in the examples above). Furthermore, with reference to FIG. 12D, at block 1008 the RAID storage controller device 204 is illustrated performing a DMA operation 1204 that writes the primary data 1200a to the storage subsystem 306 in the RAID primary data storage device 206a.

Figure 13A:
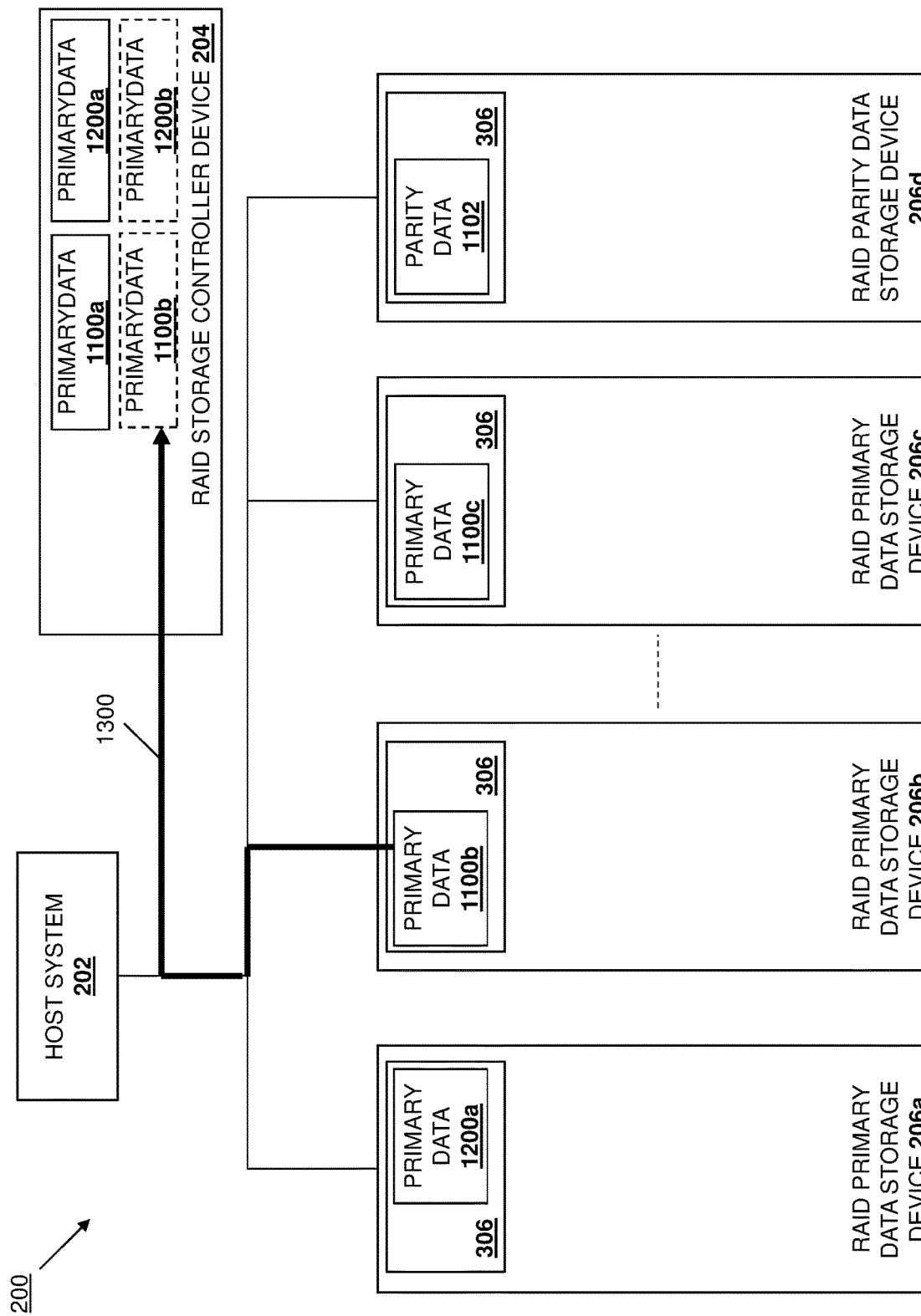
FIG. 13A is a schematic view illustrating an embodiment of the RAID storage system of FIG. 2 operating during the method of FIG. 10.
Figure 13B:
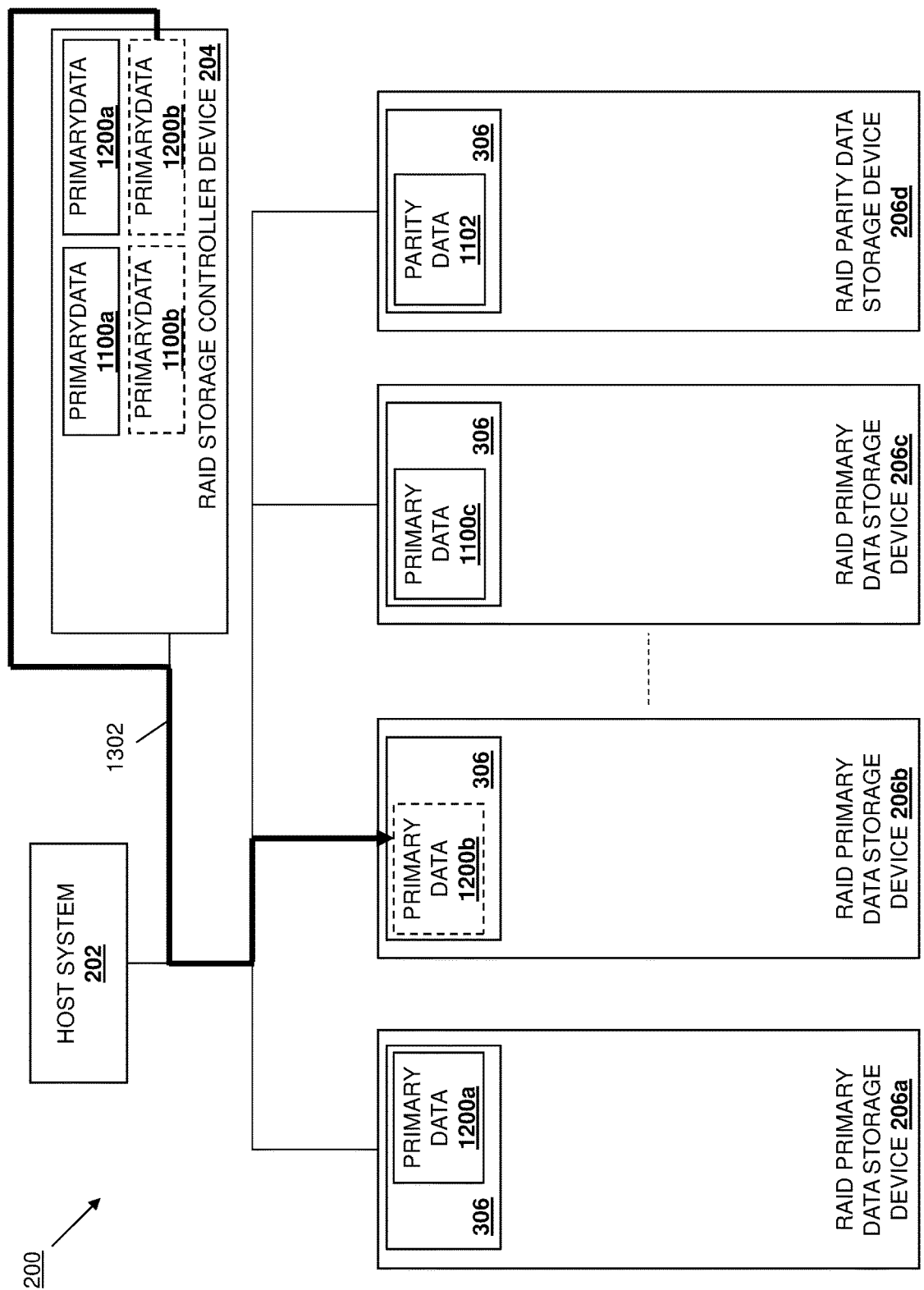
FIG. 13B is a schematic view illustrating an embodiment of the RAID storage system of FIG. 2 operating during the method of FIG. 10.

Similarly, with reference to FIG. 13A, at block 1006 the RAID storage controller device 204 is illustrated performing a DMA operation 1300 that accesses the storage subsystem 306 in the RAID primary data storage device 206b, and writes the primary data 1100b to the buffer subsystem in the RAID storage controller device 204 (not illustrated, but similar to the device buffers in the RAID primary data storage devices described in the examples above). Furthermore, with reference to FIG. 13B, at block 1008 the RAID storage controller device 204 is illustrated performing a DMA operation 1302 that writes the primary data 1200b to the storage subsystem 306 in the RAID primary data storage device 206b. Similarly as discussed above, the partial stripe write is indicated by providing the primary data 1100a in solid lines and providing the primary data 1100b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed below). As such, one of skill in the art in possession of the present disclosure will appreciate that current primary data may be retrieved at block 1004 for any subset of the RAID primary storage devices 206a-206c that is experiencing a primary data update.

Figure 14A:
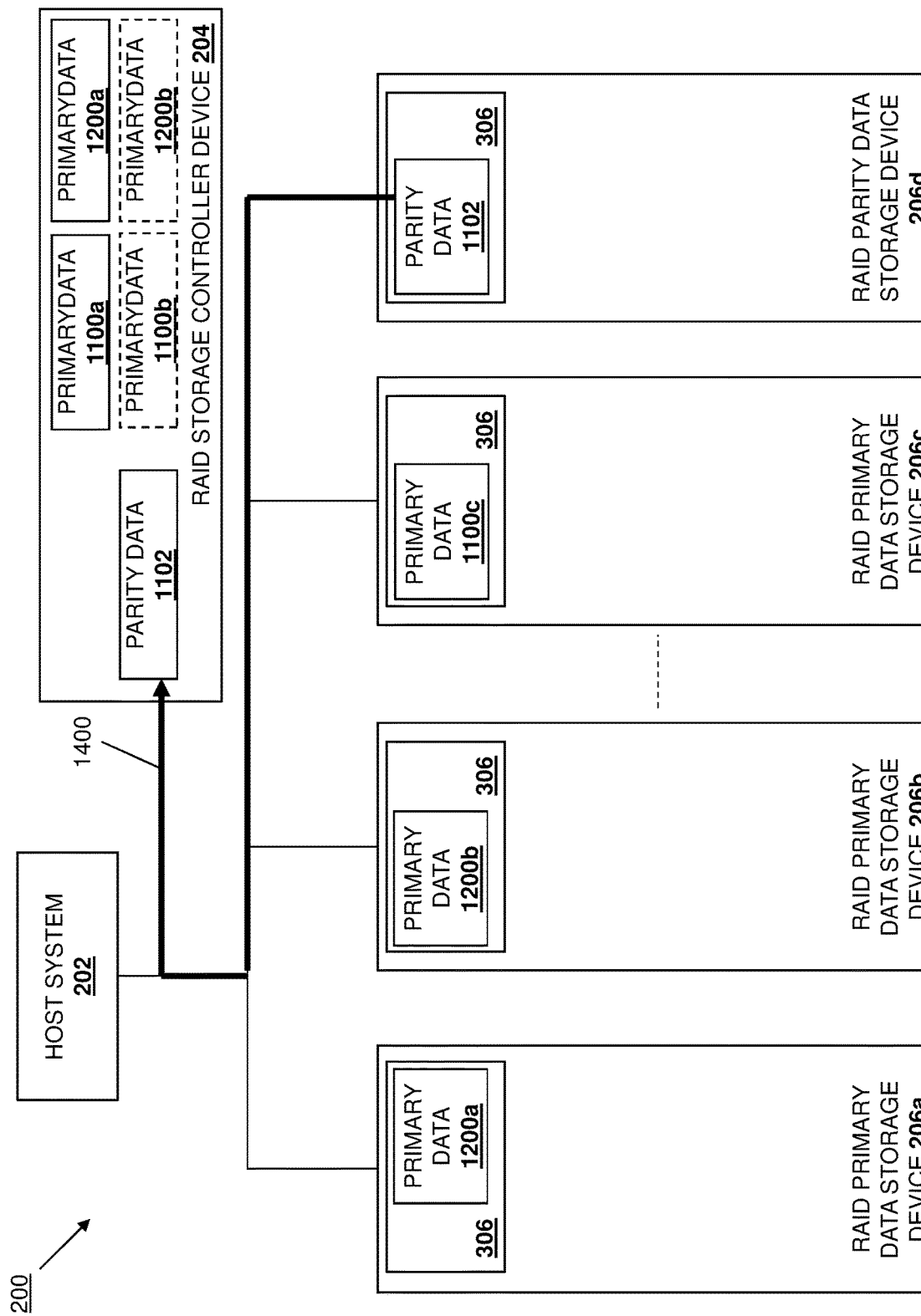
FIG. 14A is a schematic view illustrating an embodiment of the RAID storage system of FIG. 2 operating during the method of FIG. 10.

The method 1000 then proceeds to block 1010 where the RAID storage controller device retrieves current parity data from the RAID parity data storage device. With reference to FIG. 14A, at block 1010 the RAID storage controller device 204 is illustrated performing a DMA operation 1400 that accesses the storage subsystem 306 in the RAID parity data storage device 206d, and writes the parity data 1102 to the buffer subsystem in the RAID storage controller device 204 (not illustrated, but similar to the device buffers in the RAID primary data storage devices described in the examples above).

Figure 14B:
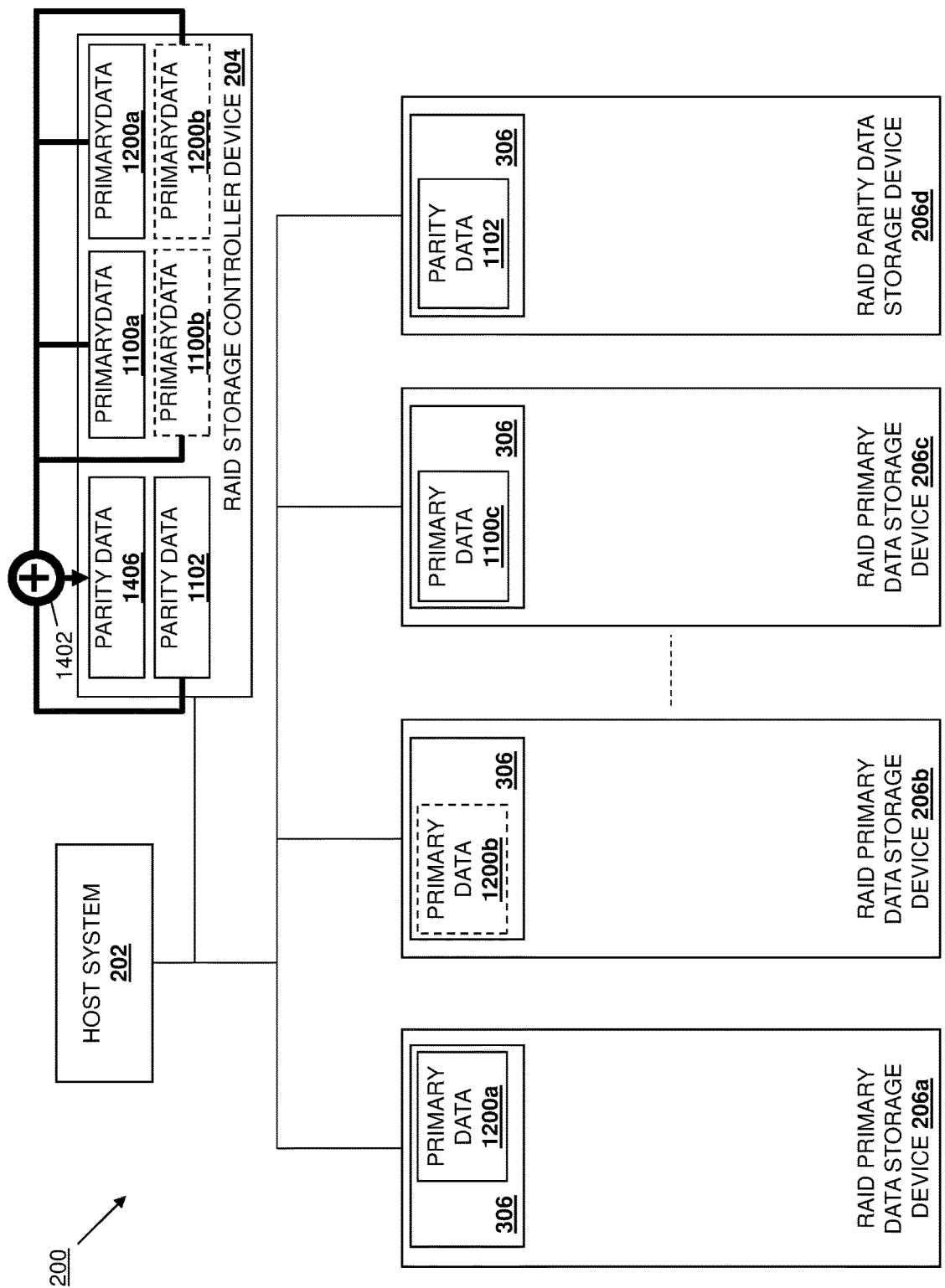
FIG. 14B is a schematic view illustrating an embodiment of the RAID storage system of FIG. 2 operating during the method of FIG. 10.
Figure 14C:
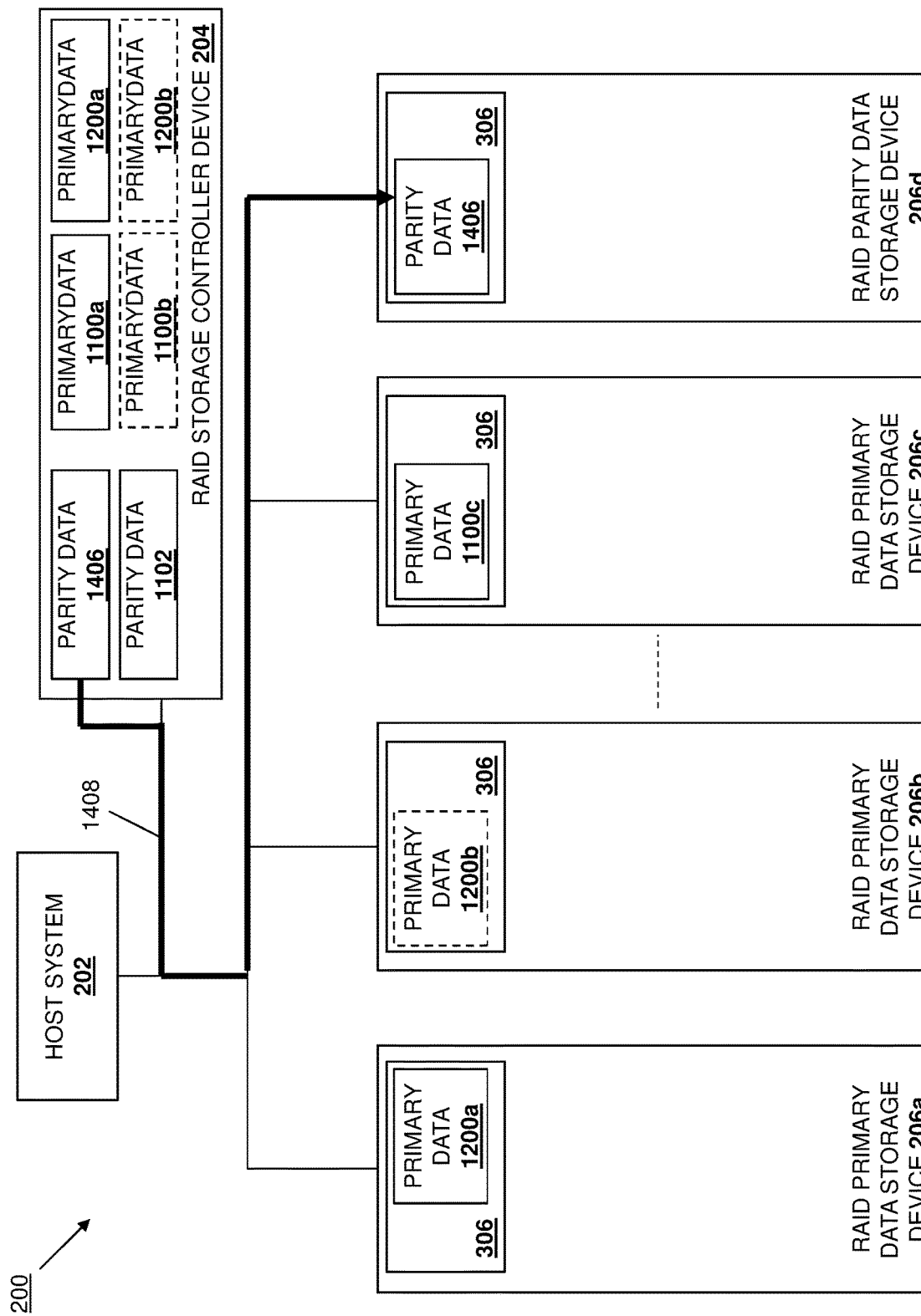
FIG. 14C is a schematic view illustrating an embodiment of the RAID storage system of FIG. 2 operating during the method of FIG. 10.
Figure 14D:
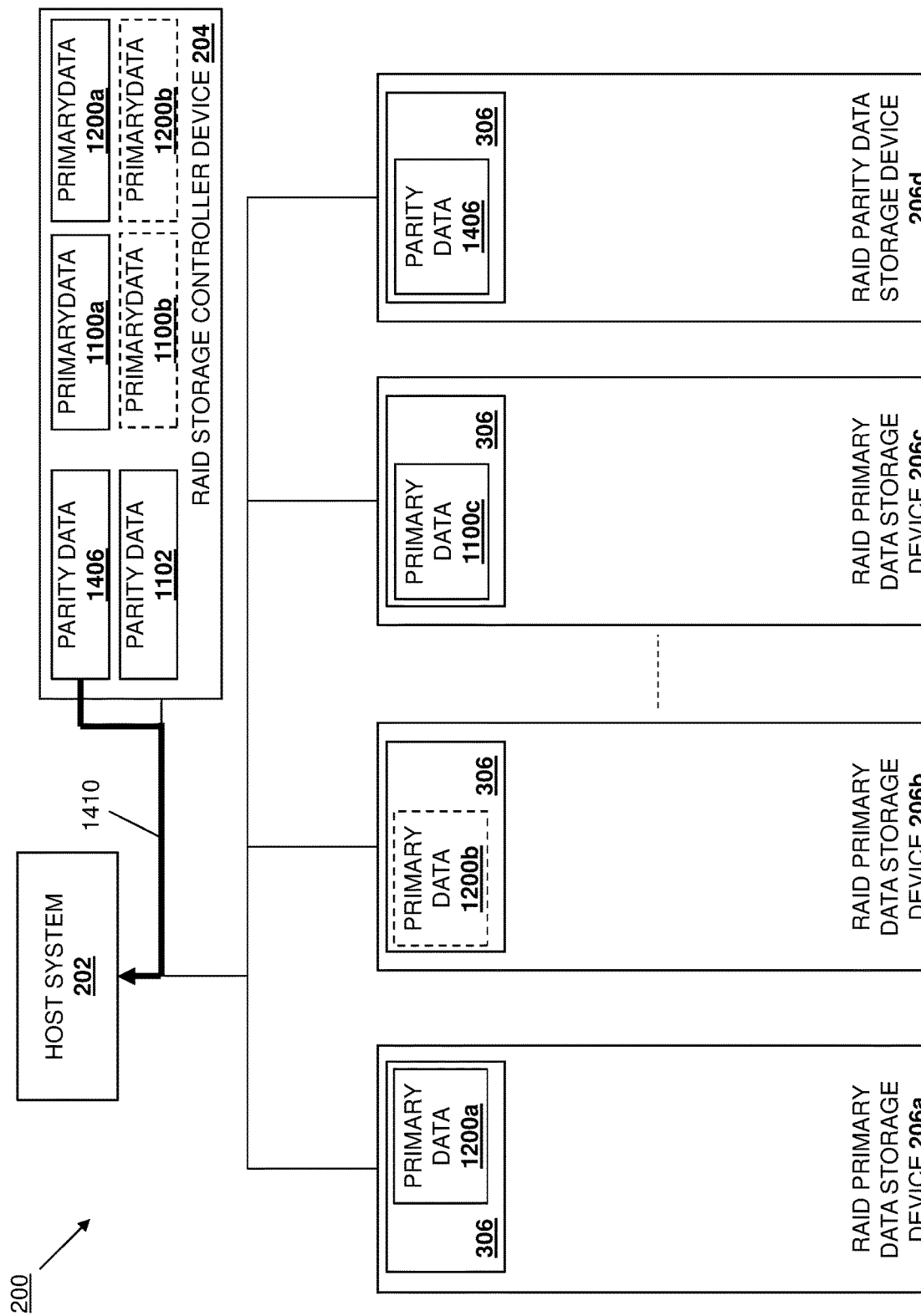
FIG. 14D is a schematic view illustrating an embodiment of the RAID storage system of FIG. 2 operating during the method of FIG. 10.

The method 1000 then proceeds to block 1012 where the RAID storage controller device performs an XOR operation on current primary data, updated primary data, and current parity data in order to produce updated parity data, and writes the updated parity data to the RAID parity data storage device. With reference to FIG. 14B, at block 1012 the RAID storage controller device 204 is illustrated performing an XOR operation 1402 on the primary data 1100a, the primary data 1100b, the primary data 1200a, the primary data 1200b, and the parity data 1102 in order to produce parity data 1406. Furthermore, with reference to FIG. 14C, at block 1012 the RAID storage controller device 204 is illustrated performing a DMA operation 1408 that overwrites the parity data 1102 in the storage subsystem 306 in the RAID parity data storage device 206d with the parity data 1406. As such, following block 1012, the primary data 1100a in the RAID primary data storage device 206a has been updated with the primary data 1200a, the primary data 1100b in the RAID primary data storage device 206b has been updated with the primary data 1200b, and the parity data 1102 in the RAID parity data storage device 206d has been updated with the parity data 1406, thus allowing for the use of the parity data 1406 for the recovery of any one of the primary data 1200a, 1200b, and 1100c in the event that primary data becomes unavailable. FIG. 14D illustrates the RAID storage controller device 204 generating and transmitting a completion message 1410 to the host system 202 to indicate that the write command 1200 has been completed.

Thus, one of skill in the art in possession of the present disclosure will recognize that the operations of the RAID storage controller device 204 according to the method 1000 require more processing, memory, and/or other capabilities relative to the operations of the RAID storage controller device 204 during the method 400, illustrating an example of how the operations of the RAID data storage devices 206a-206d during the method 400 offload operations from the RAID storage controller device 204, increasing the ability of the RAID storage controller device to scale with high performance RAID storage devices, and/or providing the option of utilizing a RAID storage controller device with relatively lower processing, memory, and/or other capabilities. Furthermore, one of skill in the art in possession of the present disclosure will appreciate that the operations of a RAID storage controller device that is located between the host system 202 and the RAID data storage devices 206a-206d (i.e., rather than the "look aside" RAID storage controller device configuration described herein with respect to the method 1000) will include similar processing and memory intensive operations that can be eliminated via use of the systems and methods described herein.

Figure 15:
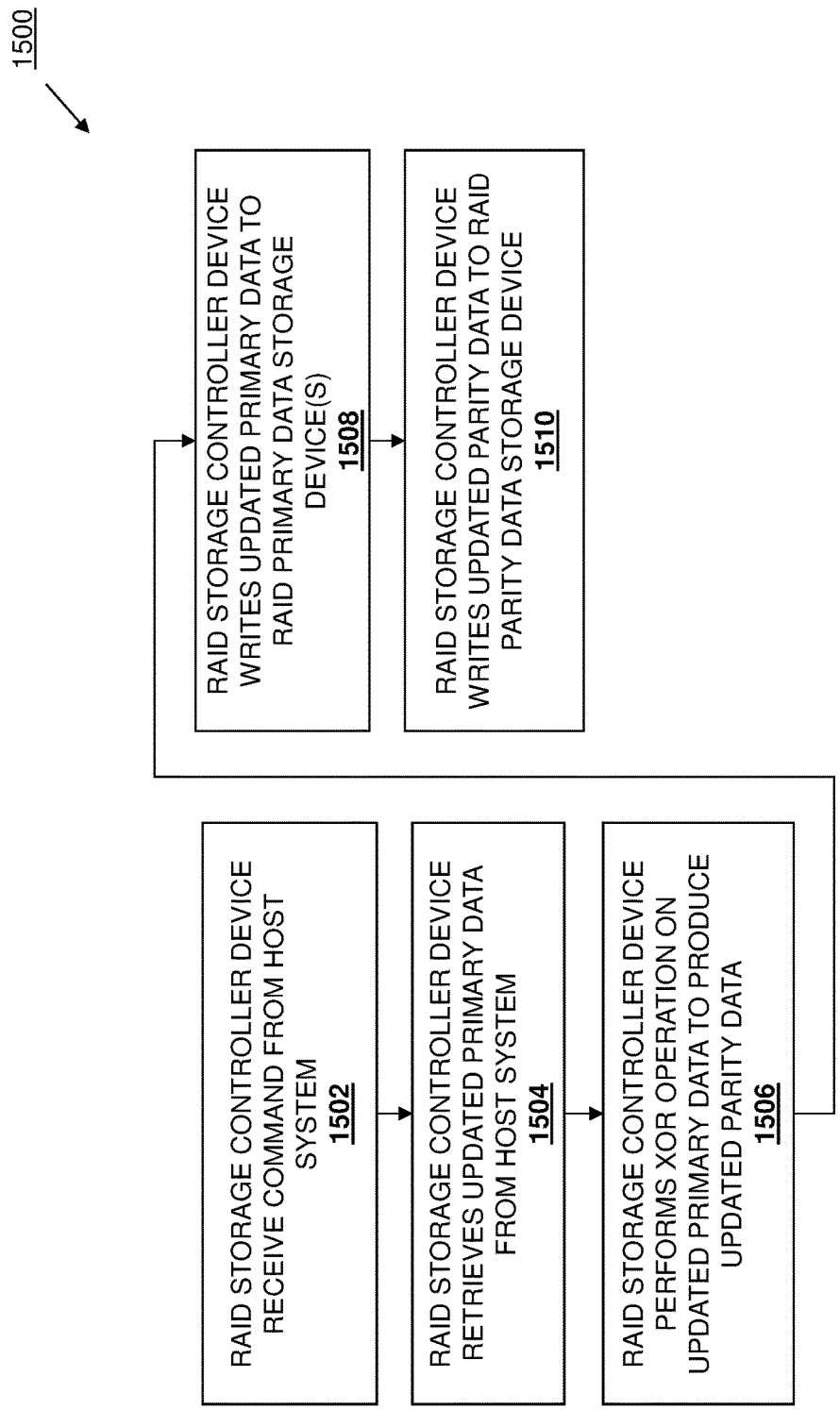
FIG. 15 is a flow chart illustrating an embodiment of a method for performing full stripe data update operations using RAID storage controller device.

Referring now to FIG. 15, an embodiment of a method 1500 for performing full stripe data update operations using a RAID storage controller device is illustrated. As discussed below, the systems and methods discussed above reduce the requirements of RAID storage controller devices to enable data updates relative to systems that require the performance of data update operations by a RAID storage controller device. For example, as discussed below, a RAID storage controller device may be required to retrieve updated primary data from a host system, and perform an XOR operation on the updated primary data in order to produce updated parity data. Furthermore, the RAID storage controller device may then be required to overwrite the current primary data in each RAID primary data storage device with its respective updated primary data, and overwrite the current parity data in the RAID parity data storage device with the updated parity data. As such, while full stripe data update operations may be performed by the RAID storage controller device, such RAID storage controller device update operations are associated with relatively high processing, memory, and/or other RAID storage controller requirements.

Figure 16:
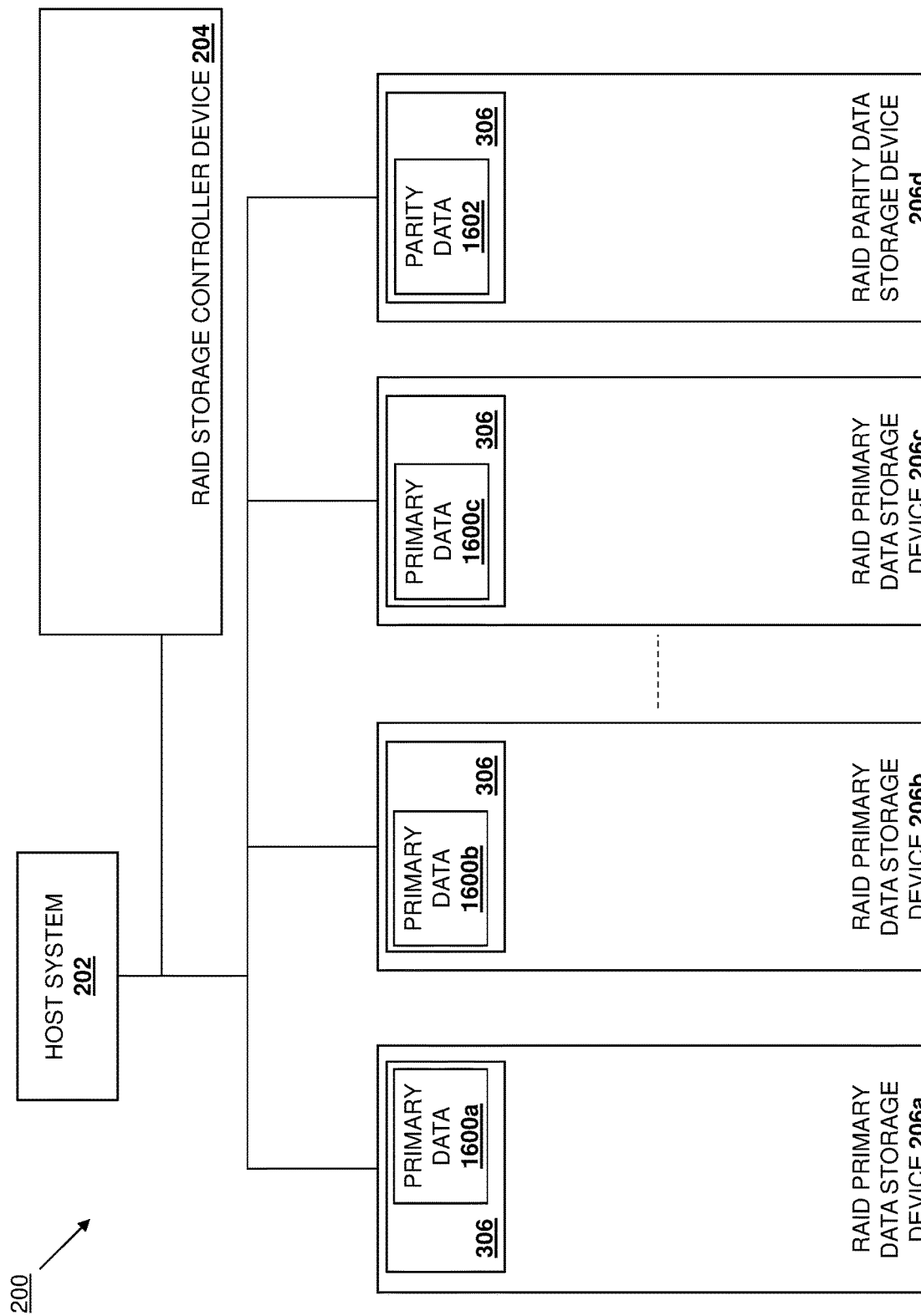
FIG. 16 is a schematic view illustrating an embodiment of the RAID storage system of FIG. 2 operating during the method of FIG. 15.

With reference to FIG. 16, the RAID storage system 200 is illustrated with the RAID primary data storage device 206a storing primary data 1600a in its storage subsystem 306, the RAID primary data storage device 206b storing primary data 1600b in its storage subsystem 306, and the RAID primary data storage device 206c storing primary data 1600c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1602 in its storage subsystem 306, and one of skill in the art in possession of the present disclosure will recognize that the parity data 1602 may have been generated via an XOR operation performed on the primary data 1600a-1600c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 16 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 17A:
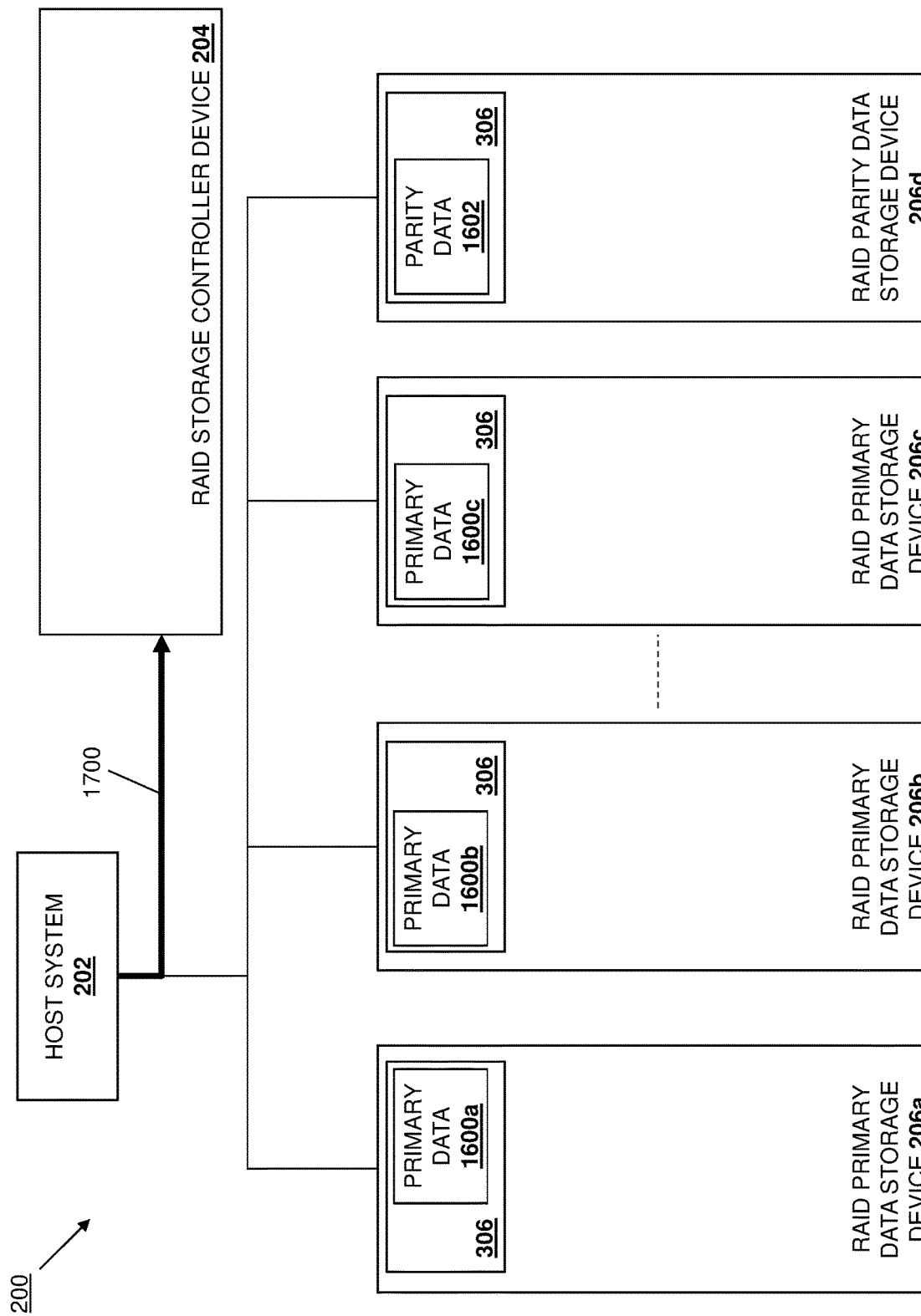
FIG. 17A is a schematic view illustrating an embodiment of the RAID storage system of FIG. 2 operating during the method of FIG. 15.

The method 1500 begins at block 1502 where RAID storage controller device receives a command from a host system. With reference to FIG. 17A, the host system 202 may generate a write command 1700 that instructs the writing of primary data that is located on the host system 200 to the RAID primary data storage devices 206a-206c, and may transmit that write command 1700 to the RAID storage controller device 204. As will be appreciated by one of skill in the art in possession of the present disclosure, the generation and/or transmission of the write command 1700 by the host system 202 to the RAID storage controller device 204 at block 1502 may include a variety of control plane communications between the host system 202 and the RAID storage controller device 204 that have been omitted for clarity of discussion. As such, at block 1502, the RAID storage controller device 204 may receive the write command 1700.

Figure 17B:
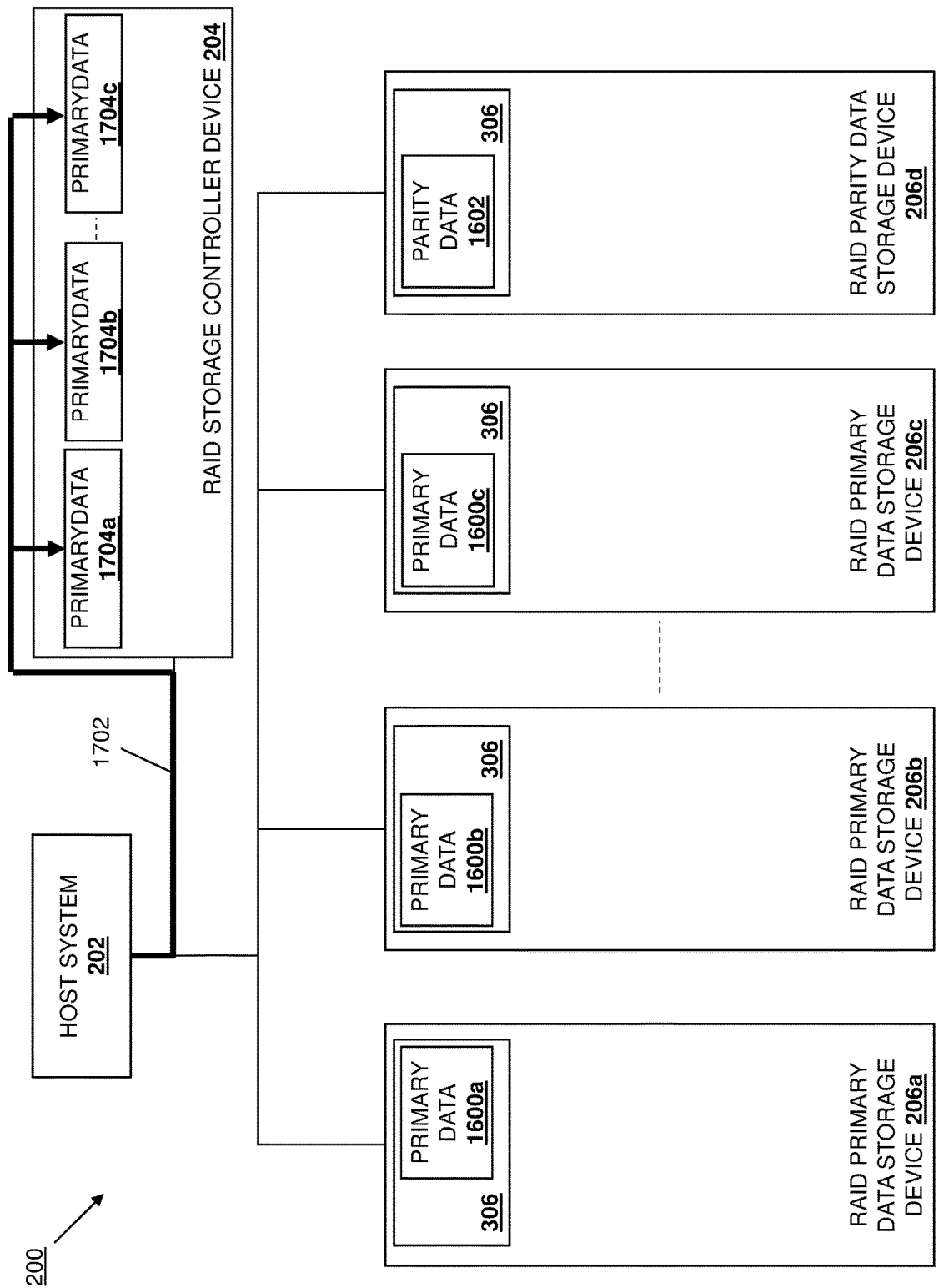
FIG. 17B is a schematic view illustrating an embodiment of the RAID storage system of FIG. 2 operating during the method of FIG. 15.

The method 1500 then proceeds to block 1504 where the RAID storage controller device retrieves updated primary data from the host system. With reference to FIG. 17B, the RAID storage controller device 204 is illustrated performing a DMA operation 1702 that accesses primary data 1704a, primary data 1704b, and up to primary data 1704c that is stored on the host system 202 (e.g., in a memory system or storage system included on the host system 202), and writes that primary data 1704a-1704c to a buffer subsystem in the RAID storage controller device 204 (not illustrated, but similar to the device buffers in the RAID primary data storage devices described in the examples above). As will be appreciated by one of skill in the art in possession of the present disclosure, the primary data 1704a-1704c may be updates to the primary data 1600a-1600c, respectively, stored in the RAID primary data storage devices 206a-206c, although other primary data writing scenarios will fall within the scope of the present disclosure as well. One of skill in the art in possession of the present disclosure will recognize the scenario described for the method 1500 as a full stripe write in which all of the primary data in a data stripe provided by the RAID primary data storage devices 206a-206c is updated.

Figure 17C:
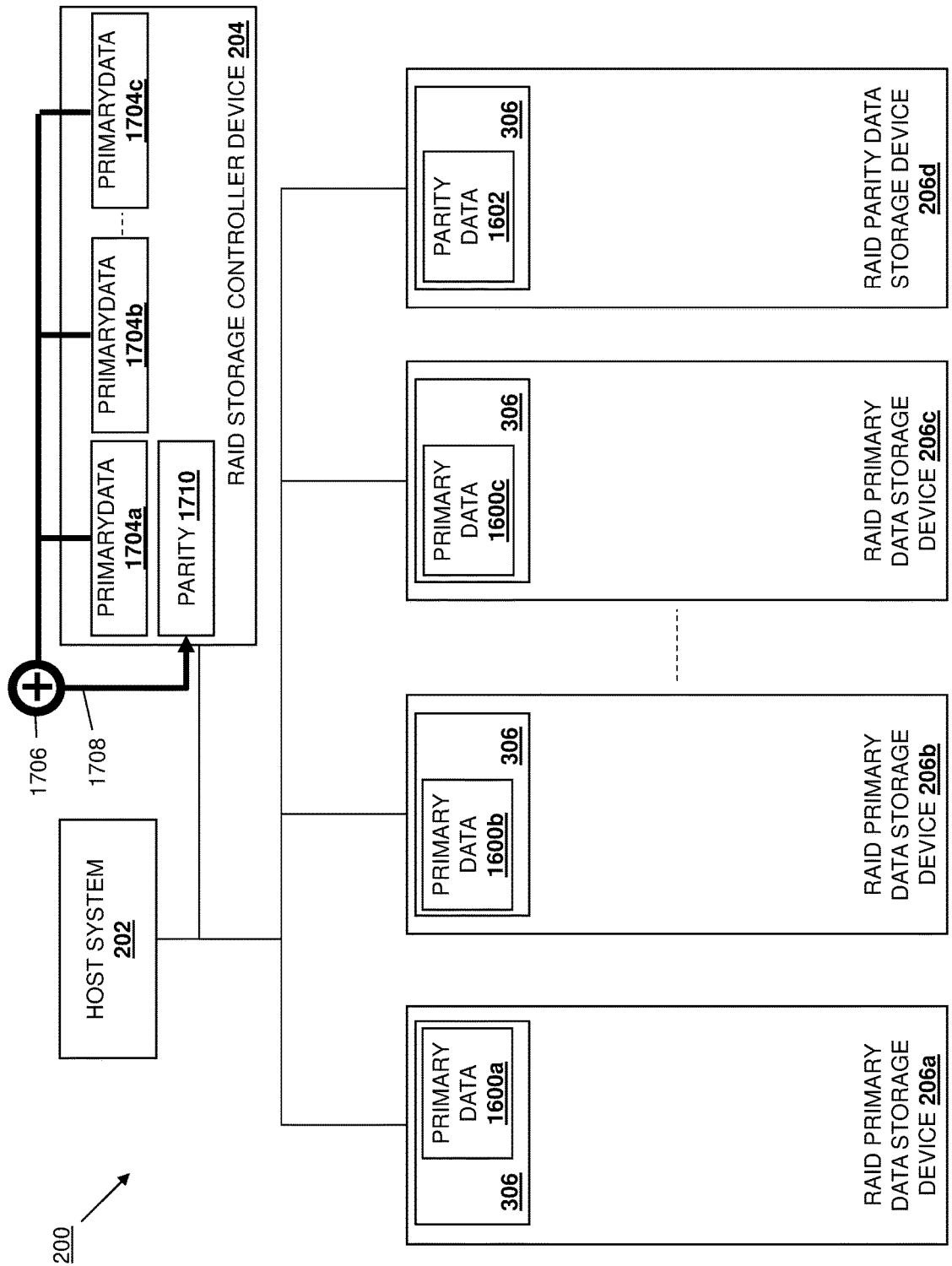
FIG. 17C is a schematic view illustrating an embodiment of the RAID storage system of FIG. 2 operating during the method of FIG. 15.

The method 1500 then proceeds to block 1506 where the RAID storage controller device performs an XOR operation on the updated primary data in order to produce updated parity data. With reference to FIG. 17C, at block 1506 the RAID storage controller device 204 is illustrated performing an XOR operation 1706 on the primary data 1704a-1704c in order to produce parity data 1710. As will be appreciated by one of skill in the art in possession of the present disclosure, the full stripe write situation allows for the RAID storage controller device to compute the updated parity data from the updated primary data retrieved from the host system 202, as that is the primary data that will be stored on each of the RAID primary data storage devices 206a-206c, as discussed below. Thus, the parity data 1710 produced at block 1506 will allow for recovery of any of the primary data 1704a-1704c in the event any one becomes unavailable.

Figure 17D:
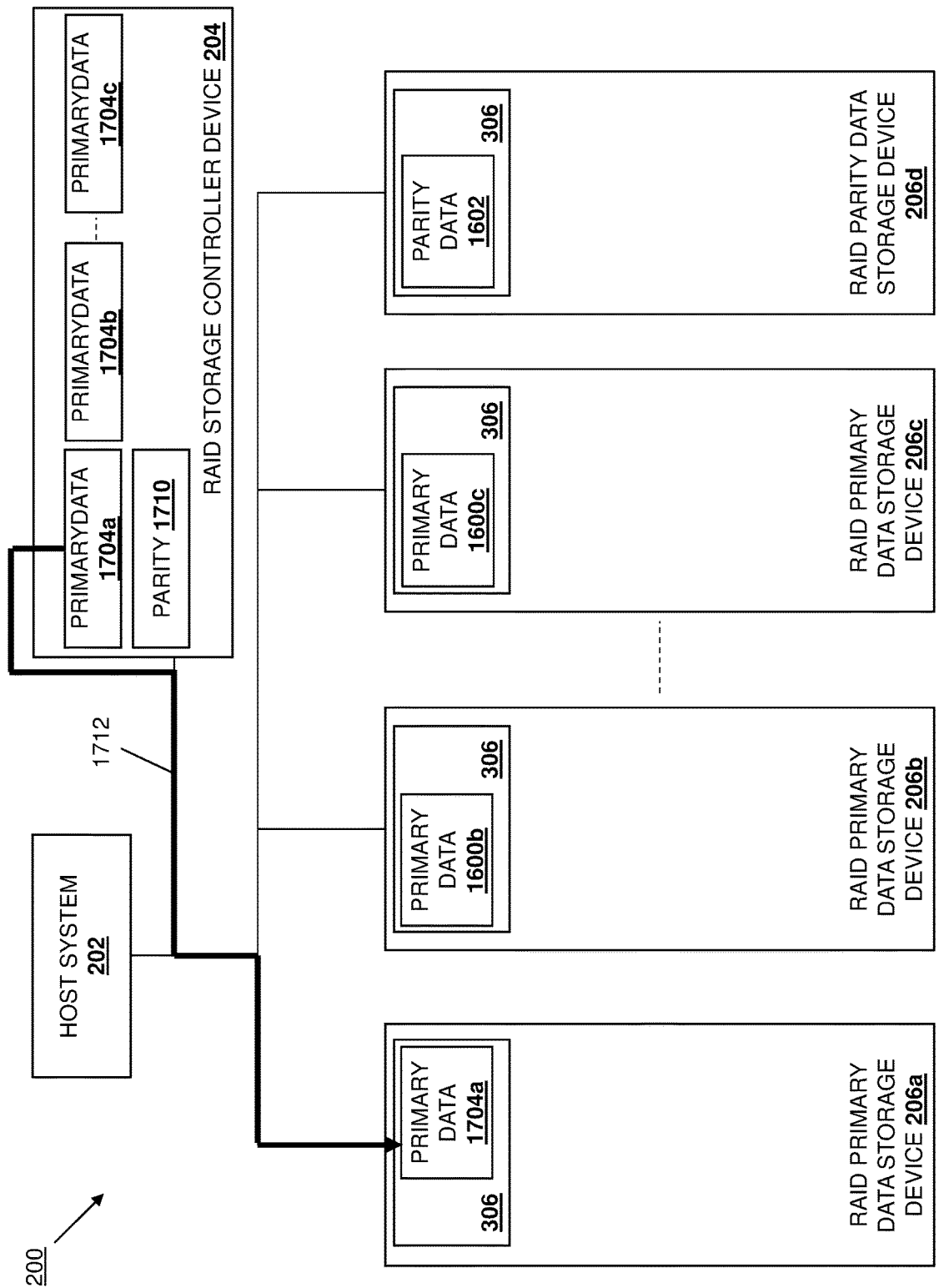
FIG. 17D is a schematic view illustrating an embodiment of the RAID storage system of FIG. 2 operating during the method of FIG. 15.
Figure 17E:
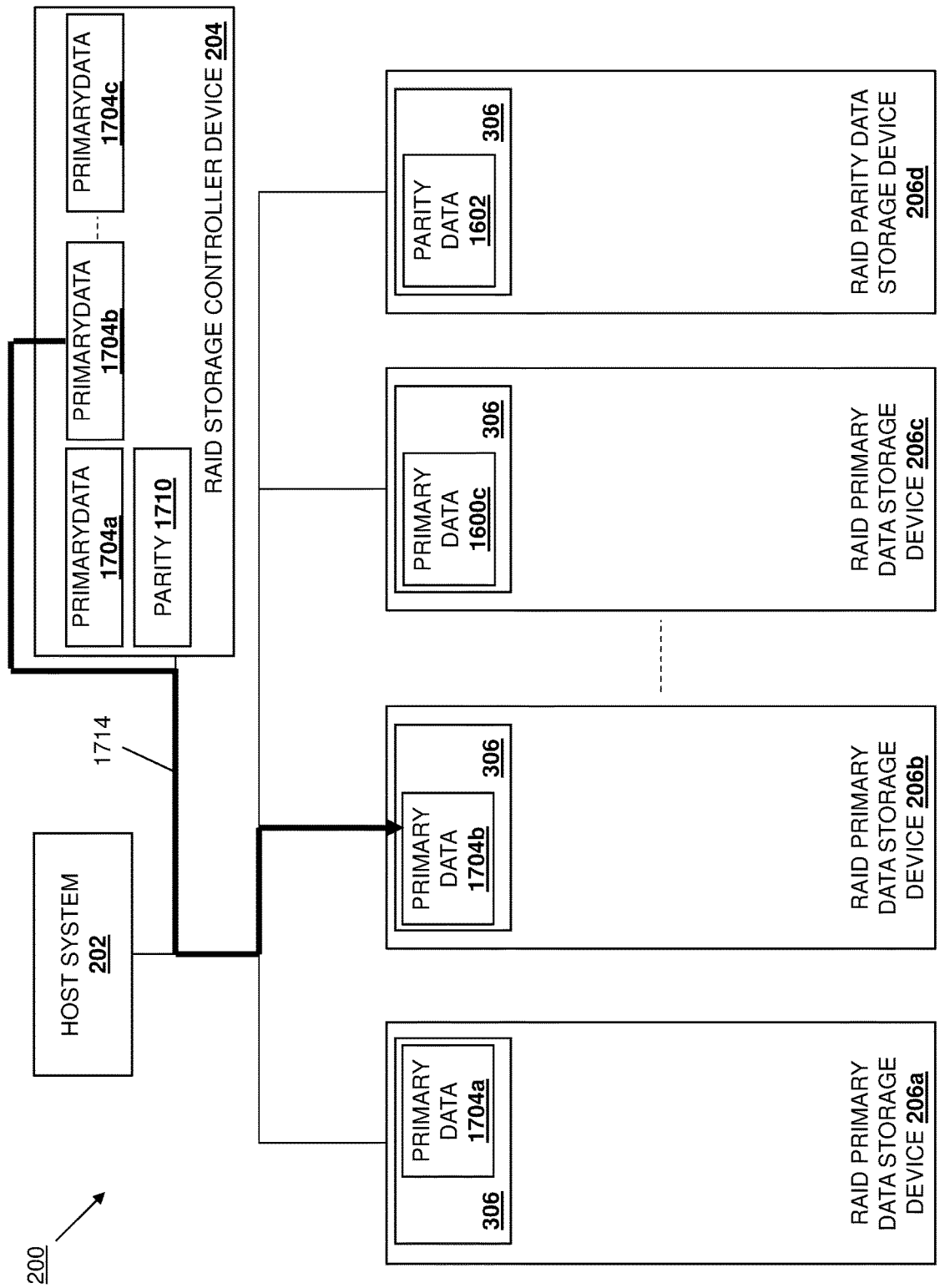
FIG. 17E is a schematic view illustrating an embodiment of the RAID storage system of FIG. 2 operating during the method of FIG. 15.
Figure 17F:
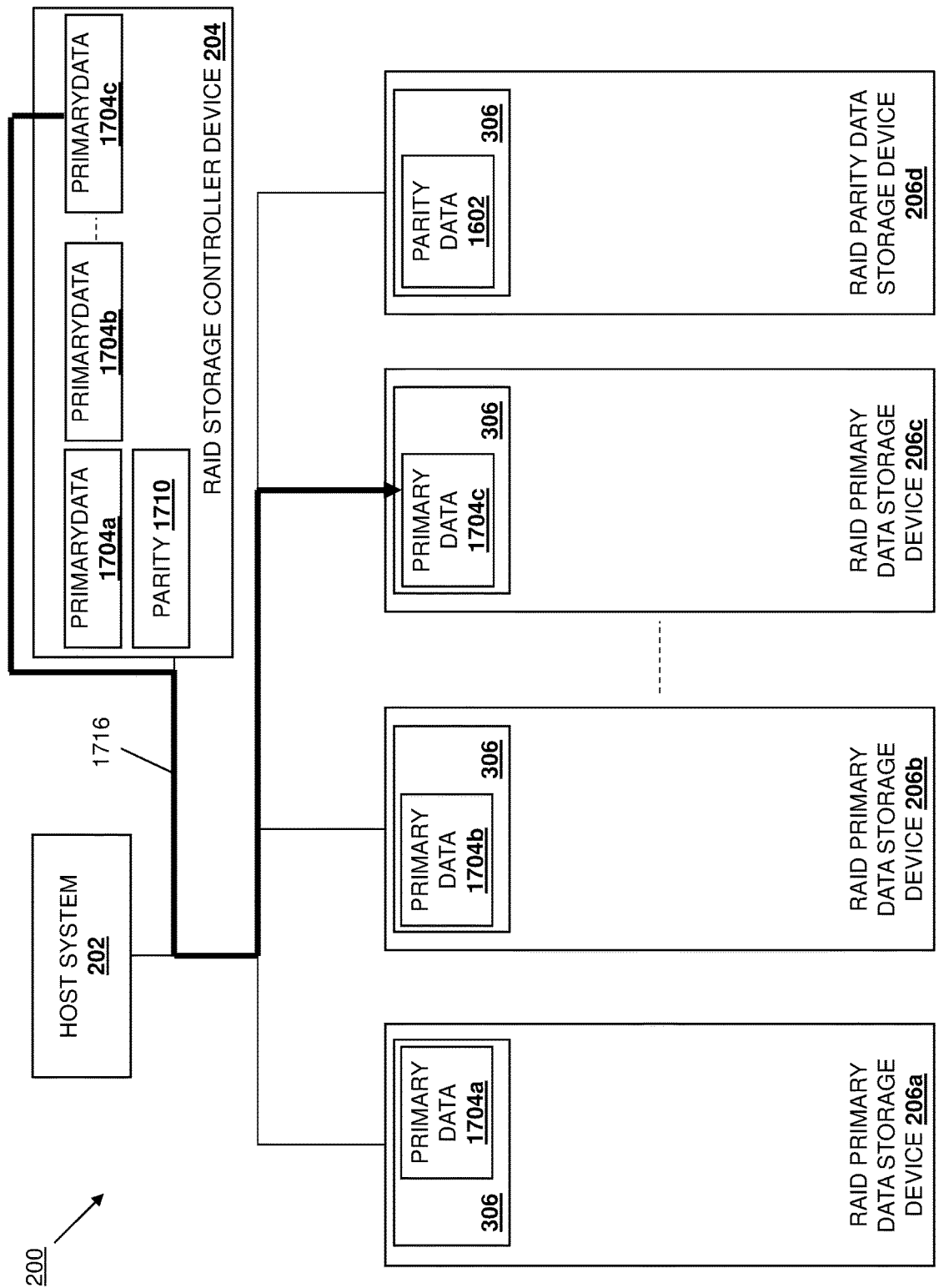
FIG. 17F is a schematic view illustrating an embodiment of the RAID storage system of FIG. 2 operating during the method of FIG. 15.
Figure 17G:
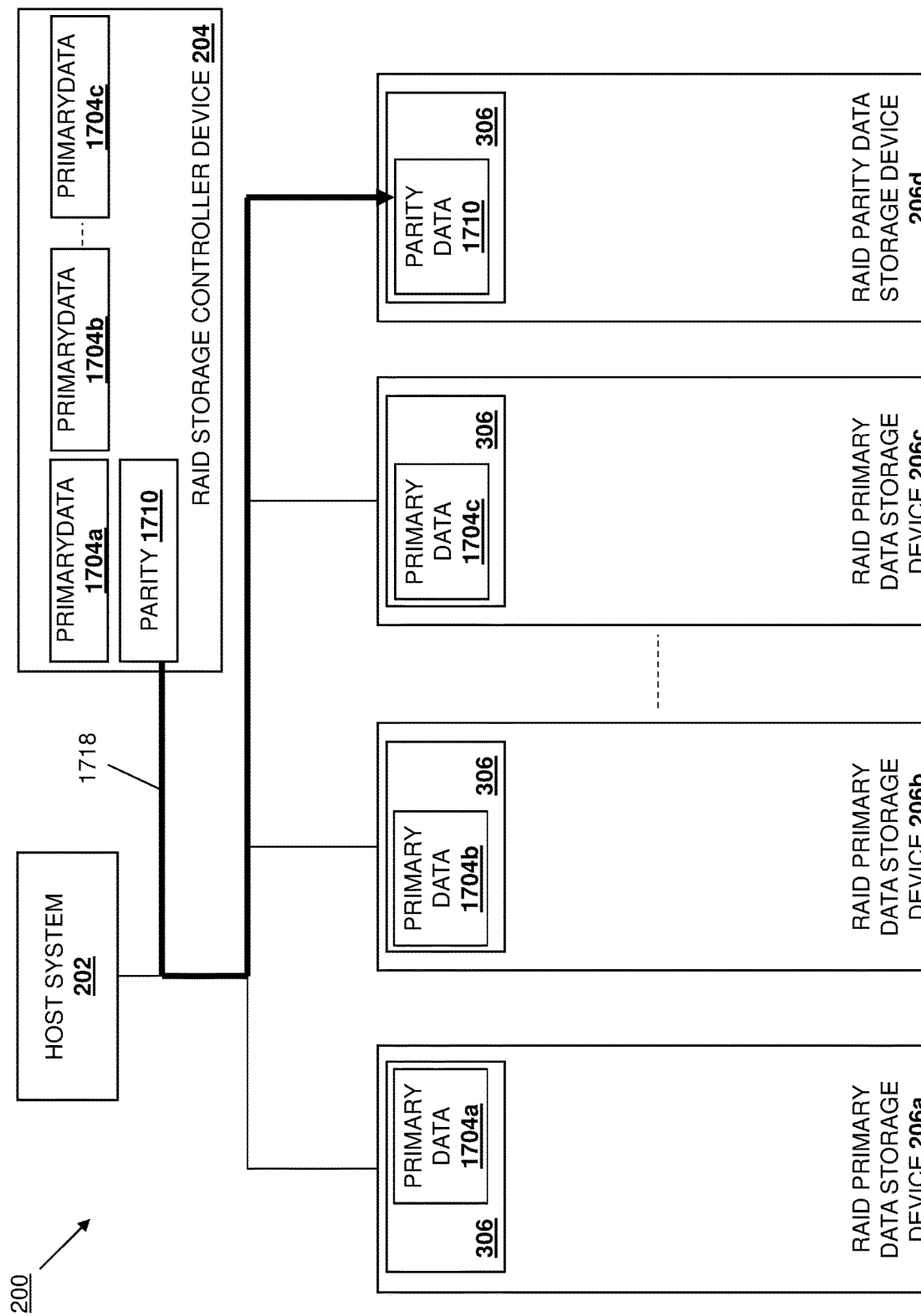
FIG. 17G is a schematic view illustrating an embodiment of the RAID storage system of FIG. 2 operating during the method of FIG. 15.

The method 1500 then proceeds to block 1508 where the RAID storage controller device writes the updated primary data to the RAID primary data storage device, and block 1510 where the RAID storage controller writes the updated parity data to the RAID parity data storage device. With reference to FIG. 17D, at block 1508 the RAID storage controller device 204 is illustrated performing a DMA operation 1712 that overwrites the primary data 1600a in the storage subsystem 306 in the RAID primary data storage device 206a with the primary data 1704a. Similarly, with reference to FIG. 17E, at block 1508 the RAID storage controller device 204 is illustrated performing a DMA operation 1714 that overwrites the primary data 1600b in the storage subsystem 306 in the RAID primary data storage device 206a with the primary data 1704b. Similarly, with reference to FIG. 17F, at block 1508 the RAID storage controller device 204 is illustrated performing a DMA operation 1716 that overwrites the primary data 1600c in the storage subsystem 306 in the RAID primary data storage device 206a with the primary data 1704c. Finally, with reference to FIG. 17F, at block 1510 the RAID storage controller device 204 is illustrated performing a DMA operation 1718 that overwrites the parity data 1602 in the storage subsystem 306 in the RAID parity data storage device 206d with the parity data 1710.

Figure 17H:
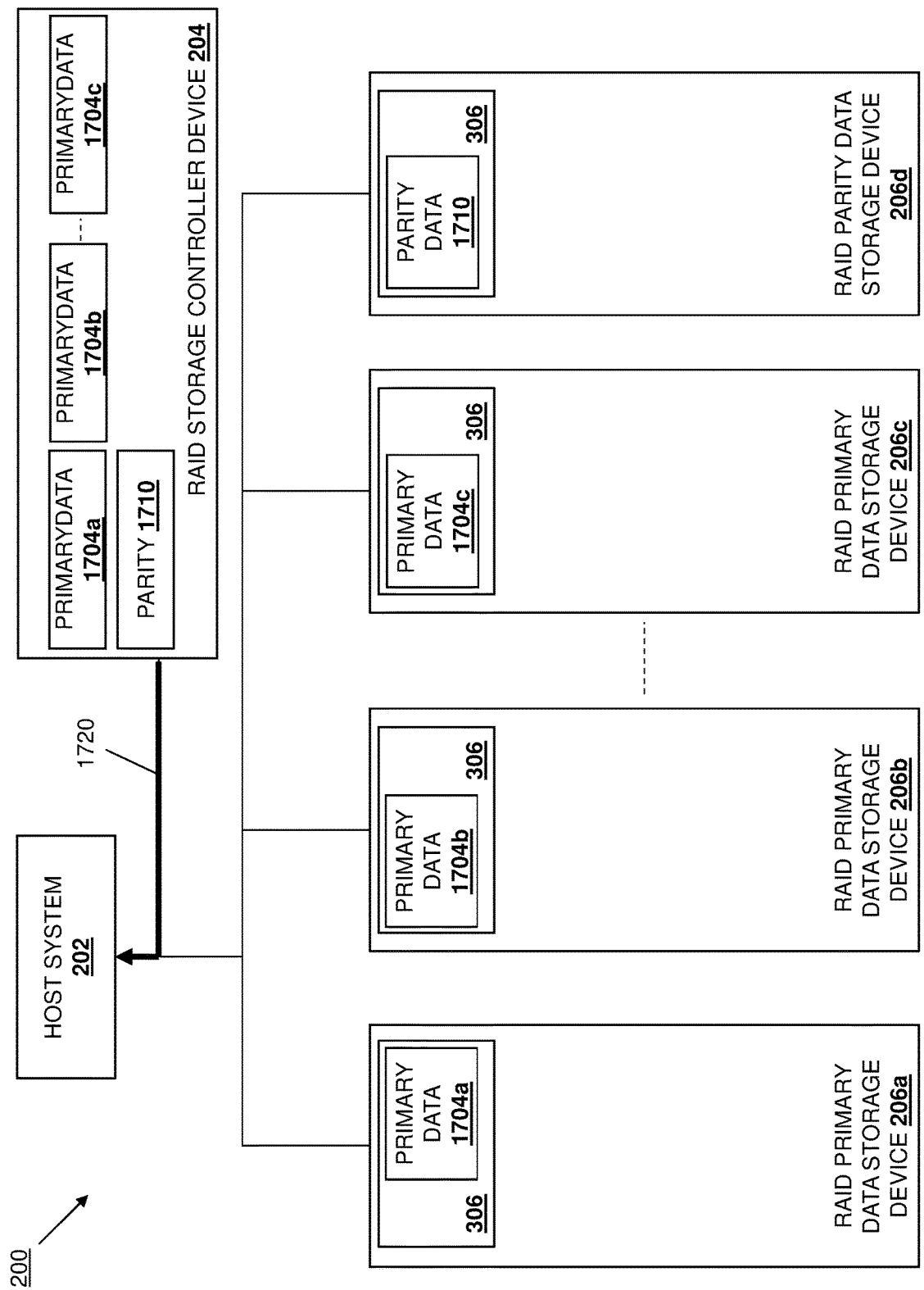
FIG. 17H is a schematic view illustrating an embodiment of the RAID storage system of FIG. 2 operating during the method of FIG. 15.

As such, following block 1510, the primary data 1600a in the RAID primary data storage device 206a has been updated with the primary data 1704a, the primary data 1600b in the RAID primary data storage device 206b has been updated with the primary data 1704b, the primary data 1600c in the RAID primary data storage device 206c has been updated with the primary data 1704c, and the parity data 1602 in the RAID parity data storage device 206d has been updated with the parity data 1710, thus allowing for the recovery of any of the primary data 1704a-1704c in the event that primary data becomes unavailable. FIG. 17H illustrates the RAID storage controller device 204 generating and transmitting a completion message 1720 to the host system 202 to indicate that the write command 1200 has been completed.

Thus, one of skill in the art in possession of the present disclosure will recognize that the operations of the RAID storage controller device 204 according to the method 1500 require more processing, memory, and/or other capabilities relative to the operations of the RAID storage controller device 204 during the method 400, illustrating an example of how the operations of the RAID data storage devices 206a-206d during the method 400 offload operations from the RAID storage controller device 204, increasing the ability of the RAID storage controller device to scale with high performance RAID storage devices, and/or providing the option of utilizing a RAID storage controller device with relatively lower processing, memory, and/or other capabilities. Furthermore, one of skill in the art in possession of the present disclosure will appreciate that the operations of a RAID storage controller device that is located between the host system 202 and the RAID data storage devices 206a-206d (i.e., rather than the "look aside" RAID storage controller device configuration described herein) will include similar processing and memory intensive operations that can be eliminated by the teachings of the systems and methods described herein.

Figure 18:
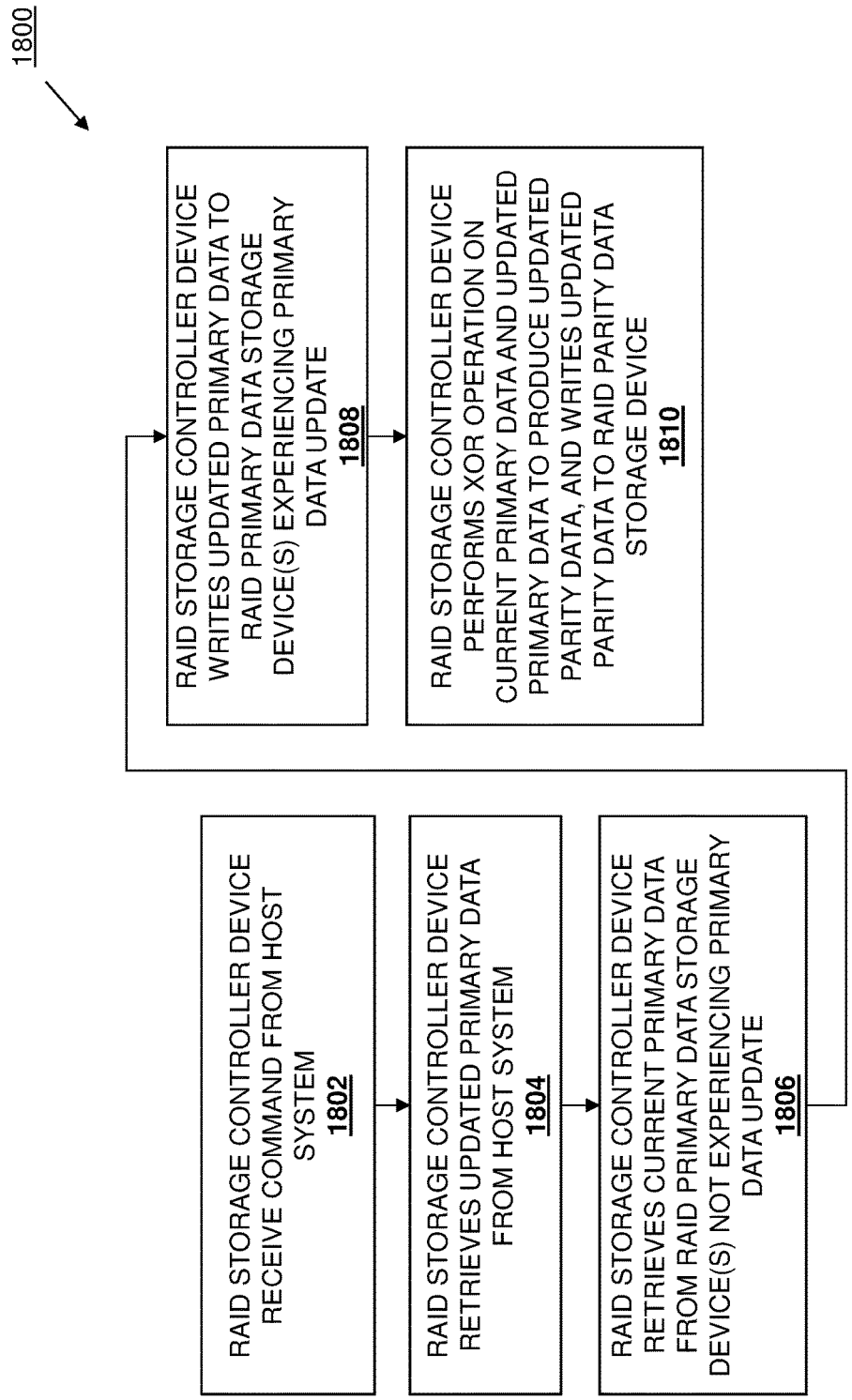
FIG. 18 is a flow chart illustrating an embodiment of a method for performing partial stripe data update operations using RAID storage controller device.

Referring now to FIG. 18, an embodiment of a method 1800 for performing partial stripe data update operations using a RAID storage controller device is illustrated. As discussed below, the systems and methods discussed above reduce the requirements of RAID storage controller devices to enable data updates relative to systems that require the performance of data update operations by a RAID storage controller device. For example, as discussed below, a RAID storage controller device may be required to retrieve updated primary data from a host system, and current primary data from each RAID primary data storage device that is not experiencing a primary data update, and then overwrite the current primary data in each RAID primary data storage device that is experiencing a primary data update with its respective updated primary data. Furthermore, the RAID storage controller device may then be required to perform an XOR operation on the current primary data and the updated primary data in order to produce updated parity data, and overwrite the current parity data in the RAID parity data storage device with the updated parity date. As such, while partial stripe data update operations may be performed by the RAID storage controller device, such RAID storage controller device update operations are associated with relatively high processing, memory, and/or other RAID storage controller requirements.

Figure 19:
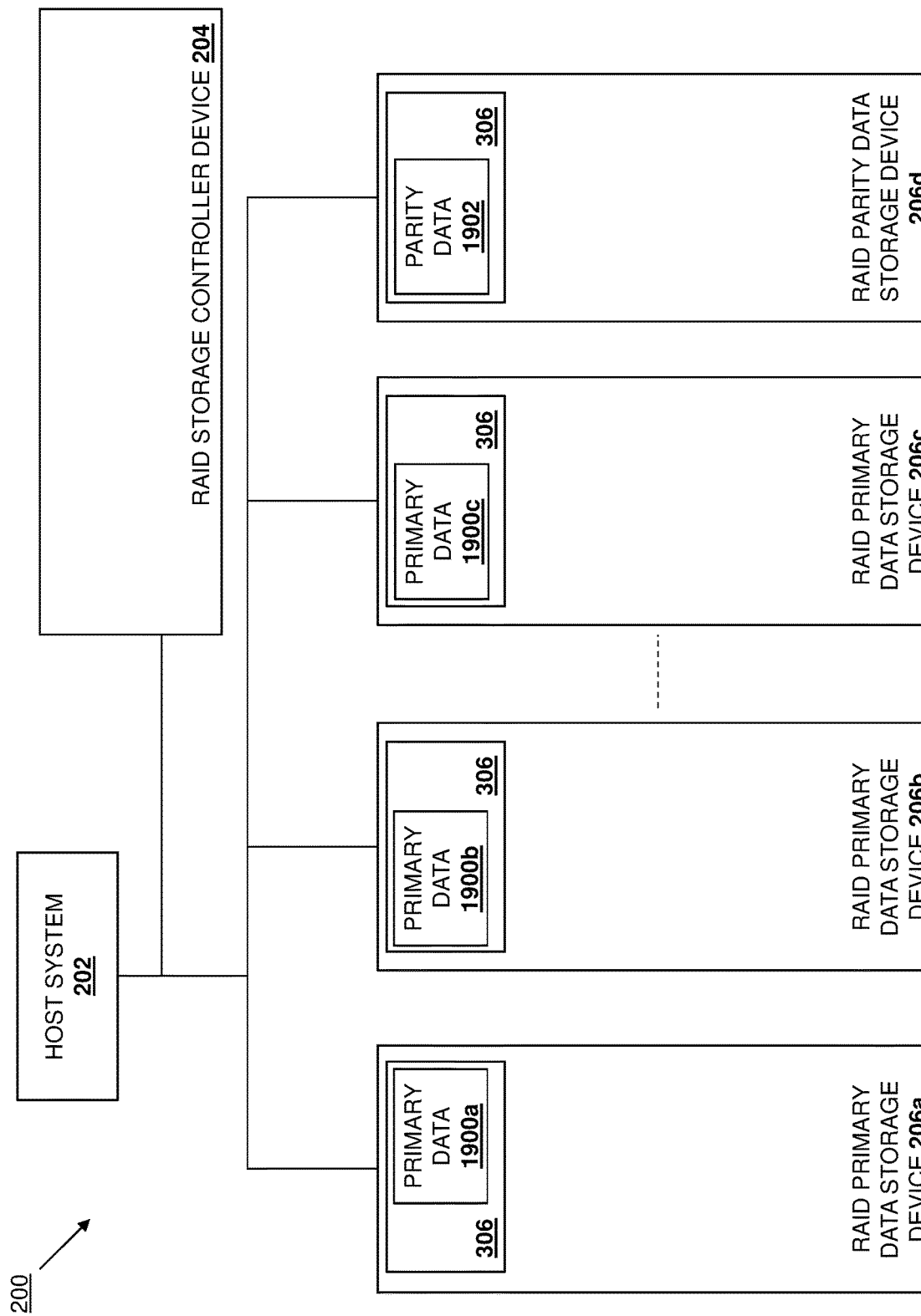
FIG. 19 is a schematic view illustrating an embodiment of the RAID storage system of FIG. 2 operating during the method of FIG. 18.

With reference to FIG. 19, the RAID storage system 200 is illustrated with the RAID primary data storage device 206a storing primary data 1900a in its storage subsystem 306, the RAID primary data storage device 206b storing primary data 1900b in its storage subsystem 306, and the RAID primary data storage device 206c storing primary data 1900c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1902 in its storage subsystem 306, and one of skill in the art in possession of the present disclosure will recognize that the parity data 1902 may have been generated via an XOR operation performed on the primary data 1900a-1900c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 19 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 20A:
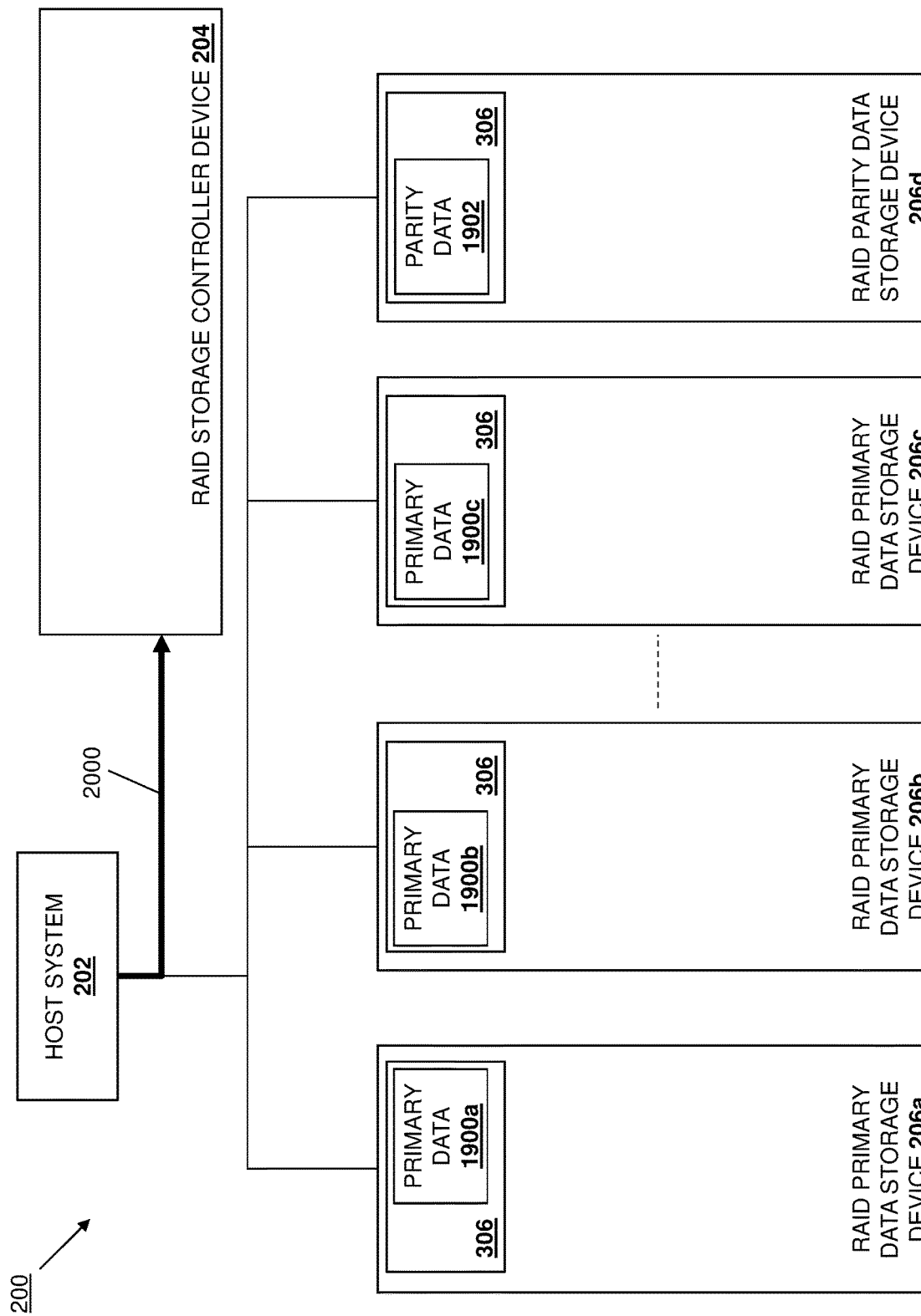
FIG. 20A is a schematic view illustrating an embodiment of the RAID storage system of FIG. 2 operating during the method of FIG. 18.

The method 1800 begins at block 1802 where RAID storage controller device receives a command from a host system. With reference to FIG. 20A, the host system 202 may generate a write command 2000 that instructs the writing of primary data that is located on the host system 200 to the RAID primary data storage devices 206a-206c, and may transmit that write command 2000 to the RAID storage controller device 204. As will be appreciated by one of skill in the art in possession of the present disclosure, the generation and/or transmission of the write command 2000 by the host system 202 to the RAID storage controller device 204 at block 1802 may include a variety of control plane communications between the host system 202 and the RAID storage controller device 204 that have been omitted for clarity of discussion. As such, at block 1802, the RAID storage controller device 204 may receive the write command 2000.

Figure 20B:
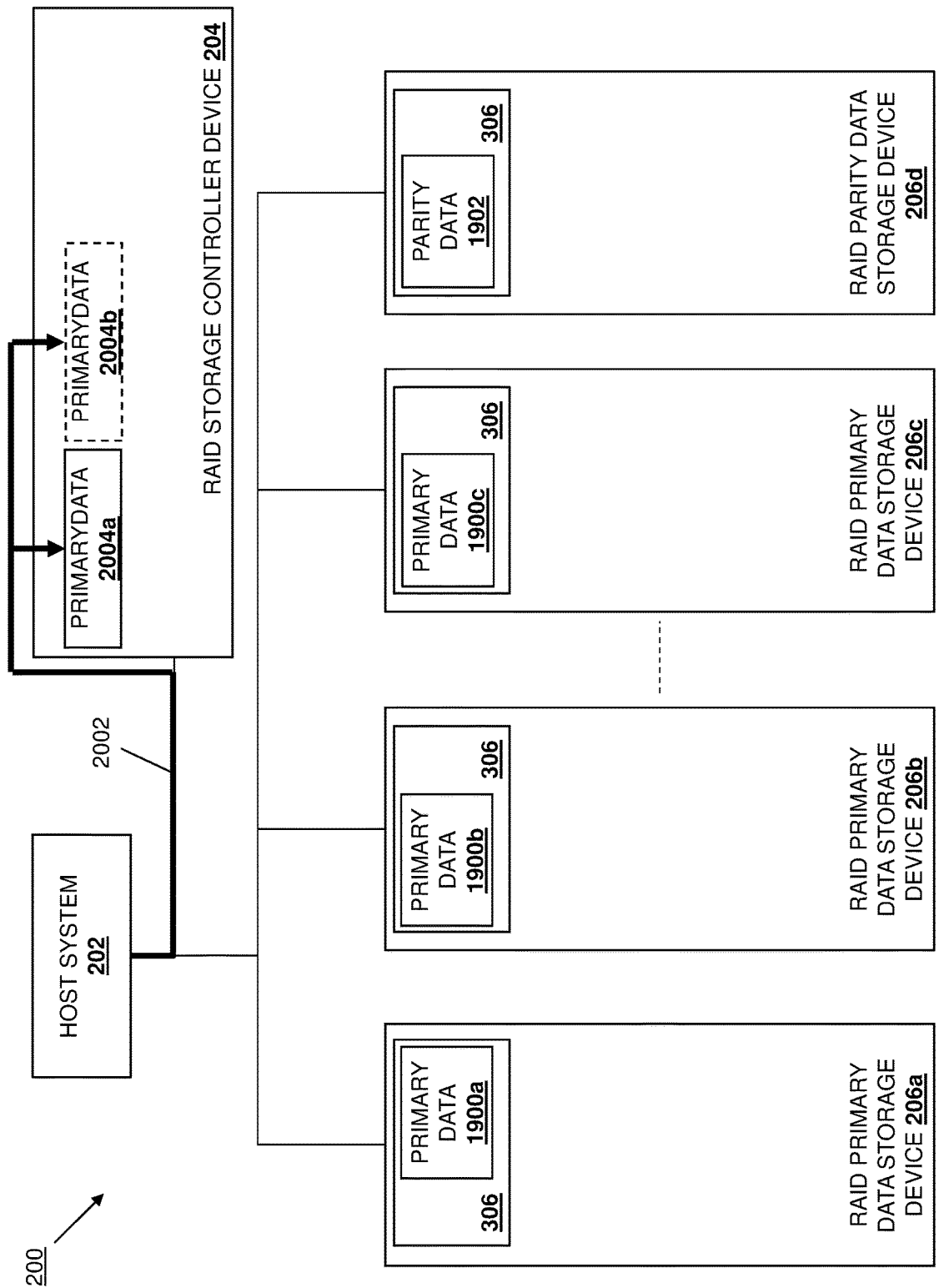
FIG. 20B is a schematic view illustrating an embodiment of the RAID storage system of FIG. 2 operating during the method of FIG. 18.

The method 1800 then proceeds to block 1804 where the RAID storage controller device retrieves updated primary data from the host system. With reference to FIG. 20B, the RAID storage controller device 204 is illustrated performing a DMA operation 2002 that accesses primary data 2004a and up to primary data 2004b that is stored on the host system 202 (e.g., in a memory system or storage system included on the host system 202), and writes that primary data 2004a-2004b to a buffer subsystem in the RAID storage controller device 204 (not illustrated, but similar to the device buffers in the RAID primary data storage devices described in the examples above). As will be appreciated by one of skill in the art in possession of the present disclosure, the primary data 2004a-2004b may be updates to some of the primary data stored in the RAID primary data storage devices 206a-206c (e.g., the primary data 1900a-1900b stored in the storage subsystems 306 in the RAID primary data storage devices 206a and 206b in the examples below), although other primary data writing scenarios will fall within the scope of the present disclosure as well. In the examples below, the partial stripe write is indicated by providing the primary data 2004a in solid lines and providing the primary data 2004b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed above). As such, one of skill in the art in possession of the present disclosure will appreciate that updated primary data may be retrieved at block 1804 for any subset of the RAID primary storage devices 206a-206c.

Figure 20C:
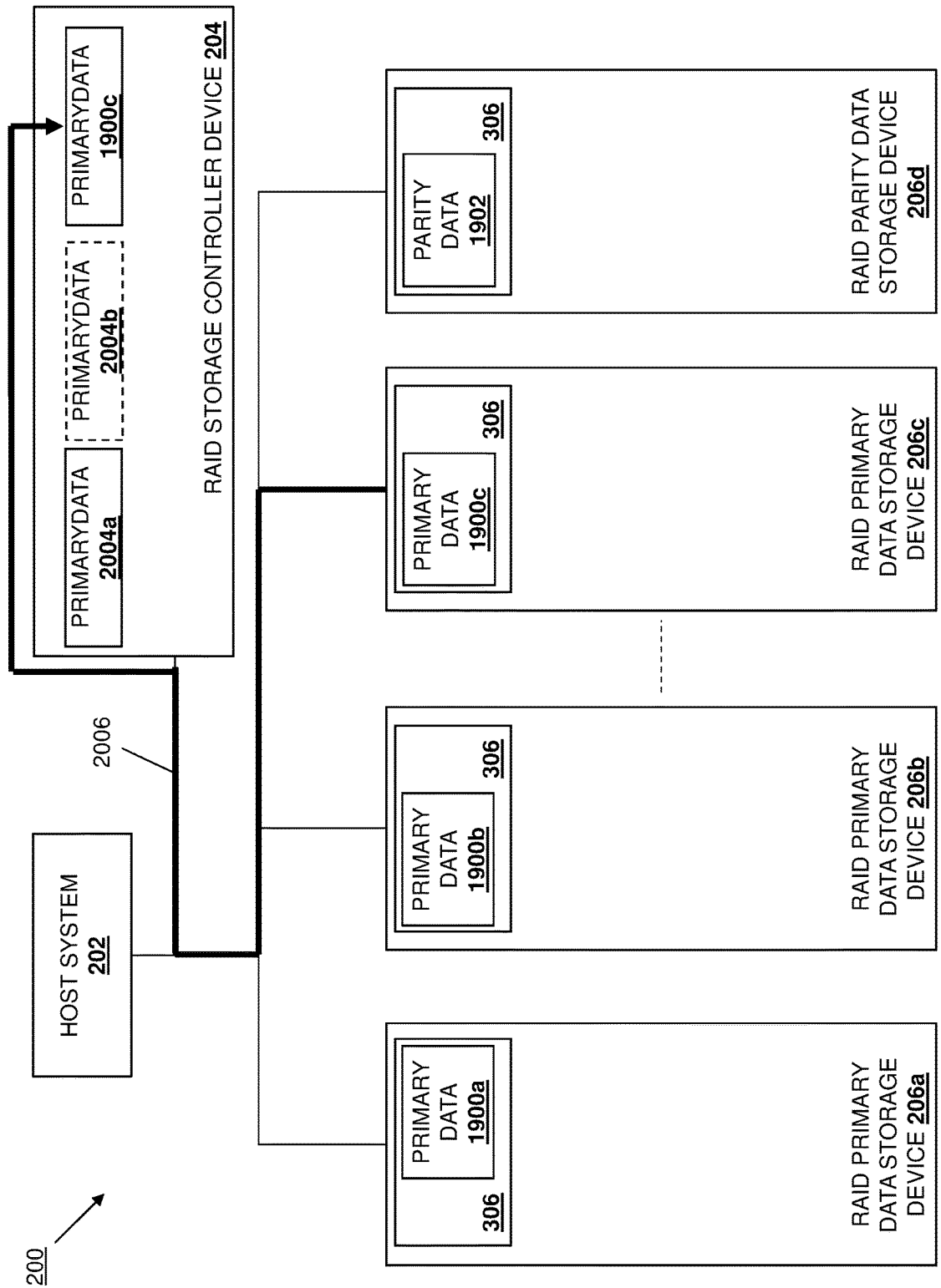
FIG. 20C is a schematic view illustrating an embodiment of the RAID storage system of FIG. 2 operating during the method of FIG. 18.

The method 1800 then proceeds to block 1806 where the RAID storage controller device retrieves current primary data from the RAID primary data storage devices that are not experiencing a primary data update, and then to block 1808 where the RAID storage controller device writes the updated primary data to the RAID primary data storage devices that are experiencing a primary data update. With reference to FIG. 20C, at block 1806 the RAID storage controller device 204 is illustrated performing a DMA operation 2006 that accesses the storage subsystem 306 in the RAID primary data storage device 206c (which is not having its primary data updated in this example), and writes the primary data 1900c to the buffer subsystem in the RAID storage controller device 204 (not illustrated, but similar to the device buffers in the RAID primary data storage devices described in the examples above). While only one RAID primary data storage device that is not experiencing a primary data update is illustrated as having its current primary data retrieved, one of skill in the art in possession of the present disclosure will recognize that any number of RAID primary data storage devices that are not experiencing a primary data update may have their current primary data retrieved while remaining within the scope of the present disclosure as well.

Figure 20D:
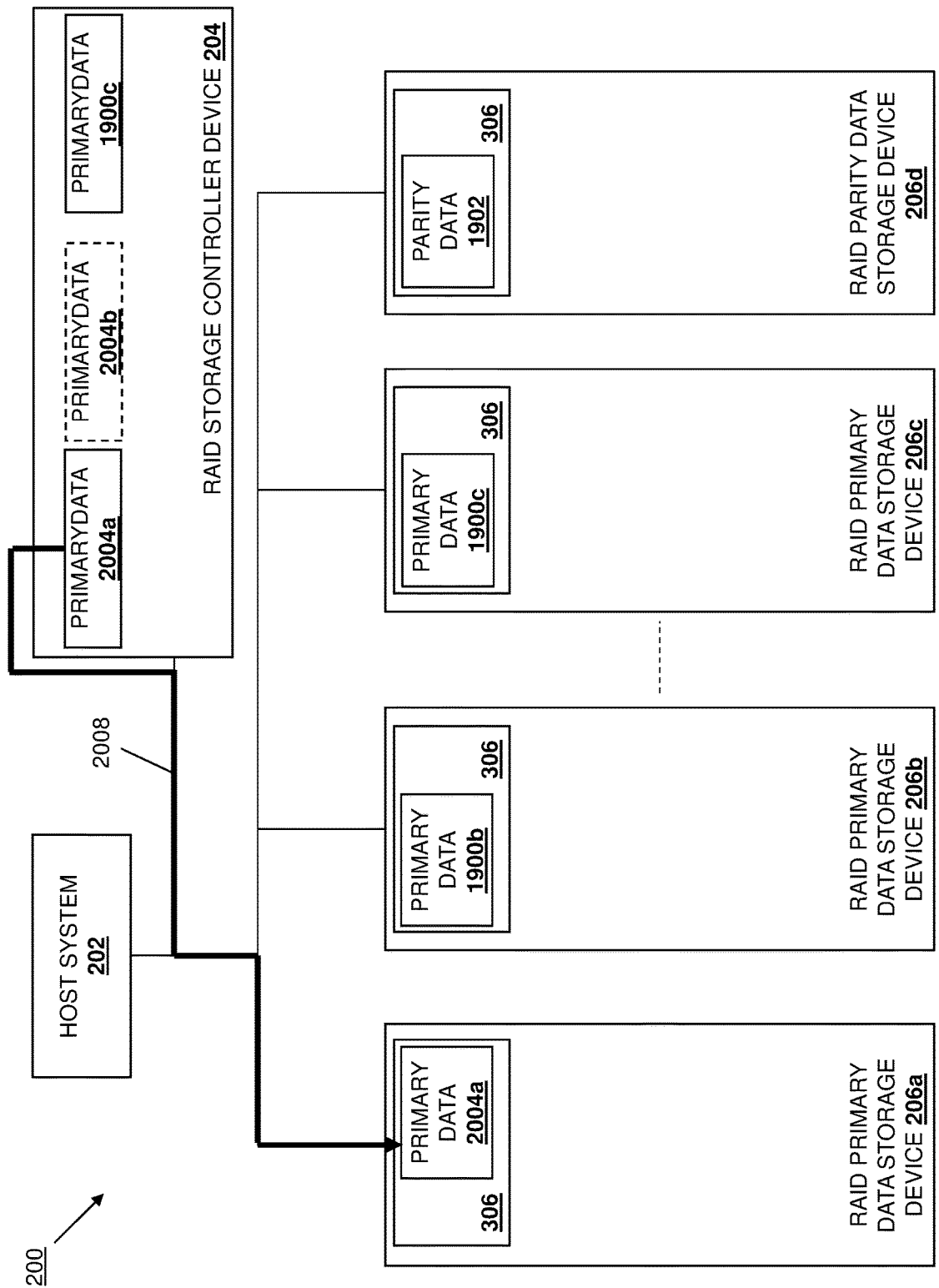
FIG. 20D is a schematic view illustrating an embodiment of the RAID storage system of FIG. 2 operating during the method of FIG. 18.
Figure 20E:
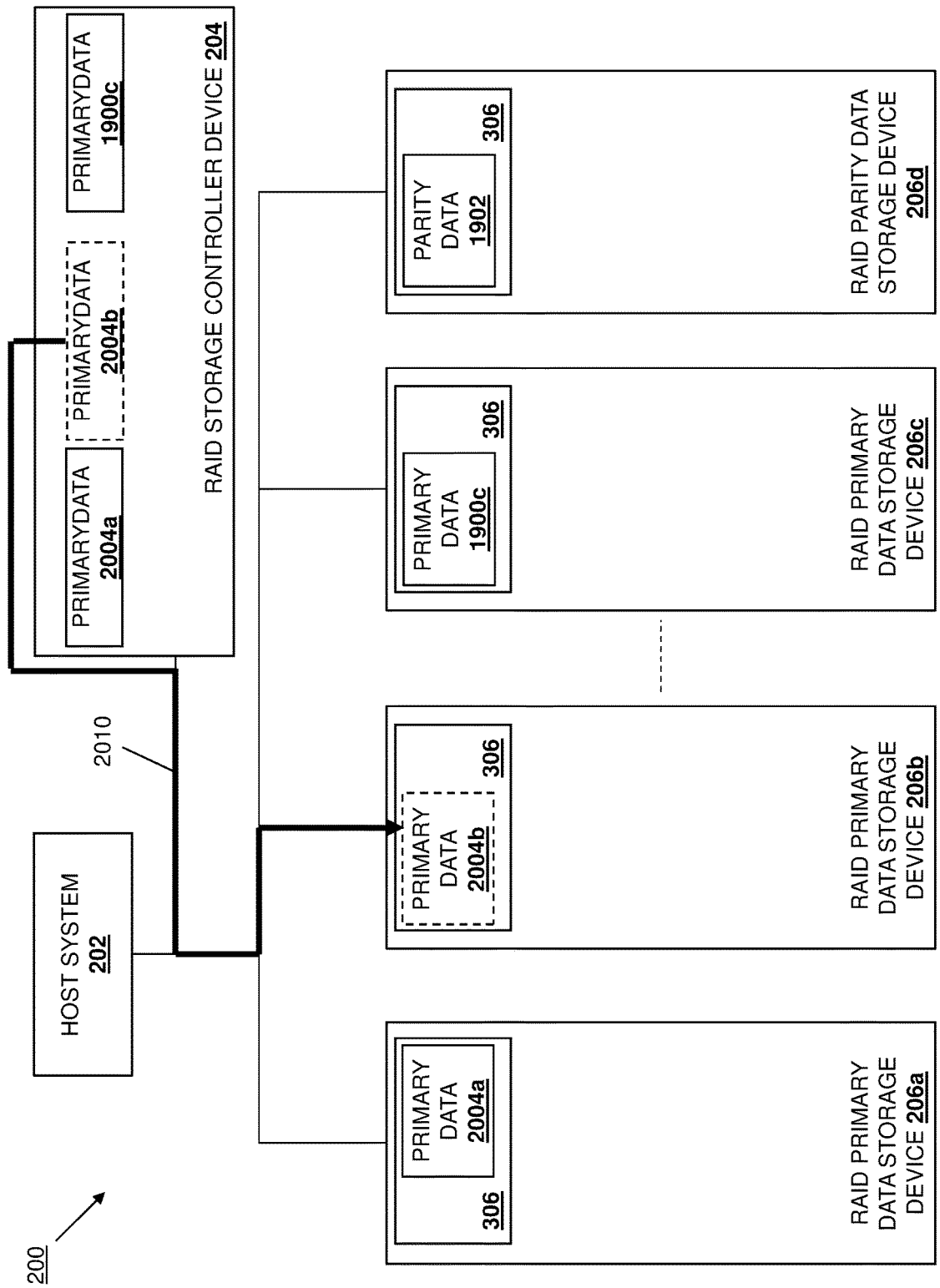
FIG. 20E is a schematic view illustrating an embodiment of the RAID storage system of FIG. 2 operating during the method of FIG. 18.

With reference to FIG. 20D, at block 1808 the RAID storage controller device 204 is illustrated performing a DMA operation 2008 that writes the primary data 2004a to the storage subsystem 306 in the RAID primary data storage device 206a. Similarly, with reference to FIG. 20E, at block 1808 the RAID storage controller device 204 is illustrated performing a DMA operation 2010 that writes the primary data 2004b to the storage subsystem 306 in the RAID primary data storage device 206b. While only two RAID primary data storage device are illustrated as receiving updated primary data, one of skill in the art in possession of the present disclosure will recognize that any number of RAID primary data storage devices may receive updated primary data at block 1808 while remaining within the scope of the present disclosure as well.

Figure 20F:
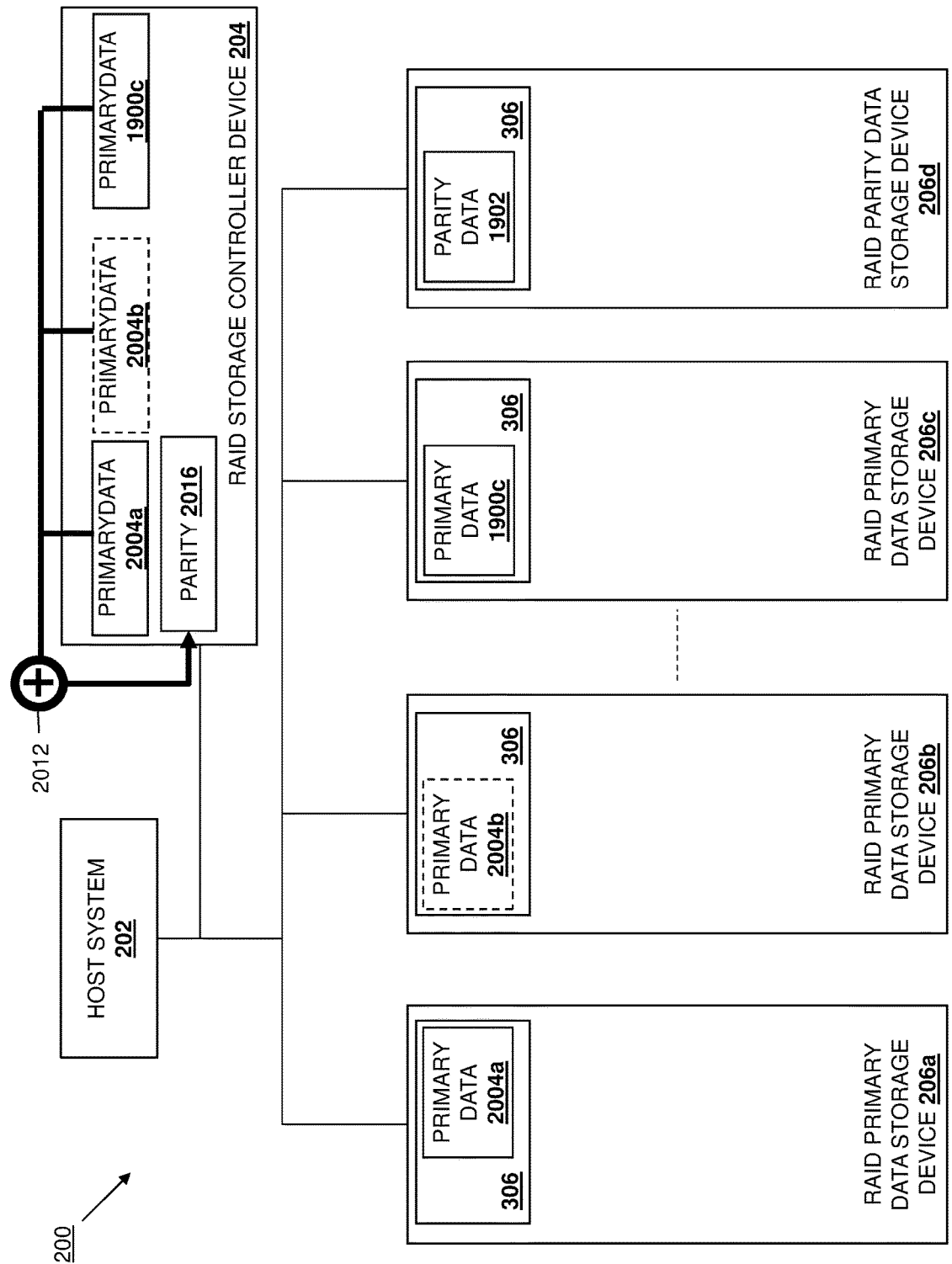
FIG. 20F is a schematic view illustrating an embodiment of the RAID storage system of FIG. 2 operating during the method of FIG. 18.
Figure 20G:
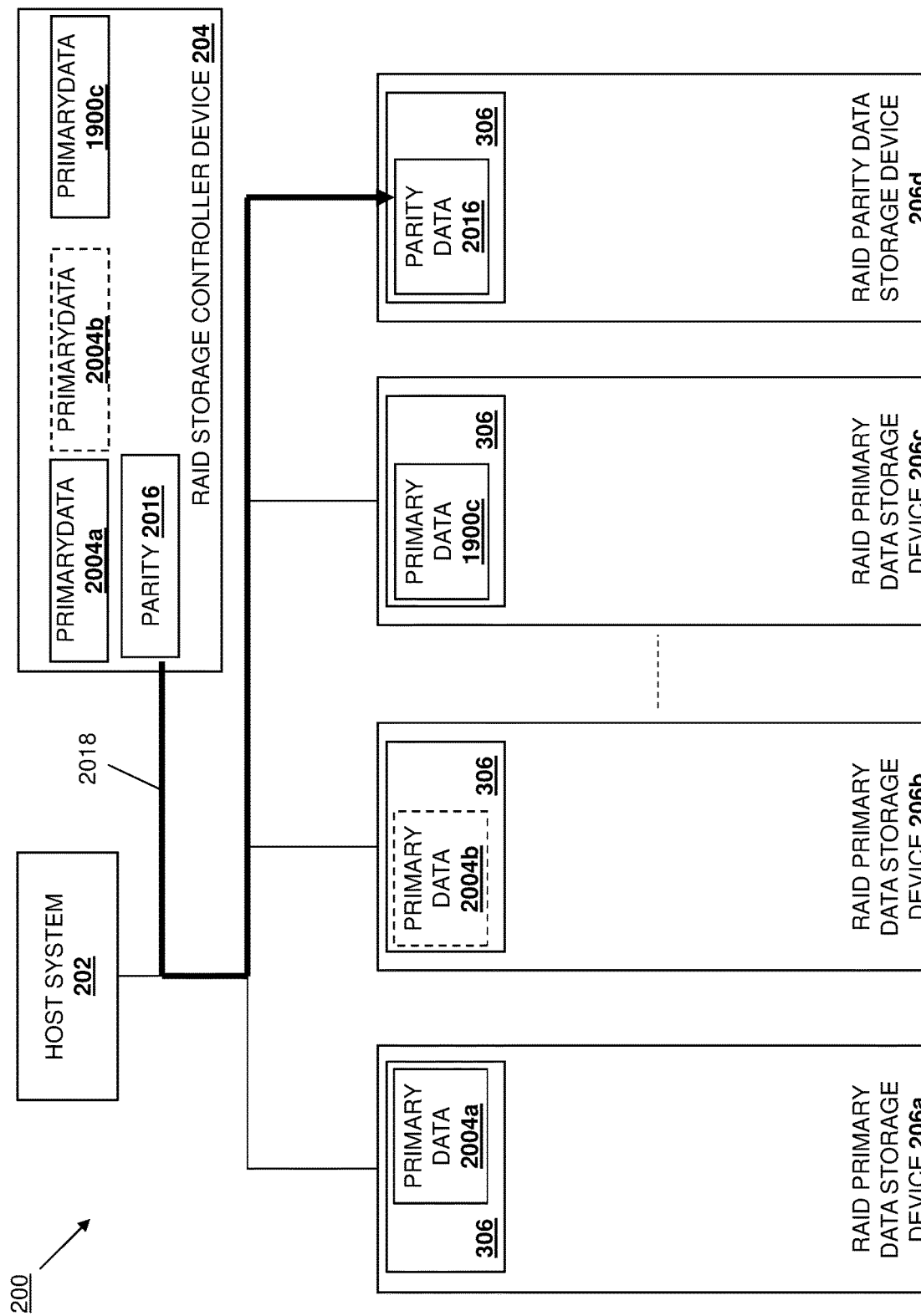
FIG. 20G is a schematic view illustrating an embodiment of the RAID storage system of FIG. 2 operating during the method of FIG. 18.
Figure 20H:
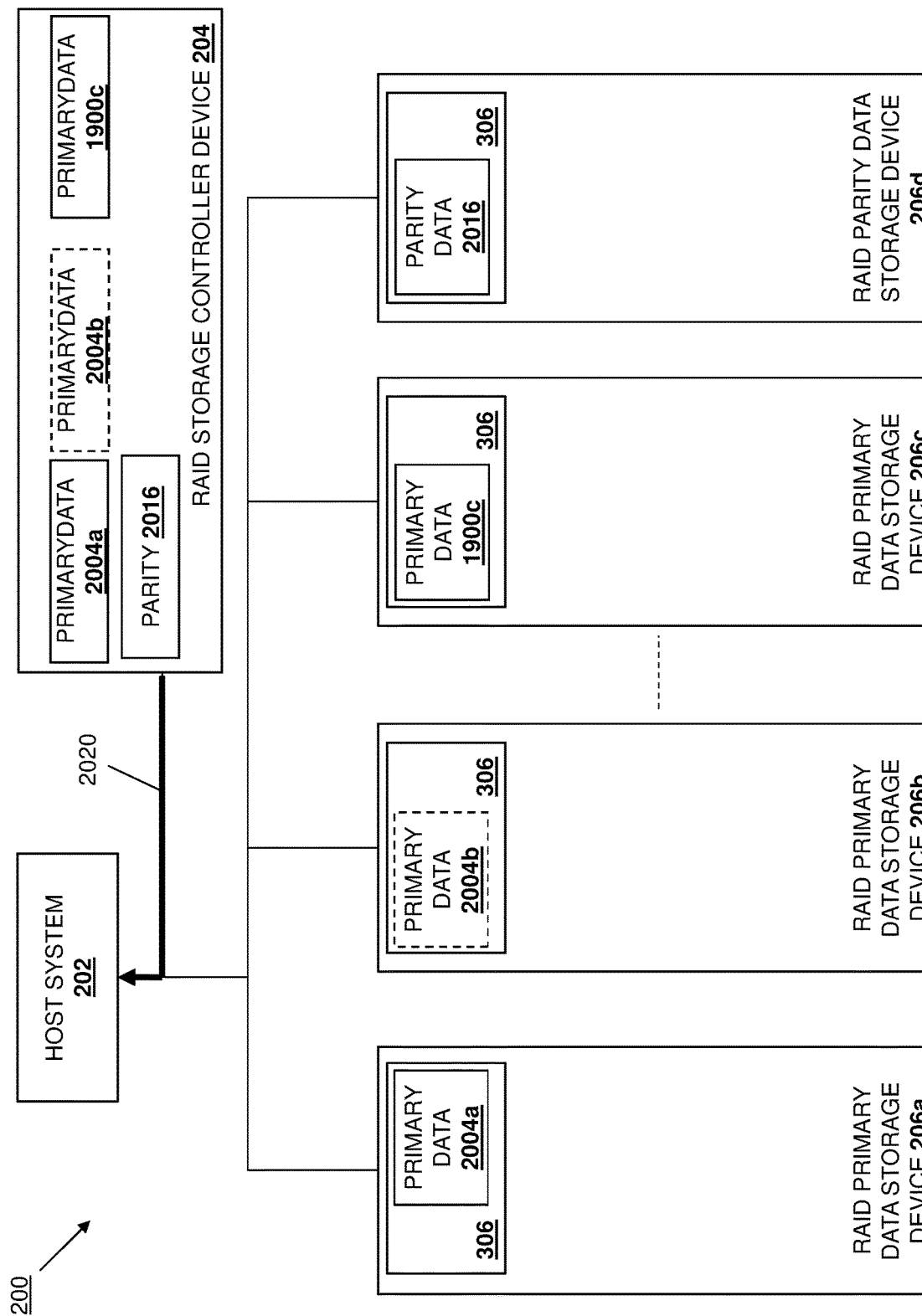
FIG. 20H is a schematic view illustrating an embodiment of the RAID storage system of FIG. 2 operating during the method of FIG. 18.

The method 1800 then proceeds to block 1810 where the RAID storage controller device performs an XOR operation on current primary data and updated primary data in order to produce updated parity data, and writes the updated parity data to the RAID parity data storage device. With reference to FIG. 20F, at block 1810 the RAID storage controller device 204 is illustrated performing an XOR operation 2012 on the primary data 2004a, the primary data 2004b, and the primary data 1900c in order to produce parity data 2016. Furthermore, with reference to FIG. 20G, at block 1810 the RAID storage controller device 204 is illustrated performing a DMA operation 2018 that overwrites the parity data 1902 in the storage subsystem 306 in the RAID parity data storage device 206d with the parity data 2016. As such, following block 1810, the primary data 1900a in the RAID primary data storage device 206a has been updated with the primary data 2004a, the primary data 1900b in the RAID primary data storage device 206b has been updated with the primary data 2004b, and the parity data 1902 in the RAID parity data storage device 206d has been updated with the parity data 2016, thus allowing for the recovery of any one of the primary data 2004a, 2004b, and 1900c in the event that primary data becomes unavailable. FIG. 20H illustrates the RAID storage controller device 204 generating and transmitting a completion message 2020 to the host system 202 to indicate that the write command 2000 has been completed.

Thus, one of skill in the art in possession of the present disclosure will recognize that the operations of the RAID storage controller device 204 according to the method 1800 require more processing, memory, and/or other capabilities relative to the operations of the RAID storage controller device 204 during the method 400, illustrating an example of how the operations of the RAID data storage devices 206a-206d during the method 400 offload operations from the RAID storage controller device 204, increasing the ability of the RAID storage controller device to scale with high performance RAID storage devices, and/or providing the option of utilizing a RAID storage controller device with relatively lower processing, memory, and/or other capabilities. Furthermore, one of skill in the art in possession of the present disclosure will appreciate that the operations of a RAID storage controller device that is located between the host system 202 and the RAID data storage devices 206a-206d (i.e., rather than the "look aside" RAID storage controller device configuration described herein) will include similar processing and memory intensive operations that can be eliminated by the teachings of the systems and methods described herein.

Figure 21:
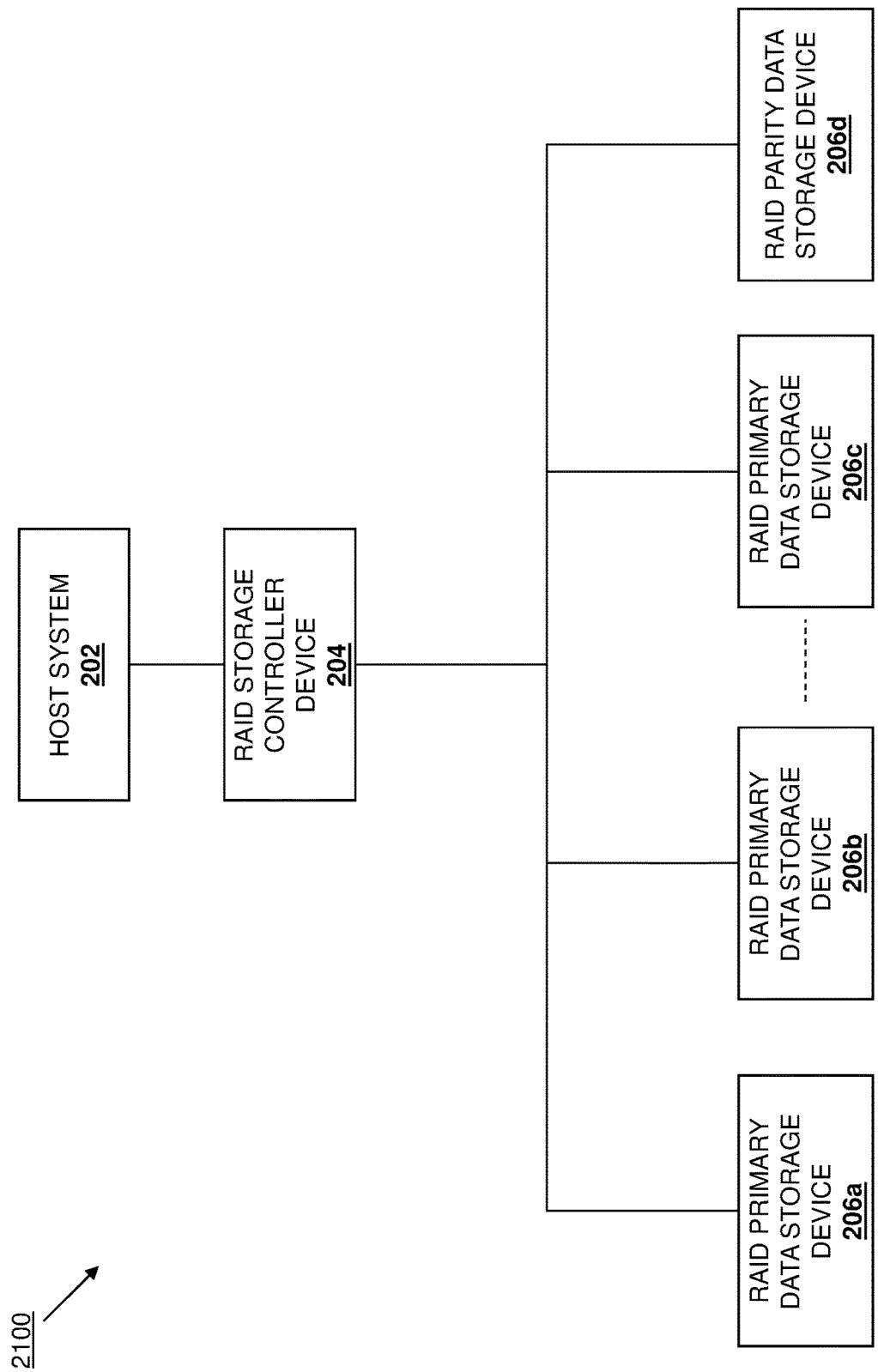
FIG. 21 is a schematic view illustrating an embodiment of a RAID storage system.

For example, referring now to FIG. 21, an embodiment of a Redundant Array of Independent Disks (RAID) storage system 2100 is illustrated that includes the same components of the RAID storage system 200 discussed above with reference to FIG. 2 and, as such, those components are provided the same reference numbers as corresponding components in the RAID storage system 200. In the illustrated embodiment, the RAID storage system 2100 incudes the host system 202, with the RAID storage controller device 204 coupled to the host system 202 in a "in-line" RAID storage controller device configuration that provides the RAID storage controller device 204 between the host system 202 and each of the RAID data storage devices 206a-206d. As discussed in further detail below, the "in-line" RAID storage controller device configuration require the RAID storage controller device 204 to manage data transfers between the host system 202 and the RAID data storage devices 206a-206d, thus increasing the number RAID storage controller operations that must be performed by the RAID storage controller device 204 as compared to RAID storage controller devices provided according to the teachings of the present disclosure.

Figure 22:
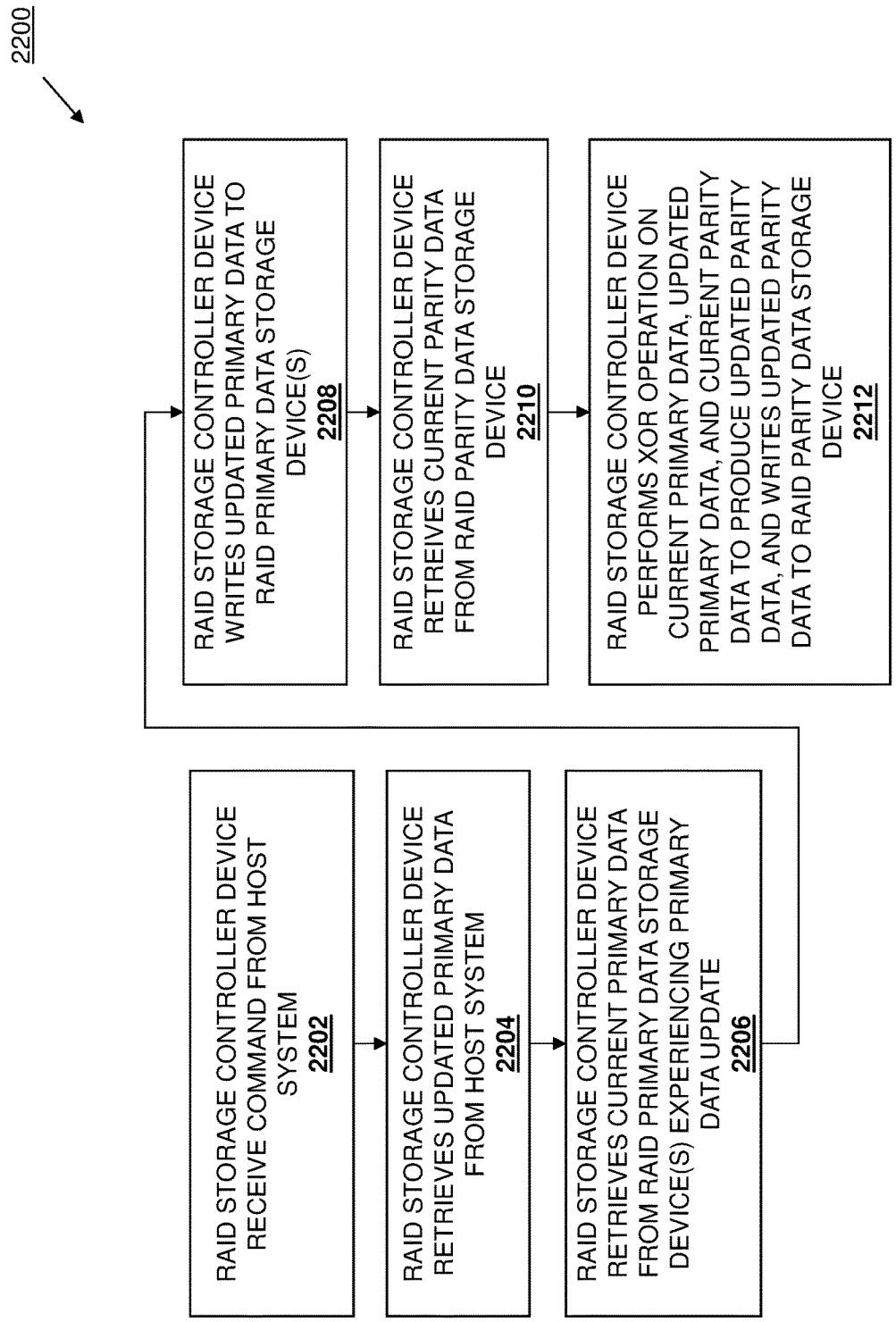
FIG. 22 is a flow chart illustrating an embodiment of a method for performing partial stripe data update operations using RAID storage controller device.
Figure 23:
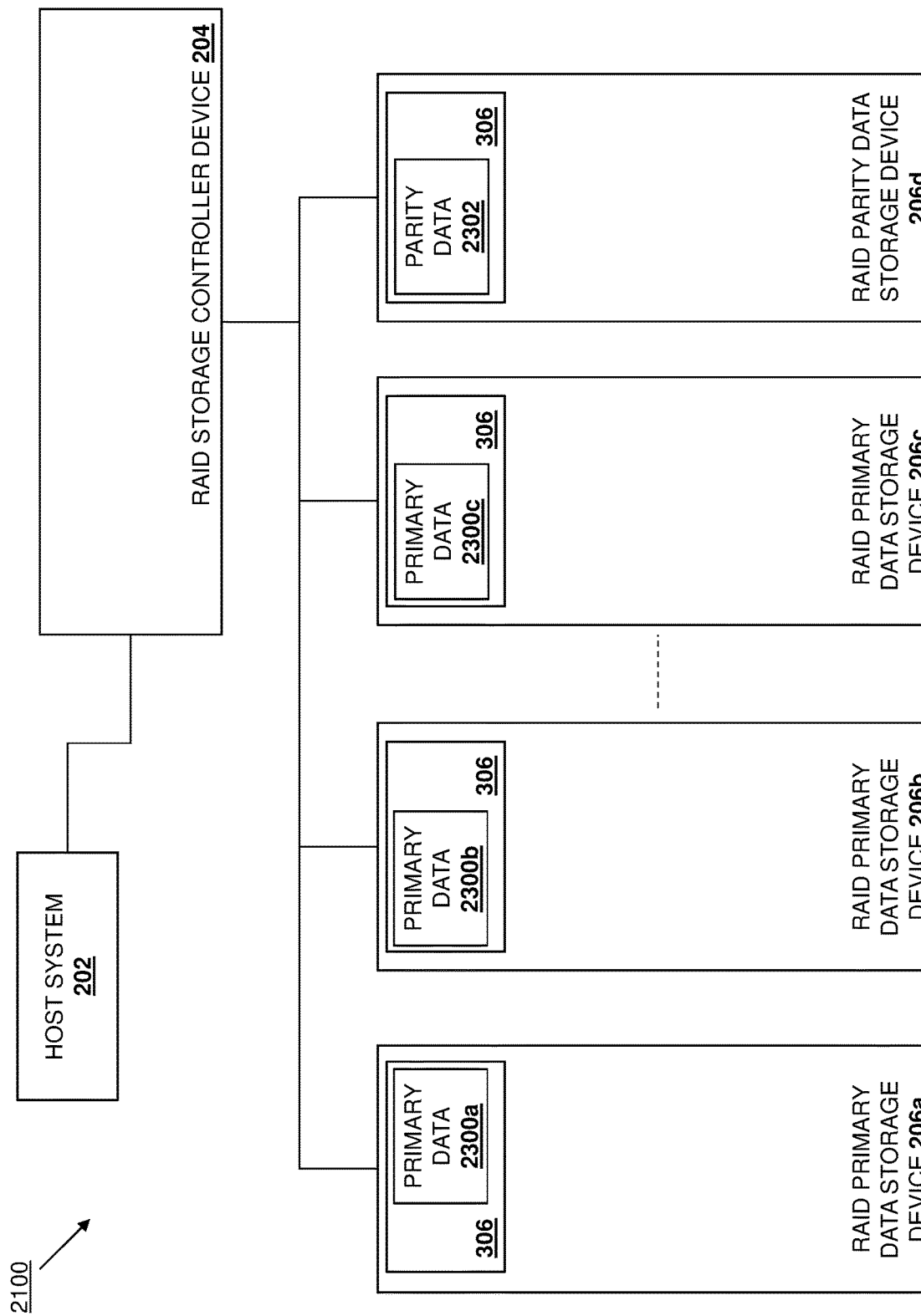
FIG. 23 is a schematic view illustrating an embodiment of the RAID storage system of FIG. 21 operating during the method of FIG. 22.

Referring now to FIG. 22, an embodiment of a method 2200 for performing partial stripe data update operations using an "in-line" RAID storage controller device is illustrated. With reference to FIG. 23, the RAID storage system 2100 is illustrated with the RAID primary data storage device 206a storing primary data 2300a in its storage subsystem 306, the RAID primary data storage device 206b storing primary data 2300b in its storage subsystem 306, and the RAID primary data storage device 206c storing primary data 2300c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 2100 is also illustrated with the RAID parity data storage device 206d storing parity data 2302 in its storage subsystem 306, and one of skill in the art in possession of the present disclosure will recognize that the parity data 2302 may have been generated via an XOR operation performed on the primary data 2300a-2300c in the RAID primary data storage devices 206a-206c, and allows for the rebuilding of any primary data stored on any one RAID primary data storage device in the event that primary data/RAID primary data storage device becomes unavailable.

Similarly as discussed above, the primary/parity data storage configuration illustrated in FIG. 23 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) Thus, it should be understood that the same RAID storage device may act as both a RAID primary data storage device and a RAID parity data storage device for different data stripes.

Figure 24A:
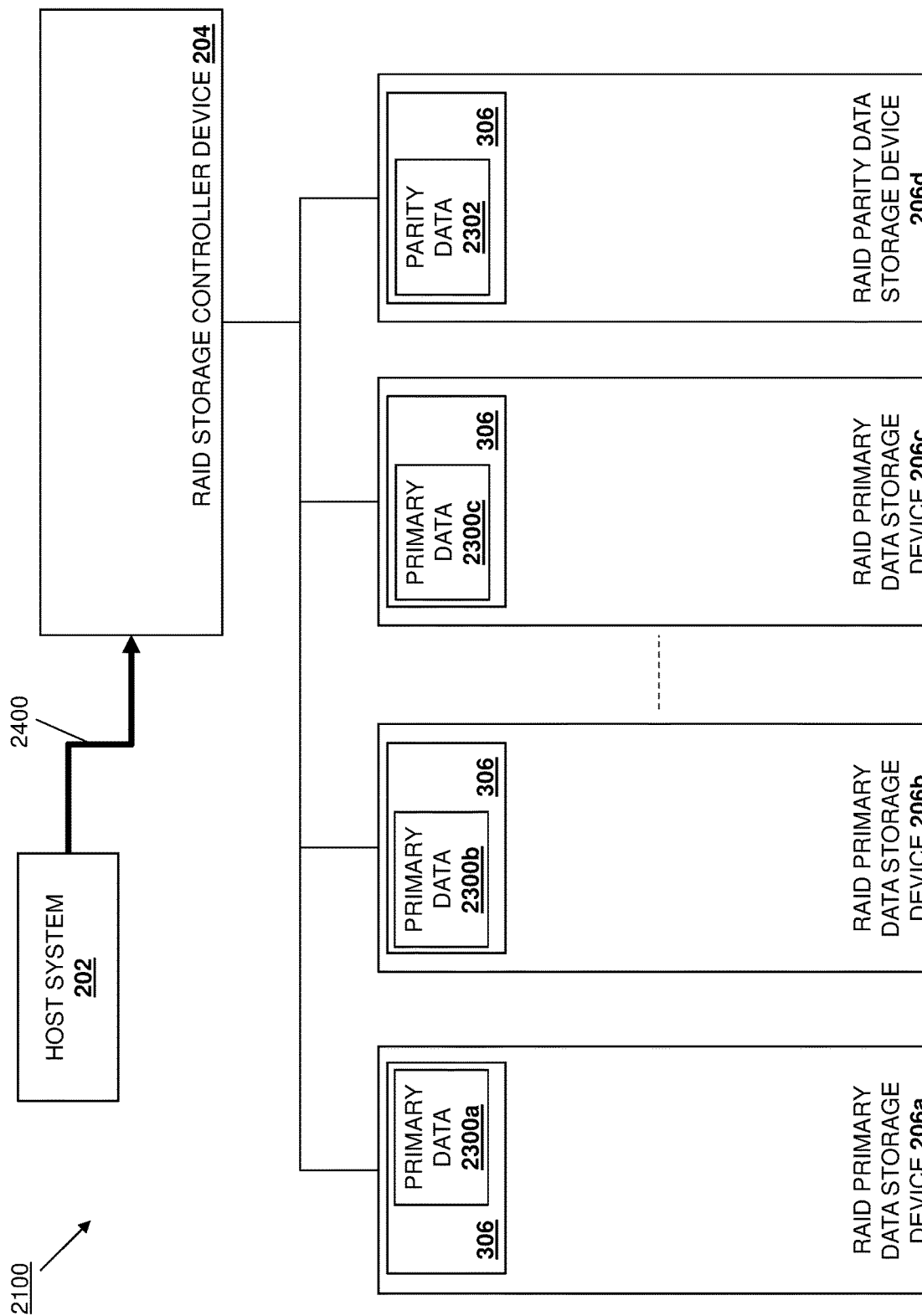
FIG. 24A is a schematic view illustrating an embodiment of the RAID storage system of FIG. 21 operating during the method of FIG. 22.

The method 2200 begins at block 2202 where RAID storage controller device receives a command from a host system. With reference to FIG. 24A, the host system 202 may generate a write command 2400 that instructs the writing of primary data that is located on the host system 200 to the RAID primary data storage devices 206a-206c, and may transmit that write command 2400 to the RAID storage controller device 204. As will be appreciated by one of skill in the art in possession of the present disclosure, the generation and/or transmission of the write command 2400 by the host system 202 to the RAID storage controller device 204 at block 2202 may include a variety of control plane communications between the host system 202 and the RAID storage controller device 204 that have been omitted for clarity of discussion. As such, at block 2202, the RAID storage controller device 204 may receive the write command 2400.

Figure 24B:
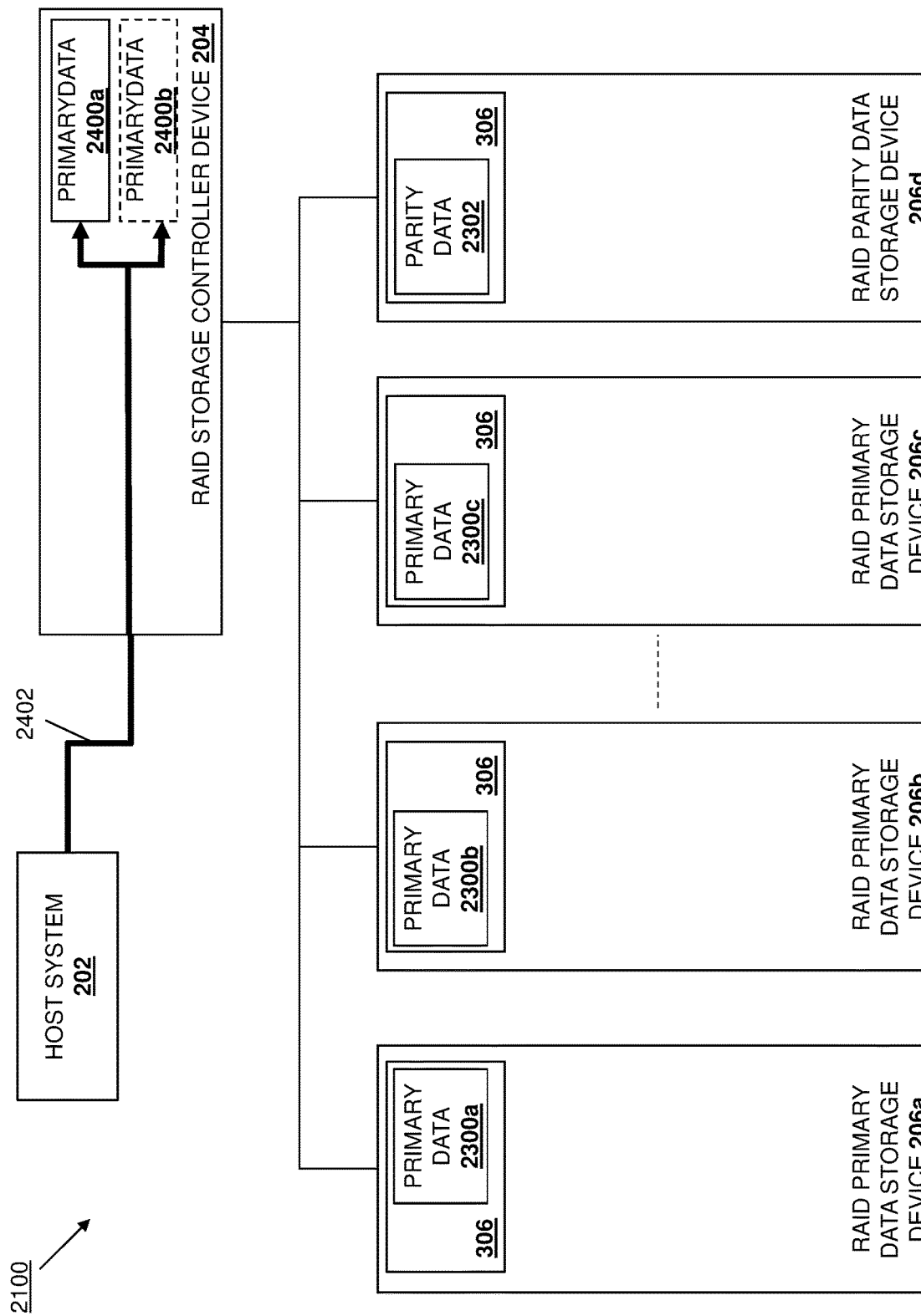
FIG. 24B is a schematic view illustrating an embodiment of the RAID storage system of FIG. 21 operating during the method of FIG. 22.

The method 2200 then proceeds to block 2204 where the RAID storage controller device retrieves updated primary data from the host system. With reference to FIG. 24B, the RAID storage controller device 204 is illustrated performing a DMA operation 2402 that accesses primary data 2400a and up to primary data 2400b that is stored on the host system 202 (e.g., in a memory system or storage system included on the host system 202), and writes that primary data 2400a-2400b to a buffer subsystem in the RAID storage controller device 204 (not illustrated, but similar to the device buffers in the RAID primary data storage devices described in the examples above). As will be appreciated by one of skill in the art in possession of the present disclosure, the primary data 2400a-2400b may be updates to some of the primary data stored in the RAID primary data storage devices 206a-206c (e.g., the primary data 2300a-2300b stored in the storage subsystems 306 in the RAID primary data storage devices 206a and 206b in the examples below), although other primary data writing scenarios will fall within the scope of the present disclosure as well. In the examples below, the partial stripe write is indicated by providing the primary data 2400a in solid lines and providing the primary data 2400b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed below). As such, one of skill in the art in possession of the present disclosure will appreciate that updated primary data may be retrieved at block 2204 for any subset of the RAID primary storage devices 206a-206c.

Figure 24C:
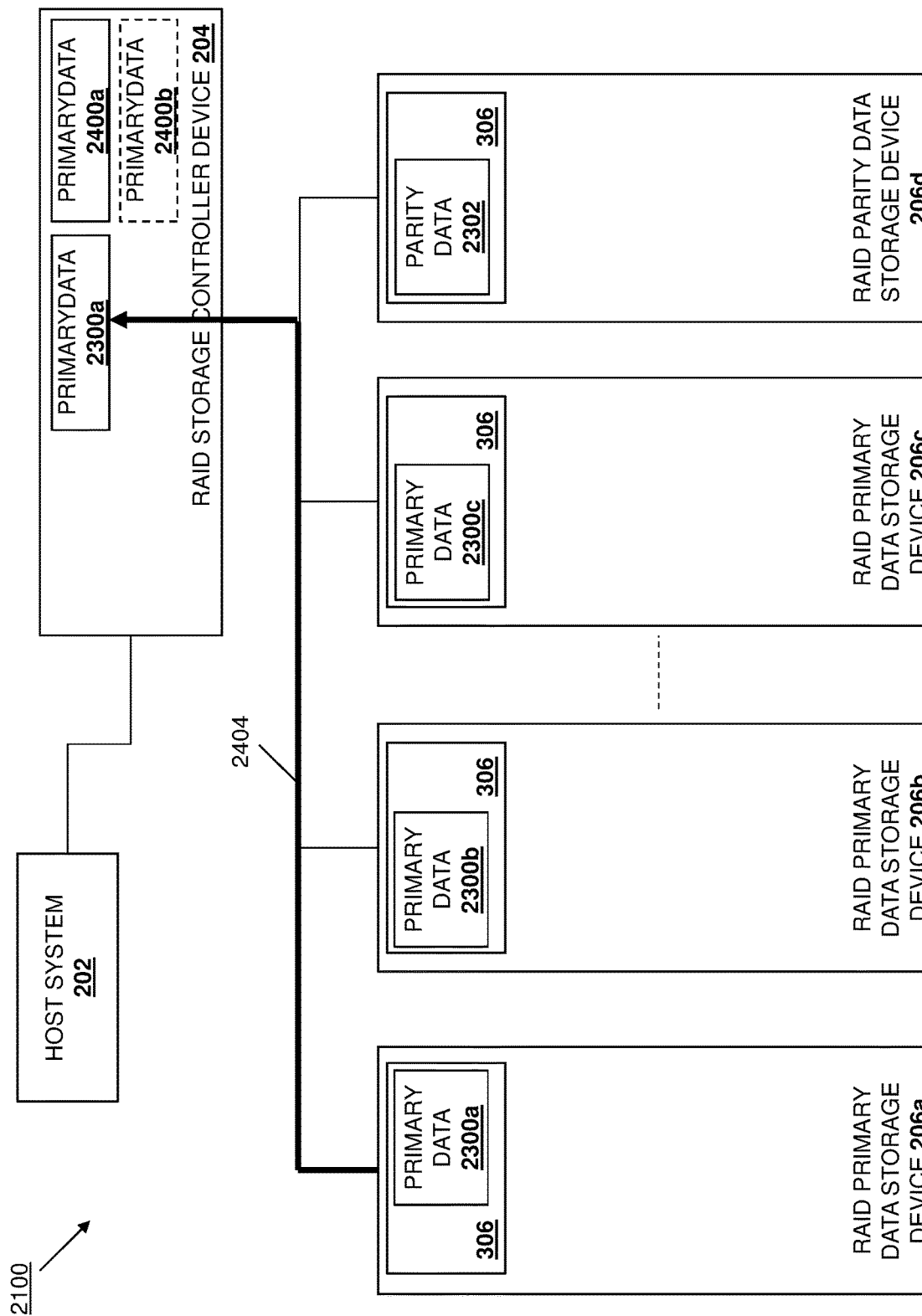
FIG. 24C is a schematic view illustrating an embodiment of the RAID storage system of FIG. 21 operating during the method of FIG. 22.
Figure 24D:
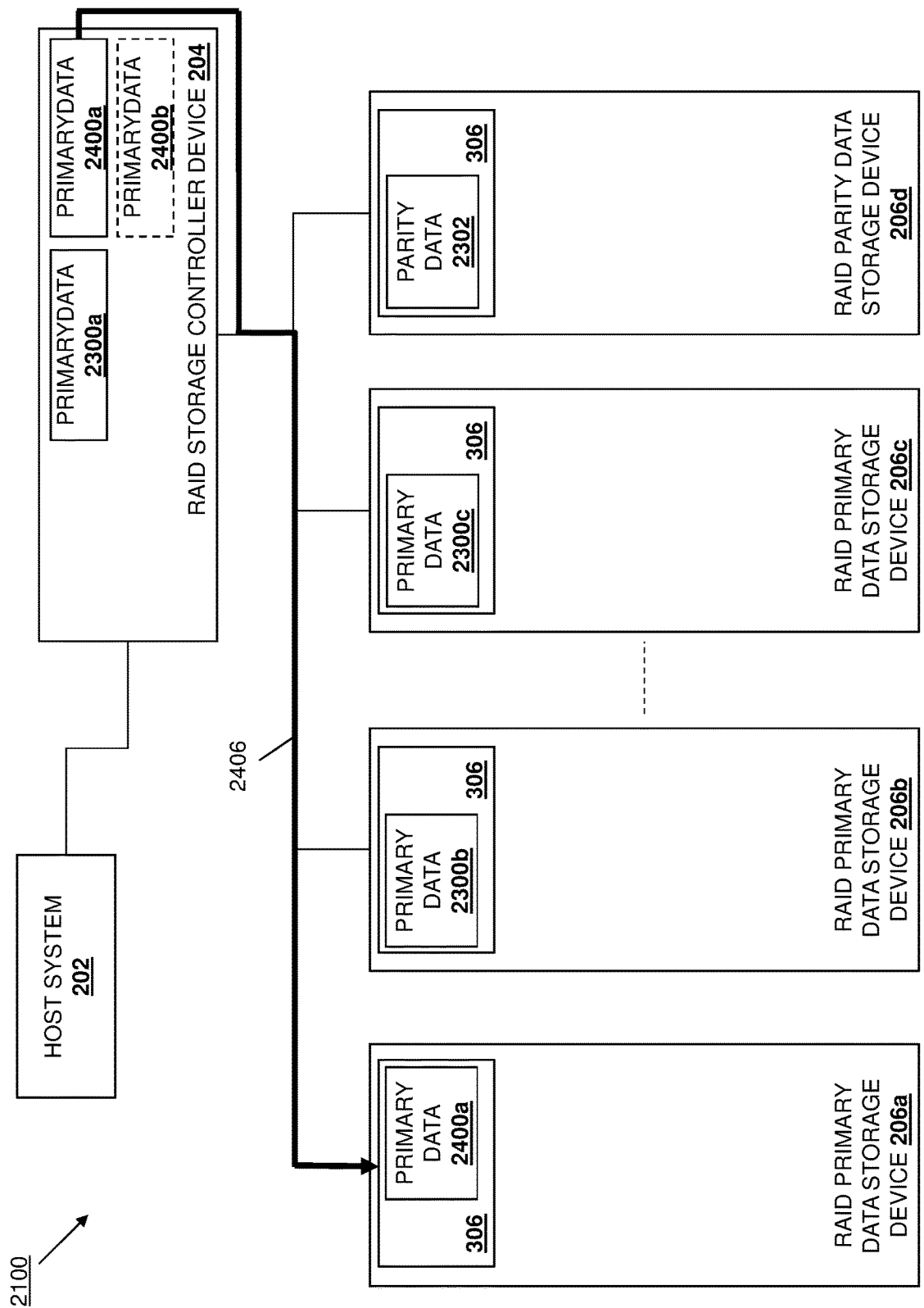
FIG. 24D is a schematic view illustrating an embodiment of the RAID storage system of FIG. 21 operating during the method of FIG. 22.

The method 2200 then proceeds to block 2206 where the RAID storage controller device retrieves current primary data from the RAID primary data storage devices experiencing a primary data update, and then to block 2208 where the RAID storage controller device writes the updated primary data to the RAID primary data storage devices. With reference to FIG. 24C, at block 2206 the RAID storage controller device 204 is illustrated performing a DMA operation 2404 that accesses the storage subsystem 306 in the RAID primary data storage device 206a, and writes the primary data 2300a to the buffer subsystem in the RAID storage controller device 204 (not illustrated, but similar to the device buffers in the RAID primary data storage devices described in the examples above). Furthermore, with reference to FIG. 24D, at block 2208 the RAID storage controller device 204 is illustrated performing a DMA operation 2406 that writes the primary data 2400a to the storage subsystem 306 in the RAID primary data storage device 206a.

Figure 25A:
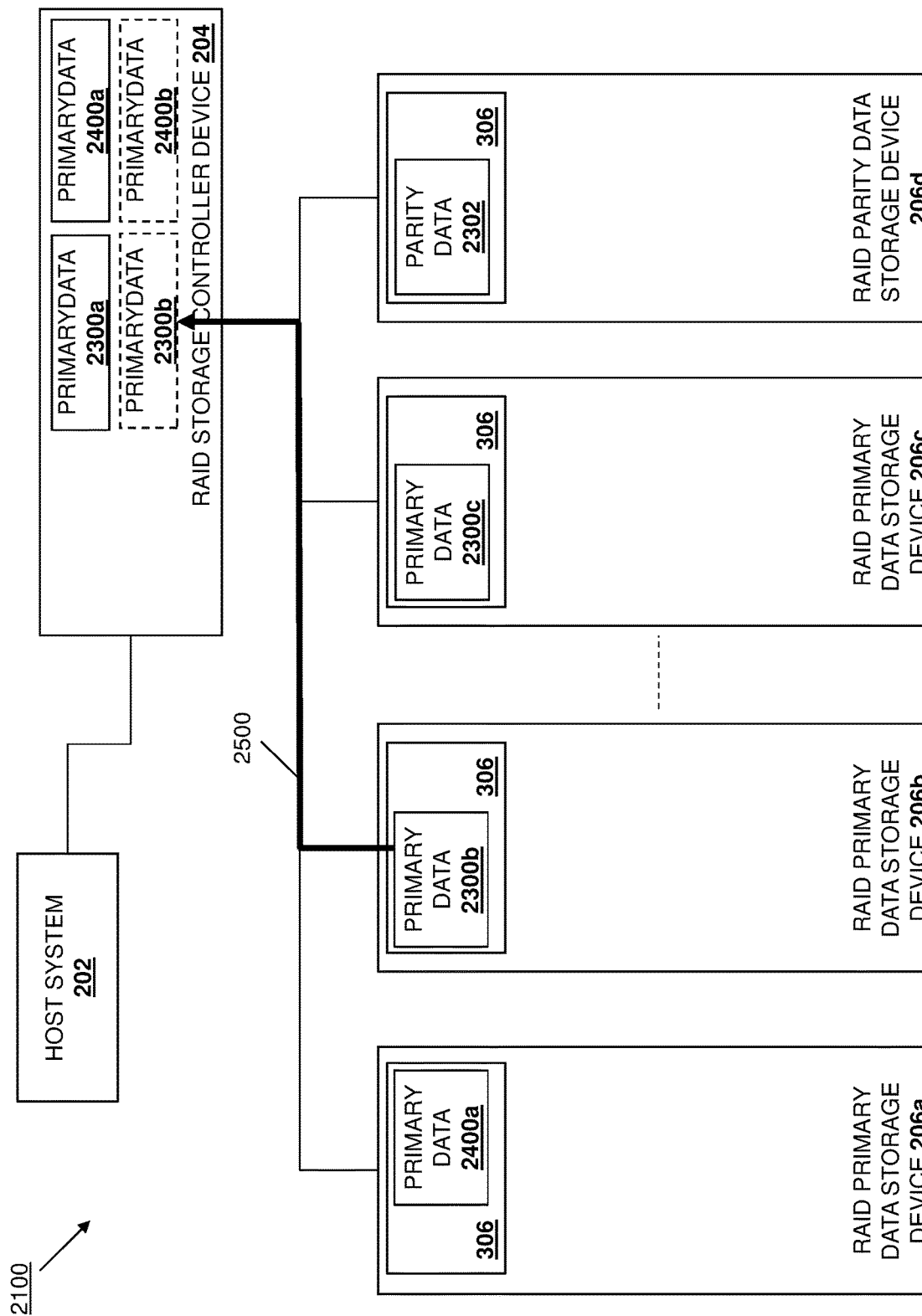
FIG. 25A is a schematic view illustrating an embodiment of the RAID storage system of FIG. 21 operating during the method of FIG. 22.
Figure 25B:
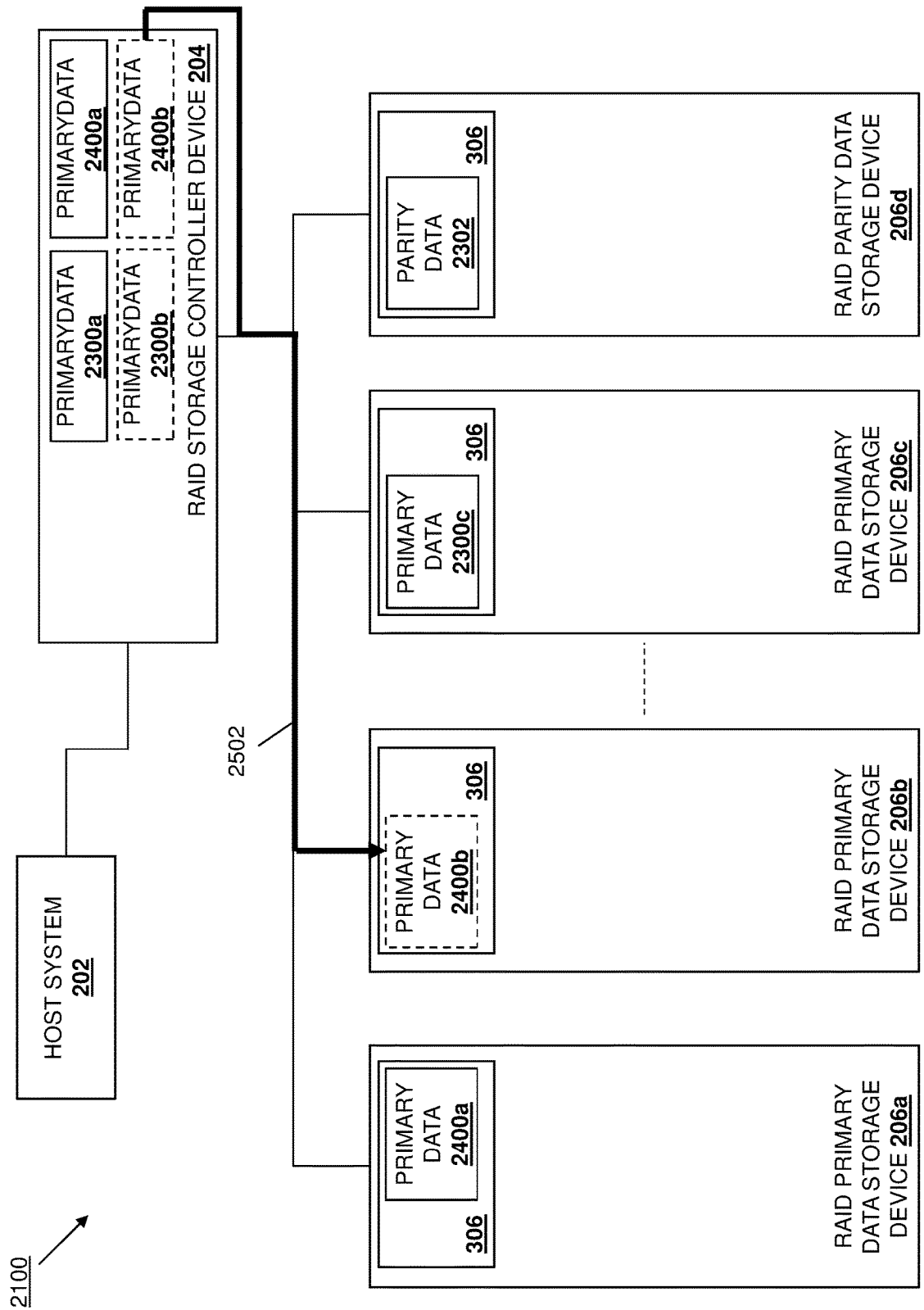
FIG. 25B is a schematic view illustrating an embodiment of the RAID storage system of FIG. 21 operating during the method of FIG. 22.

Similarly, with reference to FIG. 25A, at block 2206 the RAID storage controller device 204 is illustrated performing a DMA operation 2500 that accesses the storage subsystem 306 in the RAID primary data storage device 206b, and writes the primary data 2300b to the buffer subsystem in the RAID storage controller device 204 (not illustrated, but similar to the device buffers in the RAID primary data storage devices described in the examples above). Furthermore, with reference to FIG. 25B, at block 2208 the RAID storage controller device 204 is illustrated performing a DMA operation 2502 that writes the primary data 2400b to the storage subsystem 306 in the RAID primary data storage device 206b. Similarly as discussed above, the partial stripe write is indicated by providing the primary data 2300a in solid lines and providing the primary data 2300b in dashed lines in order to indicate that the partial stripe write need only write updated primary data to one RAID primary data storage device (e.g., the RAID primary data storage device 206a in this example), and may write updated primary data to any number of the RAID primary data storage devices (e.g., the RAID primary data storage device 206b in this example) but not all of the RAID primary data storage devices (which would be a full stripe write, discussed below). As such, one of skill in the art in possession of the present disclosure will appreciate that current primary data may be retrieved at block 2204 for any subset of the RAID primary storage devices 206a-206c that is experiencing a primary data update.

Figure 26A:
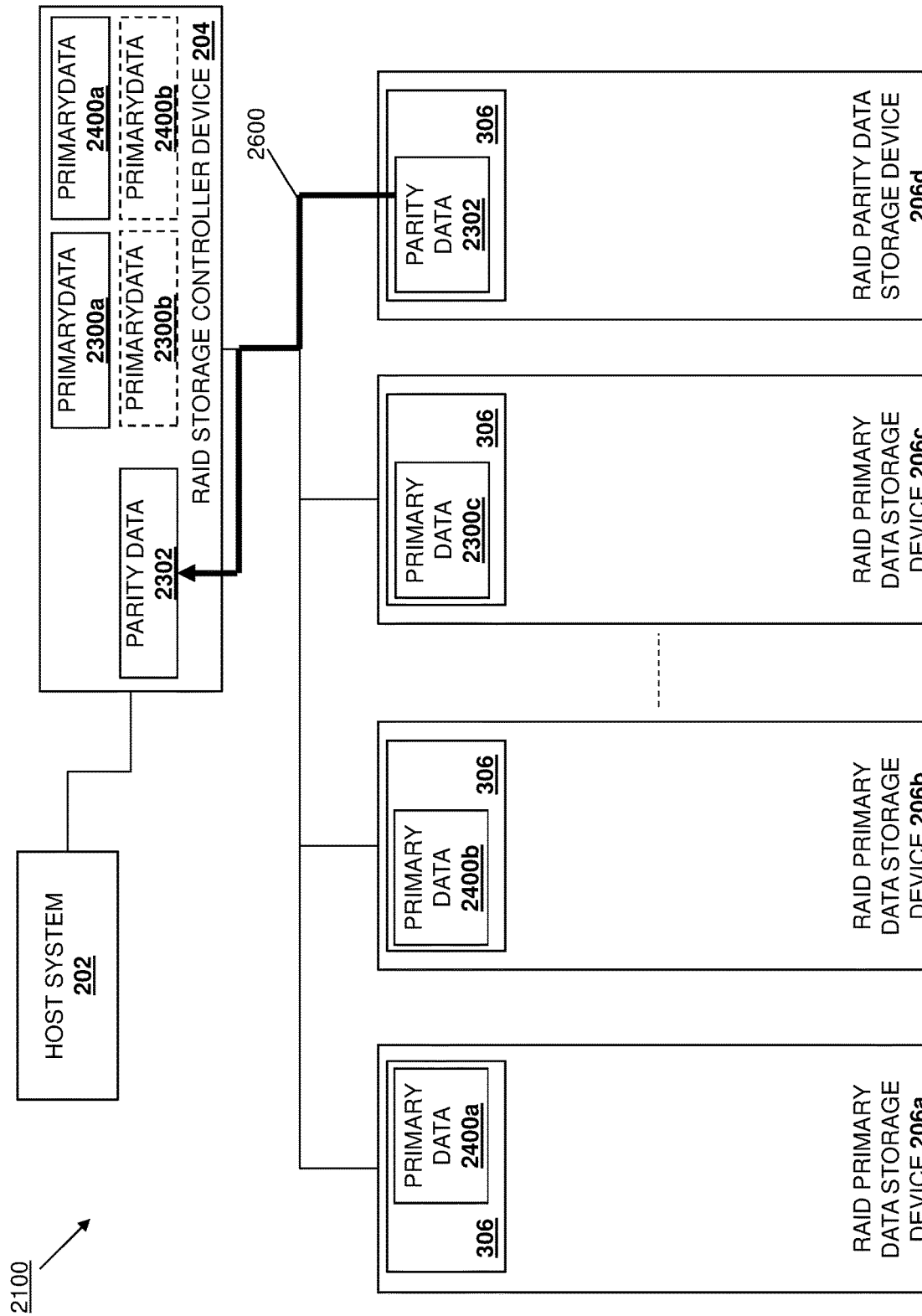
FIG. 26A is a schematic view illustrating an embodiment of the RAID storage system of FIG. 21 operating during the method of FIG. 22.

The method 2200 then proceeds to block 2210 where the RAID storage controller device retrieves current parity data from the RAID parity data storage device. With reference to FIG. 26A, at block 2210 the RAID storage controller device 204 is illustrated performing a DMA operation 2600 that accesses the storage subsystem 306 in the RAID parity data storage device 206d, and writes the parity data 2302 to the buffer subsystem in the RAID storage controller device 204 (not illustrated, but similar to the device buffers in the RAID primary data storage devices described in the examples above).

Figure 26B:
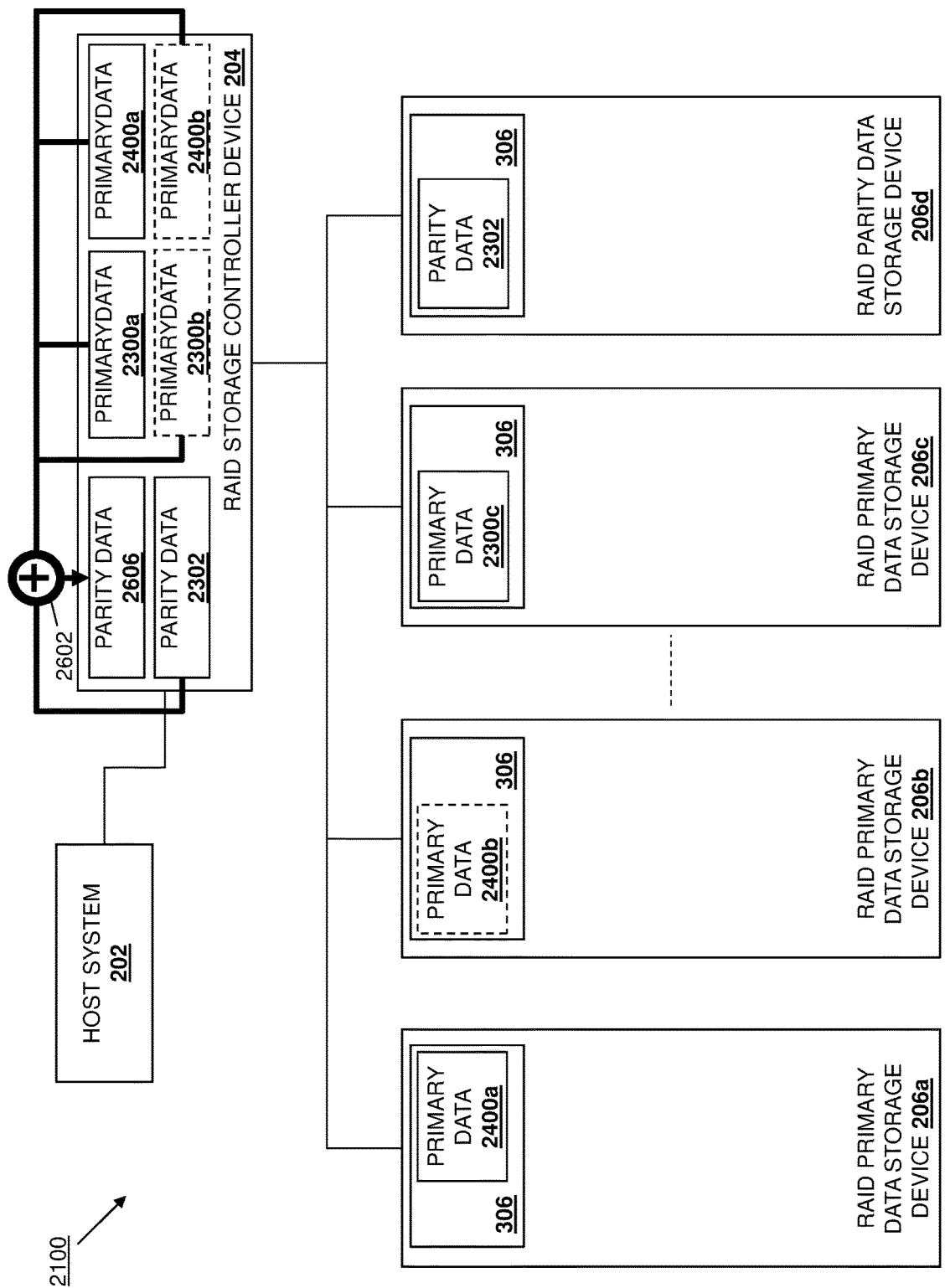
FIG. 26B is a schematic view illustrating an embodiment of the RAID storage system of FIG. 21 operating during the method of FIG. 22.
Figure 26C:
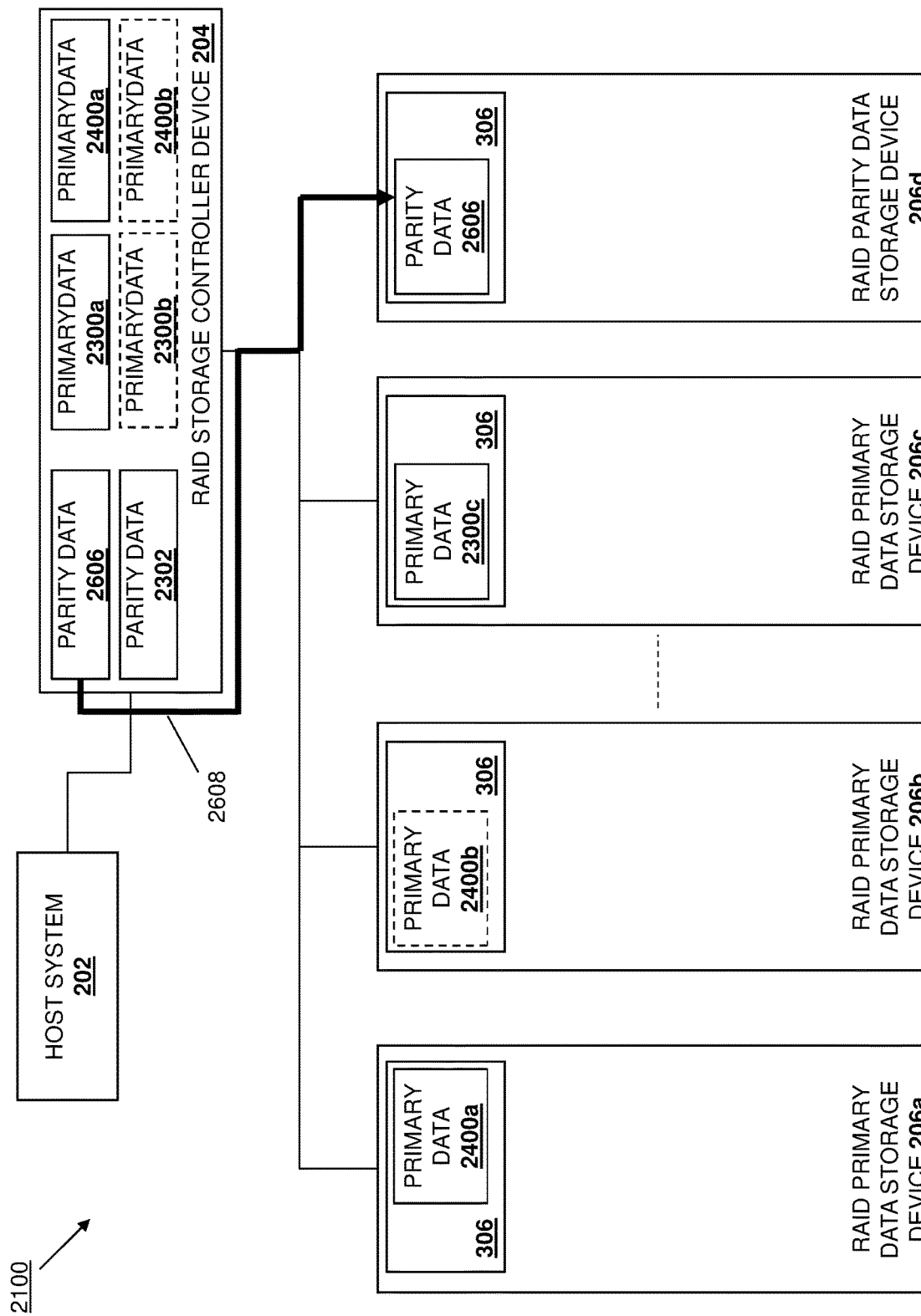
FIG. 26C is a schematic view illustrating an embodiment of the RAID storage system of FIG. 21 operating during the method of FIG. 22.
Figure 26D:
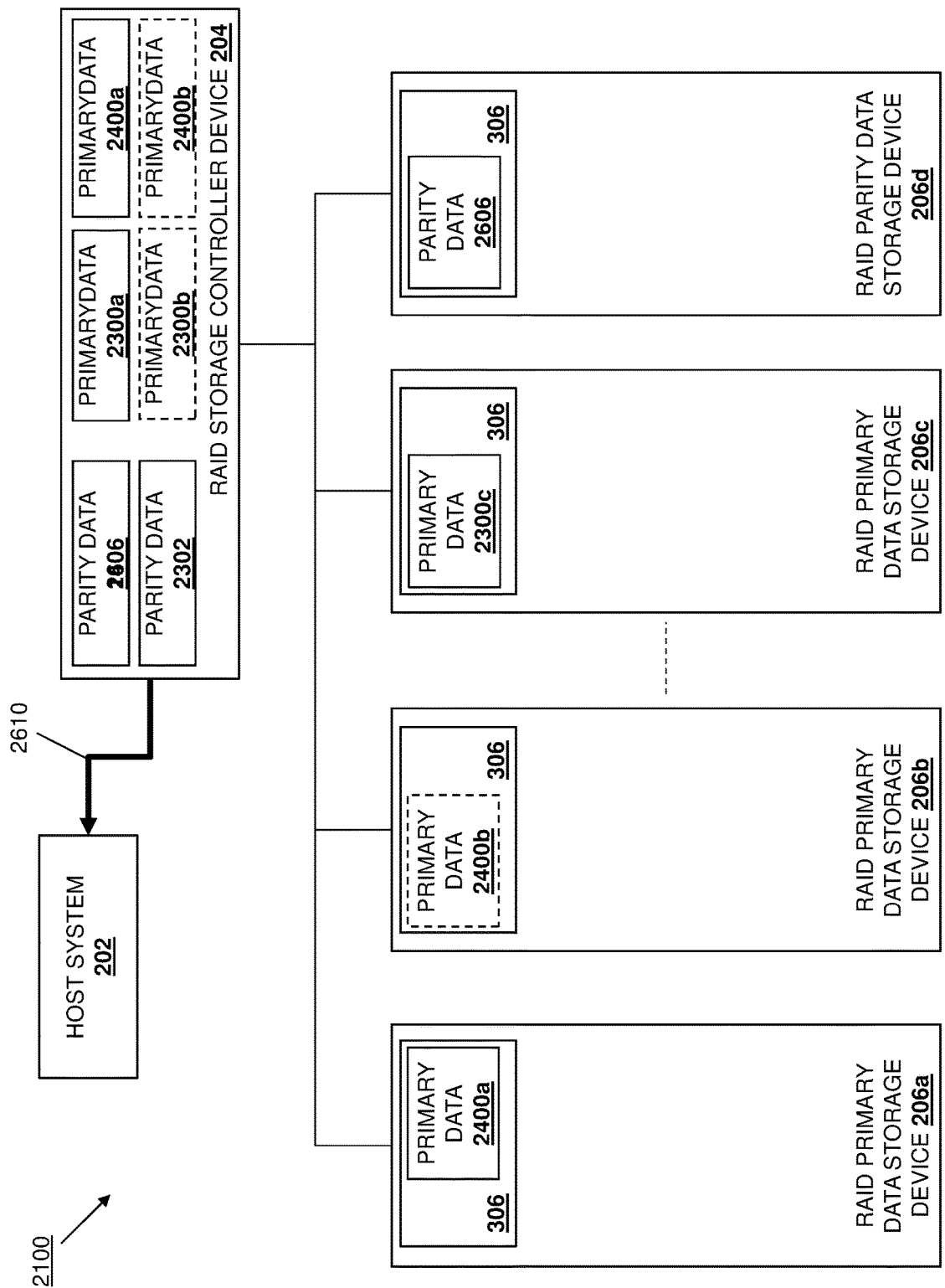
FIG. 26D is a schematic view illustrating an embodiment of the RAID storage system of FIG. 21 operating during the method of FIG. 22.

The method 2200 then proceeds to block 2212 where the RAID storage controller device performs an XOR operation on current primary data, updated primary data, and current parity data in order to produce updated parity data, and writes the updated parity data to the RAID parity data storage device. With reference to FIG. 26B, at block 2212 the RAID storage controller device 204 is illustrated performing an XOR operation 2602 on the primary data 2300a, the primary data 2300b, the primary data 2400a, the primary data 2400b, and the parity data 2302 in order to produce parity data 2606. Furthermore, with reference to FIG. 26C, at block 2212 the RAID storage controller device 204 is illustrated performing a DMA operation 2608 that overwrites the parity data 2302 in the storage subsystem 306 in the RAID parity data storage device 206d with the parity data 2606. As such, following block 2212, the primary data 2300a in the RAID primary data storage device 206a has been updated with the primary data 2400a, the primary data 2300b in the RAID primary data storage device 206b has been updated with the primary data 2400b, and the parity data 2302 in the RAID parity data storage device 206d has been updated with the parity data 2606, thus allowing for the use of the parity data 2606 for the recovery of any one of the primary data 2400a, 2400b, and 2300c in the event that primary data becomes unavailable. FIG. 26D illustrates the RAID storage controller device 204 generating and transmitting a completion message 2610 to the host system 202 to indicate that the write command 2400 has been completed.

Thus, one of skill in the art in possession of the present disclosure will recognize that the operations of the "in-line" RAID storage controller device 204 according to the method 1000 require more processing, memory, and/or other capabilities relative to the operations of the RAID storage controller device 204 during the method 400, illustrating an example of how the operations of the RAID data storage devices 206a-206d during the method 400 offload operations from the RAID storage controller device 204, increasing the ability of the RAID storage controller device to scale with high performance RAID storage devices, and/or providing the option of utilizing a RAID storage controller device with relatively lower processing, memory, and/or other capabilities.

Thus, systems and methods have been described that provide for the performance of data update operations by the RAID storage devices that store that data. For example, a "look-aside" RAID storage controller device may send commands to each of the RAID primary data storage device (s) experiencing a data update and, in response to that command, each of those RAID primary data storage device (s) may operate to perform respective DMA operation(s) to retrieve their updated primary data, perform XOR operations on their current primary data and their updated primary data to produce interim parity data, and overwrite their current primary data with the updated primary data, The "look-aside" RAID storage controller device may then send a command to the RAID parity data storage device and, in response to that command, the RAID parity data storage device may perform DMA operation(s) to retrieve the interim parity data produced by each of the RAID primary data storage device(s), perform an XOR operation of that interim parity data and its current parity data to produce updated parity data, and overwrite its current parity data with the updated parity data. As such, data update operations may be offloaded from the "look aside" RAID storage controller device, thus increasing the ability of the RAID storage controller device to scale with high performance RAID storage devices, and/or allowing for the use of a RAID storage controller device with relatively lower capabilities (e.g., a "control-plane-only) RAID storage controller device.).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Inexpensive Disks (RAID) storage controller storage-device-assisted data update system, comprising:
  a host system;
  a Redundant Array of Inexpensive Disks (RAID) storage controller device that is coupled to the host system; and
  a plurality of RAID storage devices that are each coupled to the RAID storage controller device, and that are each coupled to the host system such that each of the plurality of RAID storage devices has direct access to the host system, wherein the plurality of RAID storage devices include:
    a RAID parity data storage device that is configured, based on at least one command received from the RAID storage controller device, to:
      perform Direct Memory Access (DMA) operations that access interim parity data in at least one RAID primary storage device that is included in the plurality of RAID storage devices;
      write the interim parity data to a first buffer subsystem in the RAID parity data storage device;

perform an XOR operation using the interim parity data that is stored in the first buffer subsystem in the RAID parity data storage device and first parity data that is stored in a first storage subsystem in the RAID parity data storage device in order to produce second parity data; and
update the first parity data with the second parity data.

2. The system of claim 1, wherein the DMA operations include a first DMA operation that accesses first interim parity data in a first RAID primary data storage device that is included in the plurality of RAID storage device, and a second DMA operation that accesses second interim parity data in at least one second RAID primary storage device that is included in the plurality of RAID storage devices, and wherein the writing the interim parity data to the first buffer subsystem in the RAID parity data storage device includes writing the first interim parity data and the second interim parity data to the first buffer subsystem in the RAID parity data storage device.

3. The system of claim 2, wherein the XOR operation uses the first interim parity data and the second interim parity data that is stored in the first buffer subsystem in the RAID parity data storage device and the first parity data that is stored in the first storage subsystem in the RAID parity data storage device in order to produce second parity data.

4. The system of claim 1, wherein the first buffer subsystem includes a device buffer that is internal to the RAID parity data storage device and that is not accessible via a bus connected to the RAID parity data storage device.

5. The system of claim 1, wherein the RAID parity data storage device is configured to:
transmit, in response to updating the first parity data with the second parity data, a completion communication to the RAID storage controller device.

6. The system of claim 5, wherein the transmitting the completion communication to the RAID storage controller device includes:
generating a completion message;
storing the completion message in a completion queue included in the RAID parity data storage device; and
generating an interrupt to the RAID storage controller device that is configured to cause the RAID storage controller device to access the completion queue and retrieve the completion message.

7. The system of claim 1, wherein the RAID parity data storage device is provided by a Non-Volatile Memory express (NVMe) storage device.

8. An Information Handling System (IHS), comprising:
a chassis;
a processing system that is housed in the chassis; and
a memory system that is housed in the chassis, coupled to the processing system, and that includes instructions that, when executed by the processing system, cause the processing system to provide a Redundant Array Of Inexpensive Disks (RAID) storage engine that is configured, based on at least one command received from a RAID storage controller device, to:
perform Direct Memory Access (DMA) operations that access interim parity data in at least one RAID primary storage device that is included in a plurality of RAID storage devices;
write the interim parity data to a first buffer subsystem in the RAID parity data storage device;
perform an XOR operation using the interim parity data that is stored in the first buffer subsystem in the chassis and first parity data that is stored in a first storage subsystem in the chassis in order to produce second parity data; and
update the first parity data with the second parity data.

9. The IHS of claim 8, wherein the first buffer subsystem includes a device buffer that is internal to the chassis and that is not accessible via a bus connected to the chassis.

10. The IHS of claim 8, wherein the RAID storage engine that is configured, based on the at least one command received from the RAID storage controller device, to
transmit, in response to updating the first parity data with the second parity data, a completion communication to the RAID storage controller device.

11. The IHS of claim 10, wherein the transmitting the completion communication to the RAID storage controller device includes:
generating a completion message;
storing the completion message in a completion queue included in the chassis; and
generating an interrupt to the RAID storage controller device that is configured to cause the RAID storage controller device to access the completion queue and retrieve the completion message.

12. The IHS of claim 8, wherein the IHS is provided by a Non-Volatile Memory express (NVMe) storage device.

13. The IHS of claim 8, wherein the chassis is coupled to the host system and to the RAID storage controller device that is provided in a look-aside RAID storage controller device configuration.

14. A method for providing data-transfer-based Redundant Array of Independent Disk (RAID) data updates, comprising:
performing, by a RAID parity data storage device included in a plurality of RAID storage devices and based on at least one command received from a RAID storage controller device, Direct Memory Access (DMA) operations that access interim parity data in at least one RAID primary storage device that is included in the plurality of RAID storage devices;
writing, by the RAID parity data storage device based on the at least one command received from the RAID storage controller device, the interim parity data to a first buffer subsystem in the RAID parity data storage device;
performing, by the RAID parity data storage device based on the at least one command received from the RAID storage controller device, an XOR operation using the interim parity data that is stored in the first buffer subsystem in the RAID parity data storage device and first parity data that is stored in a first storage subsystem in the RAID parity data storage device in order to produce second parity data; and
updating, by the RAID parity data storage device based on the at least one command received from the RAID storage controller device, the first parity data with the second parity data.

15. The method of claim 14, wherein the DMA operations include a first DMA operation that accesses first interim parity data in a first RAID primary data storage device that is included in the plurality of RAID storage device, and a second DMA operation that accesses second interim parity data in at least one second RAID primary storage device that is included in the plurality of RAID storage devices, and wherein the writing the interim parity data to the first buffer subsystem in the RAID parity data storage device includes writing the first interim parity data and the second interim parity data to the first buffer subsystem in the RAID parity data storage device.

16. The method of claim 15, wherein the XOR operation uses the first interim parity data and the second interim parity data that is stored in the first buffer subsystem in the RAID parity data storage device and the first parity data that is stored in the first storage subsystem in the RAID parity data storage device in order to produce second parity data.

17. The method of claim 14, wherein the first buffer subsystem includes a device buffer that is internal to the RAID parity data storage device and that is not accessible via a bus connected to the RAID parity data storage device.

18. The method of claim 14, wherein the RAID parity data storage device is provided by a Non-Volatile Memory express (NVMe) storage device.

19. The method of claim 14, further comprising:
transmitting, by the RAID parity data storage device in response to updating the first parity data with the second parity data, a completion communication to the RAID storage controller device.

20. The method of claim 19, wherein the transmitting the completion communication to the RAID storage controller device includes:
generating a completion message;
storing the completion message in a completion queue included in the RAID parity data storage device; and
generating an interrupt to the RAID storage controller device that is configured to cause the RAID storage controller device to access the completion queue and retrieve the completion message.

* * * * *